US012730249B2

(12) United States Patent
Mahadevan et al.

(10) Patent No.: US 12,730,249 B2
(45) Date of Patent: Sep. 8, 2026

(54) OPHTHALMIC DEVICES CONTAINING PHOTOSTABLE MIMICS OF MACULAR PIGMENT AND OTHER VISIBLE LIGHT FILTERS

(71) Applicant: Johnson & Johnson Vision Care, Inc., Jacksonville, FL (US)

(72) Inventors: Shivkumar Mahadevan, Jacksonville, FL (US); Dola Sinha, Jacksonville, FL (US); Derek Nankivil, Jacksonville, FL (US); Leilani K. Sonoda, Atlantic Beach, FL (US); Ghulam Maharvi, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 18/871,664

(22) PCT Filed: Jun. 8, 2023

(86) PCT No.: PCT/IB2023/055938
§ 371 (c)(1),
(2) Date: Dec. 4, 2024

(87) PCT Pub. No.: WO2023/242688
PCT Pub. Date: Dec. 21, 2023

(65) Prior Publication Data

US 2025/0362432 A1 Nov. 27, 2025

Related U.S. Application Data

(60) Provisional application No. 63/366,471, filed on Jun. 16, 2022.

(51) Int. Cl.
*G02B 1/04* (2006.01)
*C08F 283/12* (2006.01)
*G02C 7/10* (2006.01)

(52) U.S. Cl.
CPC ............ *G02B 1/043* (2013.01); *C08F 283/12* (2013.01); *G02C 7/10* (2013.01)

(58) Field of Classification Search
CPC ......... G02B 1/043; C08F 283/12; G02C 7/10; C08K 5/45; C08L 77/00; C08L 83/04; C07D 335/12
See application file for complete search history.

(56) References Cited

U.S. PATENT DOCUMENTS 3,196,150 A 7/1965 Martin
3,376,303 A 4/1968 Otto et al.
(Continued)

FOREIGN PATENT DOCUMENTS

CN 203965745 U 11/2014
CN 106349212 A 1/2017
(Continued)

OTHER PUBLICATIONS

Maas et al., "Dication Ethers—10. Stable Dipoles from a Bis-Acridinium Ether Salt and Cyclic Beta-Diketonates", Tetrahedron, vol. 41, No. 20, pp. 4529-4536, 1985.
(Continued)

*Primary Examiner* — Bijan Ahvazi
(74) *Attorney, Agent, or Firm* — Raef M. Shaltout

(57) ABSTRACT

Described is an ophthalmic device that contains visible light filters. The ophthalmic device is a free radical reaction product of a reactive mixture comprising: one or more monomers suitable for making the ophthalmic device; a first visible light filtering compound, the first visible light filtering compound having a visible light absorption maximum between 430 and 480 nm and a full width half maximum (FWHM) at the visible light absorption maximum of at least 35 nm and up to 150 nanometers, wherein the compound is photostable, and wherein the compound has a molar extinc-
(Continued)

tion coefficient of at least 7740 L·mol-1·cm-1; and a second visible light filtering compound. The devices may provide one or more benefits to wearers, including enhanced macular pigment optical density (MPOD), as well as improved color perception and color enhancement.

40 Claims, 8 Drawing Sheets

(56) References Cited

U.S. PATENT DOCUMENTS 3,408,429 A 10/1968 Wichterle
3,660,545 A 5/1972 Wichterle
3,769,294 A 10/1973 Catino et al.
3,808,178 A 4/1974 Gaylord
4,113,224 A 9/1978 Clark et al.
4,120,570 A 10/1978 Gaylord
4,136,250 A 1/1979 Mueller et al.
4,153,641 A 5/1979 Deichert et al.
4,197,266 A 4/1980 Clark et al.
4,436,887 A 3/1984 Chromecek et al.
4,495,313 A 1/1985 Larsen
4,659,763 A 4/1987 Gallucci et al.
4,659,782 A 4/1987 Spinelli
4,659,783 A 4/1987 Spinelli
4,716,234 A 12/1987 Dunks et al.
4,740,533 A 4/1988 Su et al.
4,889,664 A 12/1989 Kindt-Larsen et al.
4,910,277 A 3/1990 Bambury et al.
4,997,897 A 3/1991 Melpolder
5,006,622 A 4/1991 Kunzler et al.
5,034,461 A 7/1991 Lai et al.
5,039,459 A 8/1991 Kindt-Larsen et al.
5,070,215 A 12/1991 Bambury et al.
5,236,969 A 8/1993 Kunzler et al.
5,244,981 A 9/1993 Seidner et al.
5,270,418 A 12/1993 Kunzler et al.
5,298,533 A 3/1994 Nandu et al.
5,314,960 A 5/1994 Spinelli et al.
5,331,067 A 7/1994 Seidner et al.
5,371,147 A 12/1994 Spinelli et al.
5,470,932 A 11/1995 Jinkerson
5,480,927 A 1/1996 Janssen et al.
5,729,322 A 3/1998 Collins et al.
5,789,461 A 8/1998 Nicolson et al.
5,824,719 A 10/1998 Kunzler et al.
5,849,811 A 12/1998 Nicolson et al.
5,872,118 A 2/1999 Kelley et al.
5,916,719 A 6/1999 Kim et al.
5,944,853 A 8/1999 Molock et al.
5,945,465 A 8/1999 Ozark et al.
5,962,548 A 10/1999 Vanderlaan et al.
5,965,631 A 10/1999 Nicolson et al.
5,977,219 A 11/1999 Ravichandran et al.
5,998,498 A 12/1999 Vanderlaan et al.
6,020,445 A 2/2000 Vanderlaan et al.
6,022,158 A 2/2000 Nakayama et al.
6,087,415 A 7/2000 Vanderlaan et al.
6,096,246 A 8/2000 Chan et al.
5,760,100 B1 11/2000 Nicolson et al.
5,776,999 B1 11/2000 Nicolson et al.
6,158,862 A 12/2000 Patel et al.
6,166,218 A 12/2000 Ravichandran et al.
6,207,244 B1 3/2001 Hesch
6,244,707 B1 6/2001 Faubl
6,367,929 B1 4/2002 Maiden et al.
6,373,615 B1 4/2002 Mann et al.
6,420,453 B1 7/2002 Bowers et al.
6,423,761 B1 7/2002 Bowers et al.
6,527,977 B2 3/2003 Helber et al.
6,767,979 B1 7/2004 Muir et al.
6,807,745 B2 10/2004 Orton
6,822,016 B2 11/2004 Mccabe et al.
6,867,245 B2 3/2005 Iwata et al.
6,918,931 B2 7/2005 Lai et al.
6,943,203 B2 9/2005 Vanderlaan et al.
6,951,894 B1 10/2005 Nicolson et al.
7,033,391 B2 4/2006 Lai et al.
7,052,131 B2 5/2006 McCabe et al.
7,247,692 B2 7/2007 Laredo
7,249,848 B2 7/2007 Laredo et al.
7,276,544 B2 10/2007 Lai et al.
7,396,890 B2 7/2008 Zanini et al.
7,461,937 B2 12/2008 Steffen et al.
7,468,398 B2 12/2008 Nicolson et al.
7,538,146 B2 5/2009 Nicolson et al.
7,553,860 B2 6/2009 Old
7,553,880 B2 6/2009 Nicolson et al.
7,572,841 B2 8/2009 Chen et al.
7,666,921 B2 2/2010 Mccabe et al.
7,691,916 B2 4/2010 McCabe et al.
7,691,918 B2 4/2010 Jinkerson et al.
7,728,051 B2 6/2010 Weinschenk et al.
7,781,571 B2 8/2010 Weinschenk et al.
7,786,185 B2 8/2010 Rathore et al.
7,803,359 B1 9/2010 Jinkerson et al.
7,825,170 B2 11/2010 Steffen et al.
7,915,323 B2 3/2011 Awasthi et al.
7,934,830 B2 5/2011 Blackwell et al.
7,956,131 B2 6/2011 Arnold et al.
7,994,356 B2 8/2011 Awasthi et al.
8,022,158 B2 9/2011 Rathore et al.
8,026,326 B2 9/2011 Benz et al.
8,043,607 B2 10/2011 Jinkerson
8,113,655 B1 2/2012 Tyrin et al.
8,138,290 B2 3/2012 Blackwell et al.
8,153,703 B2 4/2012 Laredo
8,163,206 B2 4/2012 Chang et al.
8,207,244 B2 6/2012 Laredo
8,236,053 B1 8/2012 Freeman
8,262,947 B2 9/2012 Laredo
8,262,948 B2 9/2012 Laredo et al.
8,273,802 B2 9/2012 Laredo et al.
8,323,631 B2 12/2012 Jinkerson
8,329,775 B2 12/2012 Laredo
8,360,574 B2 1/2013 Ishak et al.
8,389,597 B2 3/2013 Blackwell et al.
8,399,538 B2 3/2013 Steffen et al.
8,415,404 B2 4/2013 Nicolson et al.
8,420,711 B2 4/2013 Awasthi et al.
8,431,624 B2 4/2013 Domschke et al.
8,450,387 B2 5/2013 Mccabe et al.
8,470,906 B2 6/2013 Rathore et al.
8,476,390 B2 7/2013 Benz et al.
8,487,058 B2 7/2013 Liu et al.
8,507,577 B2 8/2013 Zanini et al.
8,568,626 B2 10/2013 Nicolson et al.
8,585,938 B1 11/2013 Jinkerson et al.
8,618,323 B2 12/2013 Benz et al.
8,637,621 B2 1/2014 Iwata et al.
8,697,770 B2 4/2014 Duis et al.
8,703,891 B2 4/2014 Broad
8,784,867 B2 7/2014 Samuel et al.
8,807,745 B2 8/2014 Nunez et al.
8,937,110 B2 1/2015 Alli et al.
8,937,111 B2 1/2015 Alli et al.
8,940,812 B2 1/2015 Reboul et al.
8,980,972 B2 3/2015 Driver
9,005,700 B2 4/2015 Bothe et al.
9,056,878 B2 6/2015 Fujisawa et al.
9,057,821 B2 6/2015 Broad et al.
9,125,808 B2 9/2015 Alli et al.
9,125,829 B2 9/2015 Bonda et al.
9,140,825 B2 9/2015 Alli et al.
9,145,383 B2 9/2015 Bonda et al.
9,156,934 B2 10/2015 Alli et al.
9,170,349 B2 10/2015 Mahadevan et al.
9,217,813 B2 12/2015 Liu et al.
9,244,196 B2 1/2016 Scales et al.
9,244,197 B2 1/2016 Alli et al.
9,249,249 B2 2/2016 Awasthi et al.
9,260,544 B2 2/2016 Rathore et al.
9,278,949 B2 3/2016 Loccufier

(56) References Cited

U.S. PATENT DOCUMENTS 9,297,928 B2 3/2016 Molock et al.
9,297,929 B2 3/2016 Scales et al.
9,315,669 B2 4/2016 Holland et al.
9,439,487 B2 9/2016 Barre et al.
9,611,246 B2 4/2017 Bonda et al.
9,637,444 B2 5/2017 Qian
9,667,800 B2 5/2017 Rodriguez et al.
9,733,493 B2 8/2017 Wooley
9,765,051 B2 9/2017 Bonda et al.
9,816,009 B2 11/2017 Qiu et al.
9,867,800 B2 1/2018 Bonda et al.
9,926,289 B2 3/2018 Bonda et al.
9,927,635 B2 3/2018 Ishak et al.
9,957,258 B2 5/2018 Kunimoto et al.
10,113,075 B2 10/2018 Nesvadba et al.
10,254,443 B2 4/2019 Mccabe et al.
10,268,053 B2 4/2019 Holland et al.
10,338,408 B2 7/2019 Bothe et al.
10,597,515 B2 3/2020 Nesvadba et al.
10,845,625 B2 11/2020 Carrega et al.
10,935,695 B2 3/2021 Mahadevan et al.
11,401,400 B2 8/2022 Shishino et al.
11,543,683 B2 1/2023 Mahadevan et al.
11,820,899 B2 11/2023 Mahadevan et al.
11,993,034 B2 5/2024 Brickey et al.
11,993,037 B1 5/2024 Mahadevan et al.
2002/0042653 A1 4/2002 Copeland et al.
2004/0070726 A1 4/2004 Ishak
2005/0018131 A1 1/2005 Ishak
2005/0055090 A1 3/2005 Lai et al.
2005/0055091 A1 3/2005 Lai et al.
2005/0243272 A1 11/2005 Mainster et al.
2005/0254003 A1 11/2005 Jani et al.
2006/0092374 A1 5/2006 Ishak
2006/0252850 A1 11/2006 Jani et al.
2007/0032717 A1 2/2007 Brister et al.
2007/0092830 A1 4/2007 Lai et al.
2007/0092831 A1 4/2007 Lai et al.
2007/0100018 A1 5/2007 Hagting et al.
2007/0216861 A1 9/2007 Ishak et al.
2008/0002147 A1 1/2008 Haywood et al.
2008/0221674 A1 9/2008 Blum et al.
2010/0048847 A1 2/2010 Broad
2010/0113641 A1 5/2010 Laredo
2010/0168359 A1 7/2010 Domschke et al.
2010/0321632 A1 12/2010 Sanger
2011/0245818 A1 10/2011 Weinschenk, III
2011/0249234 A1 10/2011 Duis et al.
2012/0010703 A1 1/2012 Paul et al.
2012/0053313 A1 3/2012 Higgs et al.
2012/0196951 A1 8/2012 Mentak
2012/0262792 A1 10/2012 Goldberg et al.
2012/0309899 A1 12/2012 Akinay et al.
2013/0009059 A1 1/2013 Shelton et al.
2013/0057824 A1 3/2013 Harding et al.
2013/0095235 A1 4/2013 Bothe et al.
2013/0158150 A1 6/2013 Zhang et al.
2013/0168617 A1 7/2013 Alli et al.
2013/0172440 A1 7/2013 Alli et al.
2013/0217620 A1 8/2013 Alli et al.
2014/0024791 A1 1/2014 Alli et al.
2014/0031447 A1 1/2014 Alli et al.
2014/0044654 A1 2/2014 Bonda et al.
2014/0050681 A1 2/2014 Bonda et al.
2014/0093661 A1 4/2014 Trajkovska et al.
2014/0178595 A1 6/2014 Bothe et al.
2014/0300857 A1 10/2014 Cohen-tannoudji et al.
2015/0092155 A1 4/2015 Chang et al.
2015/0094393 A1 4/2015 Holland et al.
2015/0094395 A1 4/2015 Alli et al.
2015/0164852 A1 6/2015 Bonda et al.
2015/0175732 A1 6/2015 Awasthi et al.
2015/0316688 A1 11/2015 Cefalo et al.
2016/0002200 A1 1/2016 Bonda et al.
2016/0022555 A1 1/2016 Bonda et al.
2016/0024046 A1 1/2016 Bonda et al.
2016/0170093 A1 6/2016 Laredo et al.
2017/0038605 A1 2/2017 Legerton
2017/0075137 A1 3/2017 Lin et al.
2017/0131574 A1 5/2017 Lee
2017/0184878 A1 6/2017 Duis et al.
2017/0227790 A1 8/2017 Lin et al.
2017/0261768 A1 9/2017 Ambler et al.
2018/0037690 A1 2/2018 Aitken et al.
2018/0164608 A1 6/2018 Schmeder et al.
2018/0208583 A1 7/2018 Kunimoto et al.
2018/0263951 A1 9/2018 Bonda et al.
2018/0371139 A1 12/2018 Mahadevan et al.
2019/0002415 A1 1/2019 Mahadevan et al.
2019/0002459 A1 1/2019 Mahadevan et al.
2019/0121162 A1 4/2019 Alli et al.
2019/0169438 A1 6/2019 Fromentin et al.
2019/0179170 A1 6/2019 Chang et al.
2019/0271798 A1* 9/2019 Mahadevan .......... C09B 62/465
2019/0271861 A1 9/2019 Hose
2020/0347166 A1 11/2020 Alli et al.
2020/0347167 A1 11/2020 Alli et al.
2020/0399429 A1 12/2020 Alli et al.
2020/0407324 A1 12/2020 Mahadevan et al.
2020/0407337 A1* 12/2020 Mahadevan ......... C07D 335/12
2021/0061934 A1 3/2021 Martin et al.
2021/0063770 A1 3/2021 Mahadevan et al.
2021/0109255 A1 4/2021 Mahadevan et al.
2022/0194944 A1 6/2022 Mahadevan
2022/0340759 A1 10/2022 Riederer et al.
2022/0340760 A1 10/2022 Nankivil et al.
2023/0066936 A1 3/2023 Buch et al.
2023/0085695 A1 3/2023 Buch et al.
2023/0117655 A1 4/2023 Mahadevan et al.
2023/0288728 A1 9/2023 Mahadevan et al.
2023/0296807 A1 9/2023 Aitken et al.
2026/0003209 A1 1/2026 Martin et al.

FOREIGN PATENT DOCUMENTS

CN 106366241 A 2/2017
CN 108586289 A 9/2018
EP 0080539 B1 5/1986
EP 0131468 B1 1/1990
EP 0924203 A1 6/1999
EP 1870735 A1 12/2007
EP 2123638 A1 11/2009
EP 3052534 A1 8/2016
EP 3419961 A1 1/2019
EP 3052534 B1 5/2019
EP 3419961 B1 9/2020
GB 217810 A 6/1924
GB 2319035 A 5/1998
JP H0743918 A 2/1995
JP 2004243596 A 9/2004
JP 2004277581 A 10/2004
JP 2008050463 A 3/2008
JP 4627009 B2 2/2011
JP 2011219512 A 11/2011
JP 2015118122 A 6/2015
JP 2016133593 A 7/2016
RU 2196557 C2 1/2003
RU 2197907 C2 2/2003
RU 2294132 C2 2/2007
RU 2466173 C1 11/2012
WO 9963366 A1 12/1999
WO 0130866 A1 5/2001
WO 0212205 A1 2/2002
WO 0242281 A1 5/2002
WO 03022321 A2 3/2003
WO 03089519 A1 10/2003
WO 2007050395 A2 5/2007
WO 2008061992 A2 5/2008
WO 2008078804 A1 7/2008
WO 2011130139 A1 10/2011
WO 2013055746 A1 4/2013
WO 2013188825 A1 12/2013
WO 2014018208 A1 1/2014
WO 2014025370 A1 2/2014

(56) References Cited

FOREIGN PATENT DOCUMENTS

| | | |
|---|---|---|
| WO | 2014026151 A1 | 2/2014 |
| WO | 2015048035 | 4/2015 |
| WO | 2015155748 A1 | 10/2015 |
| WO | 2016100457 A1 | 6/2016 |
| WO | 2016175619 A1 | 11/2016 |
| WO | 2017073467 A1 | 5/2017 |
| WO | 2017106322 A1 | 6/2017 |
| WO | 2019156143 A1 | 8/2019 |
| WO | 2019166971 A1 | 9/2019 |
| WO | 2020177534 A1 | 9/2020 |
| WO | 2020261091 A1 | 12/2020 |

OTHER PUBLICATIONS

Ma et al., "Studies on K2CO3-Catalyzed 1,4-Addition of 1,2-Allenic Ketones with Diethyl Malonate: Controlled Selective Synthesis of β,γ-Unsaturated Enones and α-Pyrones", Journal of Organic Chemistry, vol. 68, pp. 8996-9002, Oct. 24, 2003.

Krick et al. "Temperature-Dependent Dynamics of Push-Pull Rotor Systems Based on Acridinylidene Cyanoacetic Esters", European Journal of Organic Chemistry, pp. 5141-5146, Jul. 26, 2017.

"Guidance for Industry: Q1B Photostability Testing of New Drug Substances and Products", International Conference on Harmonisation (ICH) of Technical Requirements for Registration of Pharmaceuticals for Human Use guideline, 14 pages, Nov. 1996.

"Statement on Ocular Ultraviolet Radiation Hazards in Sunlight", American Optometric Association, pp. 1-3, Nov. 10, 1993.

Beatty et al., "Macular Pigment and Age Related Macular Degeneration", British Journal of Ophthalmology, vol. 83, pp. 867-877, 1999.

Belikov, V.G., "The Relationship Between Chemical Structure, Properties of Substances and Their Effect on the Organism", Pharmaceutical Chemistry, pp. 27-29, 2007.

Belusa et al., "2-(2-hydroxyphenyl)benzotriazoles. I. Synthesis and Their Ultraviolet and Infrared Spectra", Department of Organic Chemistry, Chem.Zvesti, vol. 28, No. 5, pp. 673-679, Jan. 14, 1974.

Berg, Van Den, "Importance of Pathological Intraocular Light Scatter for Visual Disability", Documenta Ophthalmologica, vol. 61, pp. 327-333, 1986.

Bernstein et al., "Lutein, Zeaxanthin, and Meso-zeaxanthin: the Basic and Clinical Science Underlying Carotenoid- based Nutritional Interventions Against Ocular Disease", Progress in Retinal and Eye Research, vol. 50, pp. 34-66, 2016.

Berthon et al., "Synthesis, Electrochemical and Spectroscopic Properties of Pendant Hydroquinone-and Quinone- substitued Polypyridyl Ruthenium(li) Complexes", Inorganica Himica Acta, vol. 204, pp. 3-7, 1993.

Bondyreva, E.U., "Polymerization- Methodological Guidelines for Independent Work", Kazan National Research Technological University, Nizhnekamsk, pp. 4-13, 2014.

Boon et al., "Factors Influencing the Chemical Stability of Carotenoids in Foods", Critical Reviews in Food Science and Nutrition, vol. 50, pp. 515-532, 2010.

Burton et al., "B-carotene Autoxidation: Oxygen Copolymerization, Non-vitamin A Products, and Immunological Activity", Canadian Journal of Chemistry, vol. 92, pp. 305-316, 2014.

Chakrabarti et al., "Statistics of Real-World Hyperspectral Images", CVPR, pp. 193-200, Jun. 20-25, 2011.

Chen et al., "Dicyanomethylenated Acridone Based Crystals: Torsional Vibration Confinement Induced Emission with Supramolecular Structure Dependent and Stimuli Responsive Characteristics", The Journal of Physical Chemistry, vol. 120, pp. 587-597, 2016.

Crivello et al., "Photoinitiators for Free Radical Cationic and Anionic Photopolymerisation", Chemistry and Technology of UV and EB Formulation for Coatings, Inks & Paints, 2nd Edition, 26 pages, 1998.

Das et al., "In Vitro and Schematic Model Eye Assessment of Glare or Positive Dysphotopsia-type Photic Phenomena: Comparison of a New Material lol to Other Monofocal lols", Journal of Cataract and Refractive Surgery, vol. 45, No. 2, pp. 219-227, Feb. 2019.

Doutch et al., "Ultraviolet Light Transmission Through the Human Corneal Stroma is Reduced in the Periphery", Biophysical Journal, vol. 102, No. 6, pp. 1258-1264, 2012.

Dyson et al., "Chemistry of Synthetic Drugs Substances", Moscow: Mir, 9 pages, 1964.

Elsherif et al., "Contact Lenses for Color Vision Deficiency", Advanced Materials Technologies, vol. 6, No. 1, pp. 1-9, Jan. 2021.

Fadli et al., "Permeation and Pervaporation of Water Through Contact Lens Materials", 3 pages, 2016.

Foster et al., "Frequency of Metamerism in Natural Scenes", Journal of the Optical Society of America, vol. 23, No. 10, pp. 2359-2372, Oct. 2006.

Hafez et al., "Carbonyl and Thiocarbonyl Compounds. V. Synthesis of Newer Unsaturated Nitriles, Carboxylic Acids, and Esters Derived From Xanthene and Thiaxanthene", Journal of Organic Chemistry, vol. 26, pp. 3988-3991, Oct. 1961.

Ham et al., "Retinal Sensitivity to Damage from Short Wavelength Light", Nature, vol. 260, No. 5547, pp. 153-155, Mar. 11, 1976.

Hammond et al., "Contralateral Comparison of Blue-filtering and Non-blue-filtering Intraocular Lenses: Glare Disability, Heterochromatic Contrast, and Photostress Recovery", Clinical Ophthalmology, vol. 4, pp. 1465-1473, 2010.

Harris et al., "Effect of Tinted Contact Lenses on Color Vision", Journal of Optometry & Physiological Optics, vol. 53, No. 3, pp. 145-148, Mar. 1976.

International Preliminary Report on Patentability, received for PCT Application No. PCT/IB2019/051582, mailed on Sep. 8, 2020, 10 pages.

International Preliminary Report on Patentability, received for PCT Application No. PCT/IB2020/055485, mailed on Dec. 28, 2021, 08 pages.

International Preliminary Report on Patentability, received for PCT Application No. PCT/IB2020/055868, mailed on Dec. 28, 2021, 09 pages.

International Preliminary Report on Patentability, received for PCT Application No. PCT/IB2020/057732, mailed on Mar. 1, 2022, 8 pages.

International Preliminary Report on Patentability, received for PCT Application No. PCT/IB2020/057733, mailed on Mar. 1, 2002, 9 pages.

International Preliminary Report on Patentability, received for PCT Application No. PCT/IB2021/061175, mailed on Jun. 13, 2023, 7 pages.

International Search Report and Written Opinion, received for PCT Application No. PCT/IB2018/053669, mailed on Jul. 17, 2018, 14 pages.

International Search Report and Written Opinion, received for PCT Application No. PCT/IB2018/054585, mailed on Nov. 9, 2018, 12 pages.

International Search Report and Written Opinion, received for PCT Application No. PCT/IB2018/054588, mailed on Oct. 4, 2018, 17 pages.

International Search Report and Written Opinion, received for PCT Application No. PCT/IB2019/051582, mailed on May 24, 2019, 18 pages.

International Search Report and Written Opinion, received for PCT Application No. PCT/IB2020/055485, mailed on Jul. 23, 2020, 16 pages.

International Search Report and Written Opinion, received for PCT Application No. PCT/IB2020/055868, mailed on Sep. 23, 2020, 16 pages.

International Search Report and Written Opinion, received for PCT Application No. PCT/IB2020/057732, mailed on Oct. 9, 2020, 15 pages.

International Search Report and Written Opinion, received for PCT Application No. PCT/IB2020/057733, mailed on Oct. 9, 2020, 16 pages.

International Search Report and Written Opinion, received for PCT Application No. PCT/IB2021/061175, mailed on Mar. 1, 2022, 15 pages.

(56) References Cited

OTHER PUBLICATIONS

International Search Report and Written Opinion, received for PCT Application No. PCT/IB2023/055938, mailed on Oct. 18, 2023, 12 pages.
ISO 18369-3, "Ophthalmic Optics-Contact lenses—Part 3: Measurement Methods", International Organization for Standardization, Aug. 15, 2006, 44 pages.
ISO 18369-4, "Ophthalmic Optics-Contact Lenses—Part 4: Physicochemical Properties of Contact Lens Materials", International Organization for Standardization, Aug. 15, 2006, 38 pages.
ISO 9913-1, "Optics and Optical Instruments—Contact Lenses—Part 1: Determination of Oxygen Permeability and Transmissibility by the FATT Method", International Organization for Standardization, Nov. 1, 1996, 16 pages.
Jockusch et al., "Photostabilization of Endogenous Porphyrins: Excited State Quenching by Fused Ring Cyanoacrylates", Photchemical and Photobiological Sciences, vol. 13, No. 8, pp. 1180-1184, 2014.
Johnston et al., "Biologically Active Polymers from Spontaneous Carotenoid Oxidation: A New Frontier in Carotenoid Activity", Plos One, vol. 9, No. 10, pp. 1-10, Oct. 2014.
Jones et al., Compendium of Polymer Terminology and Nomenclature: IUPAC Recommendations 2008, International Union of Pure and Applied Chemistry, 20 pages, 2008.
Kolpashchikova et al., "Organic Chemistry Part II. Arenes. Halogened Hydrocarbons", Ministry of Education of the Russian Federation, pp. 1-3, 1999.
Lam et al., "Synthesis of Dinucleating Phenanthroline-based Ligands", Tetrahedron, vol. 55, No. 28, pp. 8377-8384, Jul. 9, 1999.
Latif et al., "Cleavage of Xanthene Ethers: a New Route to 9-substituted Xanthenes", Canadian Journal of Chemistry, vol. 42, pp. 1736-1740, 1964.
Laxer, Michele, "Soft Tinted Contact Lenses and Color Discrimination", International Contact Lens Clinic, vol. 17, pp. 88-91, Mar.-Apr. 1990.
Liu, Zhuo., "Tutorial on Modern Rock and Mineral Analytic Experiments", Geological Press, p. 42, Oct. 31, 2015.
Luning et al., "Bimacrocylic 1,10-phenanthroline Cyclophanes", Chemische Beri, vol. 123, No. 3, pp. 643-645, 1990.
Macleod et al., "Chromaticity Diagram Showing Cone Excitation by Stimuli of Equal Luminance", Journal of the Optical Society of America, vol. 69, No. 8, pp. 1183-1186, Aug. 1979.
Mencucci et al., "Visual Outcome, Optical Quality and Patients' Satisfaction with a New Monofocal Intraocular Lens, Enhanced for Intermediate Vision: Preliminary Results", Journal of Cataract and Refractive Surgery, vol. 46, No. 3, pp. 378-387, Mar. 2020.
Miao et al., "Objective Optical Quality and Intraocular Scattering in Myopic Adults", Investigative Ophthalmology and Visual Science, vol. 55, No. 9, pp. 5582-5587, Sep. 2014.
Mostafa et al., "The Effect of Age and Gender on Tear Film Breakup Time", Egyptian Journal of Medical Research, vol. 2, No. 2, 11 pages, 2021.
Nascimento et al., "Statistics of Spatial Cone-excitation Ratios in Natural Scenes", Journal of the Optical Society of America A, vol. 19, No. 8, pp. 1484-1490, Aug. 2002.
Nishino et al., "Manganese (III)-Mediated Carbon-Carbon Bond Formation in the Reaction of Xanthenes with Active Methylene Compounds", The Journal of Organic Chemistry, vol. 57, No. 13, pp. 3551-3557, Jan. 1, 1992.
Parraga et al., "Color and Luminance Information in Natural Scenes", Journal of the Optical Society of America A, vol. 15, No. 3, pp. 563-569, Mar. 1998.
Patel et al., "Effect of Visual Display Unit Use on Blink Rate and Tear Stability", Optometry & Vision Science, vol. 68, No. 11, pp. 888-892, 1991.
Pokorny et al., "Aging of the Human Lens", Applied Optics, vol. 26, No. 8, pp. 1437-1440, Apr. 1987.
Reck et al., "Enantiopure Chiral Chiral Concave 1,10-phenanthrolines", European Journal Of Organic Chemistry, vol. 2016, No. 6, pp. 1119-1131, 2016.
Ribeiro et al., "Antioxidant and Pro-oxidant Activities of Carotenoids and Their Oxidation Products", Food and Chemical Toxicology, vol. 120, pp. 681-699, 2018.
Sato et al., "Synthesis and Characterization of Electron Transporting Polymers having Thioxanthene Derivatives", Synthetic Metals, vol. 105, pp. 55-60, Jan. 1, 1999.
Selvam et al., "Tunable Anchoring Groups@acridone-linked Triphenylamine Based Pendant Chromophores and Their Effects on the Photovoltaic Performance as Sensitizers for Dye-sensitized Solar Cells", RSC Advances, vol. 6, No. 110, pp. 109054-109060, 2016.
Stockman et al., "The Spectral Sensitivities of the Middle- and Long-wavelength-sensitive Cones Derived from Measurements in Observers of Known Genotype", Vision Research, vol. 40, pp. 1711-1737, 2000.
Stringham et al., "Macular Pigment and Visual Performance in Glare: Benefits for Photostress Recovery, Disability Glare, and Visual Discomfort", IOVS, vol. 52, No. 10, pp. 7406-7415, Sep. 2011.
Sutyagin et al., "Chemistry and Physics of Polymers", Training Manual, Chapter 1, p. 9, Chapter 2, pp. 19-56, 2003.
Takeda et al., "Anisotropic Dissociation of p-p Stacking and Flipping-MotionInduced Crystal Jumping in Alkylacridones and Their Dicyanomethylene Derivatives", Chemistry A European Journal, vol. 22, pp. 7763-7770, 2016.
Tan et al., "Dynamic Change of Optical Quality in Patients With Dry Eye Disease", Invest Ophthalmol Vis Sci., vol. 56, No. 5, pp. 2848-2854, May 2015.
Tester et al., "Dysphotopsia in Phakic and Pseudophakic Patients: Incidence and Relation to Intraocular Lens Type", Journal of Cataract & Refractive Surgery, vol. 26, No. 6, pp. 810-816, Jun. 2000.
Tsubota et al., "Dry Eyes and Video Display Terminals", New England Journal of Medicine, vol. 328, No. 8, 584 page, Feb. 25, 1993.
Ty et al., "Oxidation and Thermal Degradation of Carotenoids", Journal of Oil Palm Research, vol. II, No. 1, pp. 62-78, Jun. 1999.
Xi et al., "Assessment of Tear Film Optical Quality in a Young Short Tear Break-up Time Dry Eye: Case-control study", Medicine, vol. 98, No. 40, pp. 1-6, 2019.

* cited by examiner

OPHTHALMIC DEVICES CONTAINING PHOTOSTABLE MIMICS OF MACULAR PIGMENT AND OTHER VISIBLE LIGHT FILTERS

RELATED APPLICATIONS

This application is a 35 U.S.C. § 371 national phase filing of PCT/IB2023/055938, filed Jun. 8, 2023, which claims priority to U.S. Provisional Patent Application Ser. No. 63/366,471, filed Jun. 16, 2022, which is incorporated herein by reference in its entirety.

FIELD OF THE INVENTION

The invention relates to ophthalmic devices that contain visible light filters. More particularly, the invention relates to ophthalmic devices containing visible light filtering compounds that substantially mimic the absorbance properties of macular pigment, while remaining photostable. The ophthalmic devices also contain secondary visible light filters.

BACKGROUND OF THE INVENTION

Human ocular tissues contain the dietary carotenoids lutein (L) and zeaxanthin (Z), collectively known as macular pigment (MP). Several reports describe the benefits of MP, for instance as a short-wavelength (blue light) filter and as a powerful antioxidant, have been made. MP is also believed to play a protective role against age related macular degeneration (AMD) (Bernstein, P. S., Li, B., Vachali, P. P., Gorusupudi, A., Shyam, R., Henriksen, B. S., Nolan, J. M. Prog. Retin. Eye Res. 2016, 50, 34-66; Beatty, S., Boulton, M., Koh, H-H., Murray, I, J. Br. *J. Ophthalmol* 1999, 83, 867-877). Macular pigment has further been found to correlate significantly with photostress recovery times, reduced disability glare contrast thresholds, and reduced visual discomfort (Stringham, J. M., Garcia., P. V., Smith, P. A., McLin, L, N., Foutch, B. K. IOVS, 2011, 52 (10) 7406-7415).

The chemical entities associated with macular pigment are carotenoid derivatives that possess extensive unsaturation and are highly reactive toward olefin isomerization and oxidation upon photoexcitation. The antioxidant protective mechanism that carotenoids provide is essentially sacrificial, where excitation of the pi system results in the reaction of its excited state with triplet oxygen, thereby protecting/limiting the excitation and reactions of other photosensitive compounds in the ocular environment. See e.g., Ribeiro, et al., Food and Chemical Toxicology, Vol. 120, pp. 681-699 (2018); Burton, et al., Can. J. Chem., Vol. 92, pp. 305-316 (2014); Ty, et al., Journal of Oil Palm Research Vol. II No. 1, pp. 62-78 (June 1999); Johnston, et al., Plos One, Vol. 9(10), pp. 1-10 (2014); and Boon, et al., Critical Reviews in Food Science and Nutrition, Vol. 50, pp. 515-532 (2010).

While the incorporation of macular pigment into products for the purpose of offering ocular protection is desirable, the overall lack of stability (thermal, oxidative, and photochemical) of carotenoids creates a very high barrier to the development of such products. Thus, it would be a significant advance if new stable materials that mimic the light absorbing properties of macular pigment were developed. Materials that provide additional vision benefits would also be highly desirable.

SUMMARY OF THE INVENTION

The invention relates to ophthalmic devices that incorporate first light filtering compounds that absorb light in the 400 to 500 nm wavelength range and possess absorption spectra that substantially mimic the absorption properties of macular pigment. Such compounds are also photostable, for instance when measured for changes/loss of absorption characteristics upon exposure to conditions analogous to those described in ICH Q1B. In addition, compounds may exhibit a high extinction coefficient at desired wavelengths in the 400 to 500 nm range and may therefore be used in low concentrations to provide their light absorbing benefits. Further, the compounds are thermally stable. Ophthalmic devices incorporating the compounds as described herein may enhance the macular pigment optical density (MPOD) of wearers. In addition, the devices may mimic other visual benefits of macular pigment, such as improving photostress recovery time and disability glare contrast threshold, and reducing visual discomfort.

In addition to compounds mimicking the light absorption properties of macular pigment, ophthalmic devices described herein also contain a second light filtering compound. The second light filtering compound may filter other wavelengths in the visible spectrum, thereby providing additional visual benefits to the lens wearer.

Thus, ophthalmic devices as described herein may provide one or more benefits to wearers including, but not limited to, improved MPOD, which may help protect against age related macular degeneration; improved photostress recovery time; improved disability glare contrast threshold; reduced visual discomfort; improved color enhancement; and/or improved color perception.

Accordingly, in one aspect the invention provides an ophthalmic device that is a free radical reaction product of a reactive mixture comprising, consisting essentially of, or consisting of: one or more monomers suitable for making the ophthalmic device; a first visible light filtering compound, the first visible light filtering compound having a visible light absorption maximum between 430 and 480 nm and a full width half maximum (FWHM) at the visible light absorption maximum of at least 35 nm and up to 150 nanometers, wherein the compound is photostable, and wherein the compound has a molar extinction coefficient of at least 7740 $L \cdot mol^{-1} \cdot cm^{-1}$; and a second visible light filtering compound.

In a further aspect, the invention provides an ophthalmic device that is a free radical reaction product of a reactive mixture comprising, consisting essentially of, or consisting of: one or more monomers suitable for making the ophthalmic device; a first visible light filtering compound, the first visible light filtering compound having a visible light absorption maximum between 430 and 480 nm and a full width half maximum (FWHM) at the visible light absorption maximum of at least 35 nm and up to 150 nanometers, wherein the compound is photostable, and wherein the compound has a molar extinction coefficient of at least 7740 $L \cdot mol^{-1} \cdot cm^{-1}$; and a second visible light filtering compound, the second visible light filtering compound comprising, consisting essentially of, or consisting of: a medium energy visible light filter having one or more visible light absorption maxima between 550 nm and 660 nm.

In a still further aspect, the invention provides an ophthalmic device that is a free radical reaction product of a reactive mixture comprising, consisting essentially of, or consisting of: one or more monomers suitable for making the ophthalmic device; a first visible light filtering compound, the first visible light filtering compound having a visible light absorption maximum between 430 and 480 nm and a full width half maximum (FWHM) at the visible light absorption maximum of at least 35 nm and up to 150 nanometers, wherein the compound is photostable, and wherein the compound has a molar extinction coefficient of at least 7740 $L \cdot mol^{-1} \cdot cm^{-1}$; and a second visible light filtering compound, the second visible light filtering compound comprising, consisting essentially of, or consisting of: a high energy visible light filter that limits the transmittance of the device across a wavelength range of 400 to 409 nm to between 0 percent and 70 percent, preferably to between 0.2 percent and 40 percent.

In a yet further aspect, the invention provides an ophthalmic device that is a free radical reaction product of a reactive mixture comprising, consisting essentially of, or consisting of: one or more monomers suitable for making the ophthalmic device; a first visible light filtering compound, the first visible light filtering compound having a visible light absorption maximum between 430 and 480 nm and a full width half maximum (FWHM) at the visible light absorption maximum of at least 35 nm and up to 150 nanometers, wherein the compound is photostable, and wherein the compound has a molar extinction coefficient of at least 7740 $L \cdot mol^{-1} \cdot cm^{-1}$; and a second visible light filtering compound, the second visible light filtering compound comprising, consisting essentially of, or consisting of a mixture of: (a) a medium energy visible light filter having one or more visible light absorption maxima between 550 nm and 660 nm; and (b) a high energy visible light filter that limits the transmittance of the device across a wavelength range of 400 to 409 nm to between 0 percent and 70 percent.

DETAILED DESCRIPTION OF THE INVENTION

Figure 1:
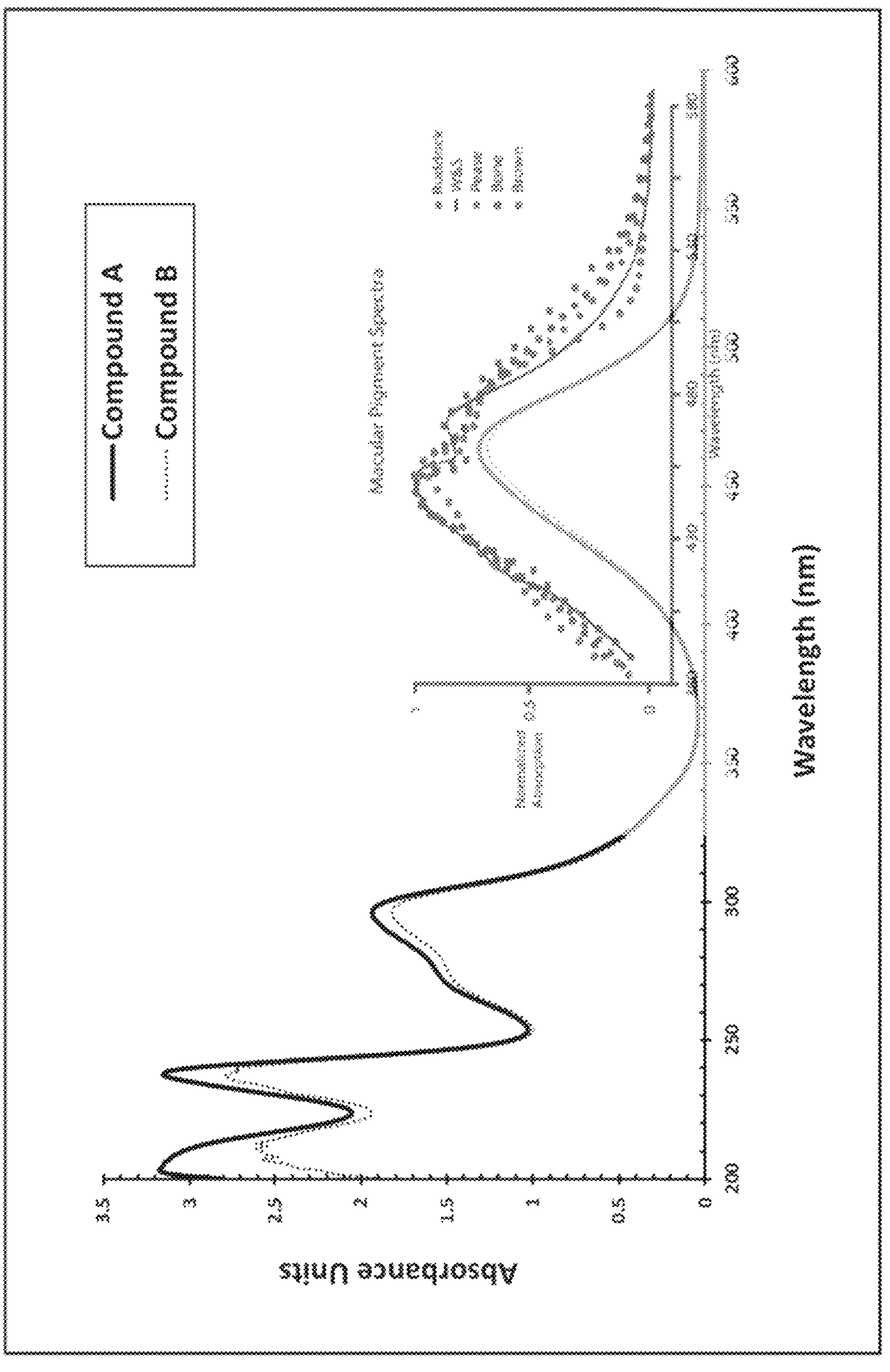
FIG. 1 shows UV-VIS absorbance spectra of 0.1 mM methanolic solutions of Compound A and Compound B of the invention, superimposed on the literature spectrum of macular pigment.

It is to be understood that the invention is not limited to the details of construction or process steps set forth in the following description. The invention is capable of other embodiments and of being practiced or being carried out in various ways using the teaching herein.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]n, is used to depict the number of repeating units in a polymer's chemical formula, the formula should be interpreted to represent the number average molecular weight of the macromolecule.

The term "individual" includes humans and vertebrates.

The term "biomedical device" refers to any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, and ophthalmic devices such as intraocular lenses and contact lenses. The biomedical devices may be ophthalmic devices, particularly contact lenses, most particularly contact lenses made from silicone hydrogels or conventional hydrogels.

The term "ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

The term "ophthalmic device" refers to any optical device relating to the eye and includes devices which resides in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include but are not limited to lenses, optical and ocular inserts, including but not limited to punctal plugs, and the like. "Lenses" include spectacle lenses, sunglass lenses, soft contact lenses, hard contact lenses, hybrid contact lenses, intraocular lenses, and overlay lenses. The ophthalmic device may comprise a contact lens.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

Spectacle lenses or sunglasses may be comprised of mineral material, for example based on silicate, or made from an organic material, such as polycarbonate; polyamide;

polyimide; polysulfones; polyethylene terephthalate/polycarbonate copolymers; and various other materials known in the art.

As used herein, the term "central zone" refers to the central part of a contact lens and may encompass the pupil region of the lens. The central zone may, for instance, have a diameter ranging from about 3 mm to about 12 mm, preferably from about 5 mm to about 11 mm, more preferably from about 7 mm to about 10 mm. By "peripheral zone" is meant the area of a contact lens circumferentially surrounding the central zone of the lens. The peripheral zone may extend up to the edge of the lens.

The biomedical devices, ophthalmic devices, and lenses of the present invention may be comprised of silicone hydrogels or conventional hydrogels. Silicone hydrogels typically contain at least one hydrophilic monomer and at least one silicone-containing component that are covalently bound to one another in the cured device.

"Target macromolecule" means the macromolecule being synthesized from the reactive monomer mixture comprising monomers, macromers, prepolymers, cross-linkers, initiators, additives, diluents, and the like.

The term "polymerizable compound" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, preferably free radical polymerization, for example a carbon-carbon double bond which can polymerize when subjected to radical polymerization initiation conditions. Non-limiting examples of polymerizable groups include (meth)acrylates, styryls, (meth)acrylamides, and vinyl groups. Preferably, the polymerizable group is selected from (meth)acrylate, (meth)acrylamide, N-vinyl lactam, N-vinylamide, vinyl carbonate, vinyl ether, vinyl carbamate, and styryl functional groups. More preferably, the polymerizable group is selected from (meth)acrylates and (meth)acrylamides. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "macromonomer" or "macromer" is a macromolecule that has one group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its mainchain. The difference between a monomer and a macromer is merely one of chemical structure, molecular weight, and molecular weight distribution of the pendent group. As a result, and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more polymerizable groups, essentially broadening the common definition of macromer to include prepolymers. As a result and as used herein, di-functional and multi-functional macromers, prepolymers, and crosslinkers may be used interchangeably.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that may swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N, N-dimethylacrylamide ("DMA") or vinyl acetate. U.S. Pat. Nos. 4,436,887, 4,495,313, 4,889,664, 5,006,622, 5,039,459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of suitable families of hydrophilic components that may be present in the reactive mixture include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof. Silicone-containing components are well known and have been extensively described in the patent literature. For instance, the silicone-containing component may comprise at least one polymerizable group (e.g., a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing), at least one siloxane group, and one or more linking groups (which may be a bond) connecting the polymerizable group(s) to the siloxane group(s). The silicone-containing components may, for instance, contain from 1 to 220 siloxane repeat units. The silicone-containing component may also contain at least one fluorine atom. Silicone hydrogel lenses may contain a coating, and the coating may be the same or different material from the substrate.

Examples of silicone hydrogels include acquafilcon, asmofilcon, balafilcon, comfilcon, delefilcon, lehfilcon, serafilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

"Reactive components" are the polymerizable compounds (such as monomers, macromers, oligomers, prepolymers, and cross-linkers) in the reactive mixture (defined below), as well as any other components in the reactive mixture which are intended to substantially remain in the resultant polymeric network after polymerization and all work-up steps (such as extraction steps) and packaging steps have been completed. Reactive components may be retained in the polymeric network by covalent bonding, hydrogen bonding, electrostatic interactions, the formation of interpenetrating polymeric networks, or any other means. Components that are intended to release from the polymeric network once it is in use are still considered "reactive components." For example, pharmaceutical or nutraceutical components in a contact lens which are intended to be released during wear are considered "reactive components." Components that are intended to be removed from the polymeric network during the manufacturing process (e.g., by extraction), such as diluents, are not "reactive components."

The terms "reactive mixture" and "reactive monomer mixture" refer to the mixture of components which are mixed together and, when subjected to polymerization conditions, result in formation of a polymeric network (such as conventional or silicone hydrogels) as well as biomedical devices, ophthalmic devices, and contact lenses made therefrom. The reactive mixture may comprise reactive components such as monomers, macromers, prepolymers, cross-linkers, and initiators, additives such as wetting agents, polymers, dyes, light absorbing compounds such as UV absorbers, pigments, photochromic compounds, pharmaceutical compounds, and/or nutraceutical compounds, any of which may be polymerizable or non-polymerizable but are capable of being retained within the resulting biomedical device (e.g., contact lens). The reactive mixture may also contain other components which are intended to be removed from the device prior to its use, such as diluents. It will be appreciated that a wide range of additives may be added based upon the contact lens which is made and its intended use. Concentrations of components of the reactive mixture are expressed as weight percentages of all reactive components in the reactive mixture, therefore excluding diluents. When diluents are used, their concentrations are expressed as weight percentages based upon the amount of all components in the reactive mixture (including the diluent).

The term "residue" as used in connection with a compound or monomer means the moiety from such compound or monomer that has been incorporated into at least a portion of a polymeric network following polymerization of the reactive monomer mixture.

The term "silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer content to transmit oxygen to the eye.

The term "multi-functional" refers to a component having two or more polymerizable groups. The term "mono-functional" refers to a component having one polymerizable group.

The terms "halogen" or "halo" indicate fluorine, chlorine, bromine, and iodine.

"Alkyl" refers to an optionally substituted linear or branched alkyl group containing the indicated number of carbon atoms. If no number is indicated, then alkyl (including any optional substituents on alkyl) may contain 1 to 16 carbon atoms. Preferably, the alkyl group contains 1 to 10 carbon atoms, alternatively 1 to 8 carbon atoms, alternatively 1 to 6 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, thioalkyl, carbamate, carbonate, halogen, phenyl, benzyl, and combinations thereof. "Alkylene" means a divalent alkyl group, such as $—CH_2—$, $—CH_2CH_2—$, $—CH_2CH_2CH_2—$, $—CH_2CH(CH_3)CH_2—$, and $—CH_2CH_2CH_2CH_2—$.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as $—CF_3—$ or $—CF_2CF_3—$. "Haloalkylene" means a divalent haloalkyl group, such as $—CH_2CF_2—$.

"Cycloalkyl" refers to an optionally substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, $C_3$-$C_7$ cycloalkyl, more preferably $C_4$-$C_7$ cycloalkyl, and still more preferably $C_5$-$C_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, thioalkyl, amido, carbamate, carbonate, halo, phenyl, benzyl, and combinations thereof.

"Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an optionally substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, thioalkyl, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Thioalkyl" means an alkyl group attached to the parent molecule through a sulfur bridge. Examples of thioalkyl groups include, for instance, methylthio, ethylthio, n-propylthio and iso-propylthio. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as $—CH_2CH_2NH—$.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., $—[Si—O]_n—$, where n is 2 or more). Each silicon atom in the siloxanyl group is substituted with independently selected $R^A$ groups (where $R^A$ is as defined in formula A options (b)-(i)) to complete their valence.

"Silyl" refers to a structure of formula $R_3Si—$ and "siloxy" refers to a structure of formula $R_3Si—O—$, where each R in silyl or siloxy is independently selected from trimethylsiloxy, $C_1$-$C_8$ alkyl (preferably $C_1$-$C_3$ alkyl, more preferably ethyl or methyl), and $C_3$-$C_8$ cycloalkyl.

"Alkyleneoxy" refers to groups of the general formula -(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—$[CH_2CH_2O]_p$— or $CH_3O$—$[CH_2CH_2O]_p$—). Examples of alkyleneoxy include polyethyleneoxy, polypropyleneoxy, polybutyleneoxy, and poly(ethyleneoxy-co-propyleneoxy).

"Oxaalkylene" refers to an alkylene group as defined above where one or more non-adjacent $CH_2$ groups have been substituted with an oxygen atom, such as —$CH_2CH_2OCH(CH_3)CH_2$—. "Thiaalkylene" refers to an alkylene group as defined above where one or more non-adjacent $CH_2$ groups have been substituted with a sulfur atom, such as —$CH_2CH_2SCH(CH_3)CH_2$—.

The term "linking group" refers to a moiety that links a polymerizable group to the parent molecule. The linking group may be any moiety that is compatible with the compound of which it is a part, and that does not undesirably interfere with the polymerization of the compound, is stable under the polymerization conditions as well as the conditions for the processing and storage of the final product. For instance, the linking group may be a bond, or it may comprise one or more alkylene, haloalkylene, amide, amine, alkyleneamine, carbamate, ester (—$CO_2$—), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —$OCF_2$—, —$OCF_2CF_2$—, —$OCF_2CH_2$—), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include $C_1$-$C_8$ alkylene (preferably $C_2$-$C_6$ alkylene), $C_1$-$C_8$ oxaalkylene (preferably $C_2$-$C_6$ oxaalkylene), $C_1$-$C_8$ thiaalkylene, $C_1$-$C_8$ alkylene-carboxylate-$C_1$-$C_8$ alkylene, $C_1$-$C_8$ alkylene-amide-$C_1$-$C_8$ alkylene, and $C_1$-$C_8$ alkylene-amine-$C_1$-$C_8$ alkylene, each of which is optionally substituted with 1 or 2 groups independently selected from hydroxyl and siloxy.

When the linking group is comprised of combinations of moieties as described above (e.g., alkylene and cycloalkylene), the moieties may be present in any order. For instance, if in Formula A below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg or Pg) to which the linking group is attached. For example, if in Formula A, L is indicated as being alkylene-cycloalkylene, then Rg-L is preferably Rg-alkylene-cycloalkylene-.

The term "electron withdrawing group" (EWG) refers to a chemical group which withdraws electron density from the atom or group of atoms to which the electron withdrawing group is attached. Examples of EWGs include, but are not limited to, cyano, amide, ester, keto, or aldehyde. A preferred EWG is cyano (CN).

The term "visible light absorbing compound" refers to a chemical material that absorbs light within the visible spectrum (e.g., in the 380 to 760 nm range). A "high energy radiation absorber," "UV/HEV absorber," or "high energy light absorbing compound" is a chemical material that absorbs various wavelengths of ultraviolet light, high energy visible light, or both. The term "medium energy visible light" means the wavelength range of about 460 nm to about 660 nm. A material's ability to absorb certain wavelengths of light can be determined by measuring its UV/Vis transmission or absorbance spectrum.

As used herein, if the amount of a device or material's light transmittance is indicated as a percentage across a particular wavelength range, it is to be understood that the device or material exhibits the percent transmittance at all wavelengths across that range.

When the compounds described herein contain olefinic double bonds or other centers of geometric asymmetry, and unless otherwise specified, it is intended that the compounds include the cis, trans, Z- and E-configurations. Likewise, all tautomeric and salt forms are also intended to be included.

The term "optional substituent" means that a hydrogen atom in the underlying moiety is optionally replaced by a substituent. Any substituent may be used that is sterically practical at the substitution site and is synthetically feasible. Identification of a suitable optional substituent is well within the capabilities of an ordinarily skilled artisan. Examples of an "optional substituent" include, without limitation, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R^5$, benzyl, $SO_3H$, $SO_3Na$, or —Y—$P_g$, wherein $R^4$ and $R^5$ are independently H or $C_1$-$C_6$ alkyl, Y is a linking group; and $P_g$ is a polymerizable group. The foregoing substituents may be optionally substituted by an optional substituent (which, unless otherwise indicated, is preferably not further substituted). For instance, alkyl may be substituted by halo (resulting, for instance, in $CF_3$).

"Visible light absorption maxima" refers to the one or more wavelengths within the visible light range (380 to 760 nm) at which there is a light absorbance peak. A material may exhibit multiple absorbance peaks within the visible light range, in which case the material has multiple visible light absorption maxima. For materials that exhibit multiple visible light absorption maxima, the peak showing the maximum absorbance among the multiple absorption maxima within the visible light range is referred to as the "visible light absorption maximum." The definitions encompass materials that exhibit an overall absorption maximum outside of the visible light range, such as within the UV region.

The terms "photostable," "photostability," or similar expressions mean that the compound (which may, when measured, be optionally embedded in an ophthalmic device, such as a hydrogel contact lens, and optionally measured either within or outside of a blister pack or a vial) exhibits a loss of absorbance at the visible light absorption maximum of no more than 20 percent after exposure to light under conditions such as those of the International Conference on Harmonisation (ICH) of Technical Requirements for Registration of Pharmaceuticals for Human Use guideline, Q1B Photostability Testing of New Drug Substances and Products, published on November 1996. Preferably, the exposure is conducted under the ICH Photostability Guideline using an Option 2 light source with an estimated illuminance exposure of $1.5192\times10^6$ Lux hours (168.8 hours exposure time) and an estimated ultraviolet irradiation exposure of 259.4 Watt hours/$m^2$ (16.2 hours exposure time), preferably in a photostability chamber that is controlled at 25° C./Amb RH. After exposure, the UV/Vis spectrum of the sample is collected and compared to a sample's spectrum prior to exposure. Changes are calculated relative to the visible light absorption maximum of the lens as observed prior to exposure. By way of example, if the absorbance at the visible light absorption maximum before exposure is 4 absorbance units, and is 2 absorbance units after exposure, then the loss of absorbance is 50 percent. In the invention, the loss of absorbance after photo exposure is preferably no more than 15 percent, or no more than 10 percent, or no more than 7 percent, or no more than 5 percent, or no more than 4 percent, or no more than 3 percent, or no more than 2 percent, or no more than 1 percent, or no more than 0.5 percent, or no more than 0.1 percent.

The term "more photostable than macular pigment" or similar expression means that the compound (which may, when tested, be optionally embedded in an ophthalmic device, such as a hydrogel contact lens, and optionally measured either within or outside of a blister pack) exhibits less loss of absorbance at the visible light absorption maximum than observed with macular pigment, following exposure to light, for instance under the ICH Photostability Guideline as described above.

The term full width half maximum (FWHM) means the width of the absorbance peak at half its maximum intensity.

The terms "thermally stable," "thermal stability," or similar expressions mean that the compound (which may, when measured, be optionally embedded in an ophthalmic device, such as a hydrogel contact lens, and optionally measured either within or outside of a blister pack or a vial) exhibits a loss of absorbance at the visible light absorption maximum of no more than 20 percent after exposure in a stability chamber at 89° C. for one month as described in the examples below. After exposure, the UV/Vis spectrum of the sample is collected and compared to a sample's spectrum prior to exposure. Changes are calculated relative to the visible light absorption maximum of the lens as observed prior to exposure. By way of example, if the absorbance at the visible light absorption maximum before exposure is 4 absorbance units, and is 2 absorbance units after exposure, then the loss of absorbance is 50 percent. In the invention, the loss of absorbance after thermal exposure is preferably no more than 20 percent, or no more than 15 percent, or no more than 12 percent, or no more than 10 percent, or no more than 5 percent, or no more than 4 percent, or no more than 3 percent, or no more than 2 percent, or no more than 1 percent, or no more than 0.5 percent, or no more than 0.1 percent.

The term "more thermally stable than macular pigment" or similar expression means that the compound (which may, when tested, be optionally embedded in an ophthalmic device, such as a hydrogel contact lens, and optionally measured either within or outside of a blister pack) exhibits less loss of absorbance at the visible light absorption maximum than observed with macular pigment, following thermal exposure as described above.

Unless otherwise indicated, ratios, percentages, parts, and the like are by weight.

Unless otherwise indicated, numeric ranges, for instance as in "from 2 to 10" or "between 2 and 10" are inclusive of the numbers defining the range (e.g., 2 and 10).

As noted above, in one aspect, the invention provides an ophthalmic device that is a free radical reaction product of a reactive mixture that contains a first visible light filtering compound and a second visible light filtering compound. First visible light filtering compounds for use in the invention substantially mimic the visible light absorption properties of macular pigment. The compounds are, however, more photostable than macular pigment and therefore, unlike macular pigment, are capable of being used in the manufacture of the ophthalmic device.

Thus, a first visible light filtering compound of the invention may have a visible light absorption maximum that is between 430 and 480 nm and a full width half maximum (FWHM) at the visible light absorption maximum of at least 35 nm and up to 150 nanometers. The compound may be photostable (e.g., when measured according to ICH guideline Q1B). The compound may be more photostable than macular pigment.

The first visible light filtering compound may have a visible light absorption maximum that is between 440 nm and 480 nm, or between 450 nm and 475 nm, or between 455 nm and 475 nm, or between 460 nm and 470 nm.

The first visible light filtering compound may exhibit a FWHM at the visible light absorption maximum of at least 35 nm, or at least 40 nm, or at least 45 nm, or at least 55 nm, or at least 60 nm. The first visible light filtering compound may exhibit a FWHM at the visible light absorption maximum of up to 125 nm, or up to 100 nm, or up to 95 nm, or up to 90 nm, or up to 85 nm, or up to 80 nm, or up to 75 nm, or up to 70 nm. The FWHM of the first visible light filtering compound, at the visible light absorption maximum, may be in the range of 35 nm to 150 nm, or 35 nm to 100 nm, or 45 nm to 90 nm, or 55 nm to 80 nm, or 60 nm to 75 nm, or 60 nm to 70 nm, or 62 to 67 nm.

The first visible light filtering compound of the invention may exhibit a molar extinction coefficient at the visible light absorption maximum of at least 5000, or at least 5500, or at least 6000, or at least 6500, or at least 7000, or at least 7500, or at least 7740, or at least 7800, or at least 8000, or at least 9000, or at least 10,000, or at least 11,000, or at least 12,000, or at least 12,500. Molar extinction coefficient is an intrinsic property of a material and may be calculated from absorbance data using the Beer-Lambert law. The unit is typically $L \cdot mol^{-1} \cdot cm^{-1}$.

The first visible light filtering compound of the invention may be a compound of formula I:

(I)

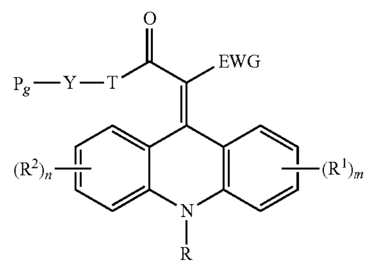

wherein m and n are independently 0, 1, 2, 3, or 4; T is a bond, 0, or $NR^6$, wherein $R^6$ is H, $C_1$-$C_6$ alkyl, cycloalkyl, heterocycloalkyl, aryl, heteroaryl, or Y—$P_g$; R is H, $C_1$-$C_8$ alkyl, cycloalkyl, heterocycloalkyl, aryl, or heteroaryl; Y is a linking group; $P_g$ is a polymerizable group; $R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, benzyl, $SO_3H$, or $SO_3M$ (M is a monovalent cation, such as sodium or potassium), wherein $R^3$ and $R^4$ are independently H or $C_1$-$C_6$ alkyl, or two adjacent $R^1$ or $R_2$ groups, together with the carbon atoms to which they are attached, combine to form a cycloalkyl or aryl ring; and EWG is an electron withdrawing group.

Compounds of formula I preferably contain one or two Y—$P_g$ groups. More preferably, the compounds contain one Y—$P_g$ group.

Compounds of formula I may include compounds of formula I-1, which are compounds of formula I wherein m and n are independently 0 or 1, or alternatively both are 0.

Compounds of formulae I and I-1 may include compounds of formula I-2, which are compounds of formula I or I-1 wherein n is 0 and m is 1.

Compounds of formulae I, I-1, and I-2 may include compounds of formula I-3, which are compounds of formula I, I-1, or I-2 wherein n is 0, m is 1, and $R^1$ is $C_1$-$C_6$ alkyl or $C_1$-$C_6$ alkoxy.

Compounds of formulae I, I-1, I-2, and I-3 may include compounds of formula I-4, which are compounds of formula I, I-1, I-2, or I-3 wherein R is H, or $C_1$-$C_8$ alkyl. Preferably, R is $C_1$-$C_6$ alkyl.

Compounds of formulae I, I-1, 1-2, 1-3 and I-4 may include compounds of formula I-5, which are compounds of formula I, I-1, 1-2, 1-3, or I-4 wherein T is $NR^6$, and $R^6$ is H or $C_1$-$C_6$ alkyl. Preferably, $R^6$ is H.

Compounds of formulae I, I-1, I-2, I-3, I-4, and I-5 may include compounds of formula I-6, which are compounds of formula I, I-1, I-2, I-3, I-4, or I-5 wherein $P_g$ (a polymerizable group) at each occurrence is independently styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components generally used in making polymeric devices. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

Compounds of formulae I, I-1, I-2, I-3, I-4, I-5, and I-6 may include compounds of formula I-7, which are compounds of formula I, I-1, I-2, I-3, I-4, I-5, and I-6 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene ($—CH_2CH_2—$). When T in the compound of formula I is O, it is preferred that the carbon atom of the linking group to which the O is attached be hindered. For instance, if T is O and Y is alkylene, a preferred alkylene is $—C(R^H)_2(CH_2)_x—$, where $R^H$ is independently $C_1$-$C_6$ alkyl (preferably independently methyl or ethyl) and x is from 1 to 5.

Compounds of formulae I, I-1, I-2, I-3, I-4, I-5, I-6, and I-7 may include compounds of formula I-8, which are compounds of formula I, I-1, I-2, I-3, I-4, I-5, I-6, or I-7 wherein T is a bond or is $NR^6$ (preferably NH).

Compounds of formulae I, I-1, I-2, I-3, I-4, I-5, I-6, I-7, and I-8 may include compounds of formula I-9, which are compounds of formula I, I-1, I-2, I-3, I-4, I-5, I-6, I-7, or I-8, wherein EWG is cyano, amide, ester, keto, or aldehyde. Preferably, EWG is cyano.

First visible light filtering compounds of the invention may be of formula I-A:

(I-A)

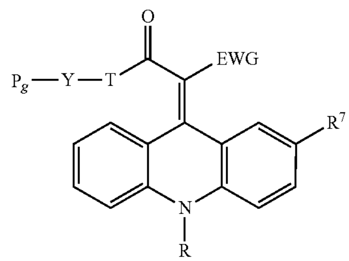

wherein:

T is a bond, O, or $NR^6$, wherein $R^6$ is H, $C_1$-$C_6$ alkyl, cycloalkyl, heterocycloalkyl, aryl, or heteroaryl;

R is H, $C_1$-$C_8$ alkyl, cycloalkyl, heterocycloalkyl, aryl, or heteroaryl;

Y is a linking group;

$P_g$ is a polymerizable group;

$R^7$ is H, $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, benzyl, $SO_3H$, or $SO_3M$ (M is a monovalent cation, such as sodium or potassium), wherein $R^3$ and $R^4$ are independently H or $C_1$-$C_6$ alkyl; and EWG is an electron withdrawing group.

Compounds of formula I-A may include compounds of formula I-A-1, which are compounds of formula I-A wherein $R^7$ is H.

Compounds of formulae I-A may include compounds of formula I-A-2, which are compounds of formula I-A wherein $R^7$ is $C_1$-$C_6$ alkyl, $C_1$-$C_6$ alkoxy, or $C_1$-$C_6$ thioalkyl.

Compounds of formulae I-A and I-A-2 may include compounds of formula I-A-3, which are compounds of formula I-A or I-A-2 wherein $R^7$ is $C_1$-$C_6$ alkoxy, such as ethoxy or methoxy, preferably methoxy.

Compounds of formulae I-A, I-A-1, I-A-2, and I-A-3 may include compounds of formula I-A-4, which are compounds of formula I-A, I-A-1, I-A-2, or I-A-3 wherein R is H, or $C_1$-$C_8$ alkyl. Preferably, R is $C_1$-$C_6$ alkyl, such as methyl, ethyl, n-propyl, iso-propyl, n-butyl, t-butyl, or sec-butyl. Preferably, R is n-propyl or n-butyl.

Compounds of formulae I-A, I-A-1, I-A-2, I-A-3 and I-A-4 may include compounds of formula I-A-5, which are compounds of formula I-A, I-A-1, I-A-2, I-A-3, or I-A-4 wherein T is $NR^6$, and $R^6$ is H, or $C_1$-$C_6$ alkyl. Preferably, $R^6$ is H.

Compounds of formulae I-A, I-A-1, I-A-2, I-A-3, I-A-4, and I-A-5 may include compounds of formula I-A-6, which are compounds of formula I-A, I-A-1, I-A-2, I-A-3, I-A-4, or I-A-5 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. Preferred polymerizable groups include (meth)acrylate or (meth)acrylamide. A more preferred polymerizable group is methacrylate.

Compounds of formulae I-A, I-A-1, I-A-2, I-A-3, I-A-4, I-A-5, and I-A-6 may include compounds of formula I-A-7, which are compounds of formula I-A, I-A-1, I-A-2, I-A-3, I-A-4, I-A-5, and I-A-6 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene (—$CH_2CH_2$—). When T in the compound of formula I-A is O, it is preferred that the carbon atom of the linking group to which the O is attached be hindered. For instance, if T is O and Y is alkylene, a preferred alkylene is —$C(R^H)_2(CH_2)_x$—, where $R^H$ is independently $C_1$-$C_6$ alkyl (preferably independently methyl or ethyl) and x is from 1 to 5.

Compounds of formulae I-A, I-A-1, I-A-2, I-A-3, I-A-4, I-A-5, I-A-6, and I-A-7 may include compounds of formula I-A-8, which are compounds of formula I-A, I-A-1, I-A-2, I-A-3, I-A-4, I-A-5, I-A-6, or I-A-7 wherein T is a bond or is $NR^6$ (preferably NH).

Compounds of formulae I-A, I-A-1, I-A-2, I-A-3, I-A-4, I-A-5, I-A-6, I-A-7, and I-A-8 may include compounds of formula I-A-9, which are compounds of formula I-A, I-A-1, I-A-2, I-A-3, I-A-4, I-A-5, I-A-6, I-A-7, or I-A-8, wherein EWG is cyano, amide, ester, keto, or aldehyde. Preferably, EWG is cyano.

Specific examples of first visible light filtering compounds of the invention are shown in Table A.

TABLE A

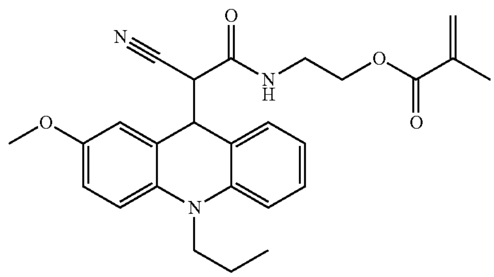

2-(2-cyano-2-(2-methoxy-10-propylacridin-9(10H)-ylidene)acetamido)ethyl methacrylate

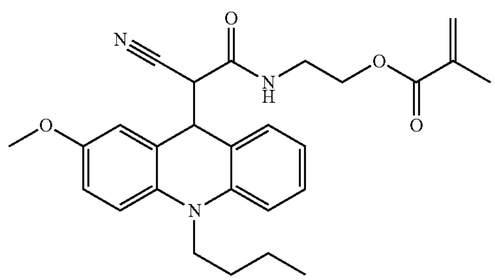

2-(2-cyano-2-(2-methoxy-10-butylacridin-9(10H)-ylidene)acetamido)ethyl methacrylate

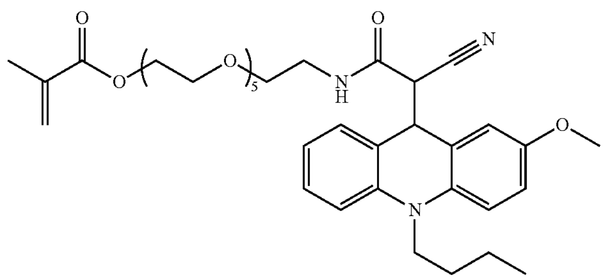

1-(10-butyl-2-methoxyacridin-9(10H)-ylidene)-1-cyano-2-oxo-6,9,12,15,18-pentaoxa-3-azaicosan-20-yl methacrylate Compounds of formula I may be prepared as described in pre-grant publication US20220194944A1. For instance, the compounds may be prepared from N-substituted acridones by utilizing triphenylphosphine dibromide. Triphenylphosphine dibromide maybe generated "in-situ" by the addition of bromine to triphenylphosphine in an appropriate solvent. Addition of an N-substituted acridone after the complete consumption of bromine avoids potential oxidation of the former and forms the desired product in high yields with significantly reduced byproduct formation. An exemplary synthesis for compounds of formula I is shown in Scheme A.

limit the transmittance of the device to between 50 percent and 95 percent across a wavelength range of 550 nm to 660 nm.

Preferably the medium energy visible light filter, when incorporated into the ophthalmic device, limits the transmittance of the device to between 60 percent and 85 percent, across a wavelength range of 575 nm to 650 nm.

The medium energy visible light filter may contain at least one polymerizable group.

The medium energy visible light filter may be a compound of formula II.

Scheme A

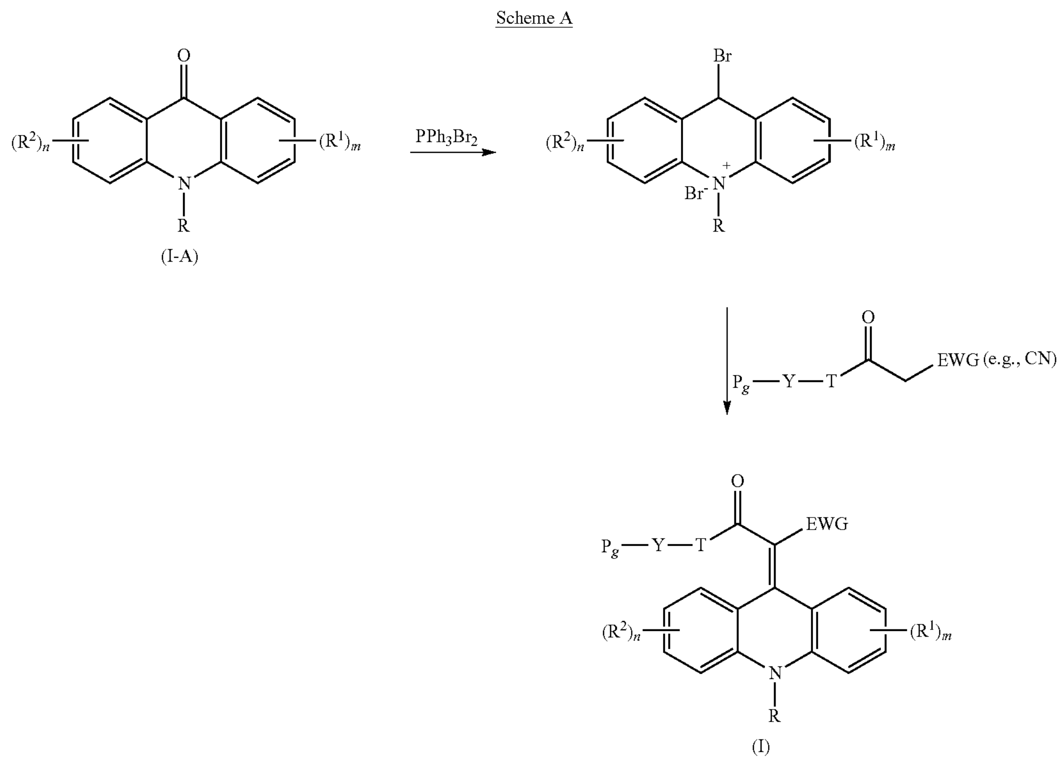

(I-A)

(I)

The reactive mixture from which the ophthalmic devices of the invention are prepared contains, in addition to a first visible light filtering compound, a second visible light filtering compound.

The second visible light filtering compound may comprise a medium energy visible light filter having one or more visible light absorption maxima between 550 nm and 660 nm, or between 575 nm and 660 nm.

The medium energy visible light filter may have a first visible light absorption maxima between 610 nm and 660 nm, preferably between 630 nm and 650 nm. The first visible light absorption maxima of the second visible light filtering compound may optionally have a FWHM of at least 20 nm and up to 60 nm or optionally at least 30 nm and up to 50 nm.

The medium energy visible light filter may optionally have a second visible light absorption maxima centered between 575 nm and 609 nm, preferably centered between 580 nm and 600 nm. The second visible light absorption maxima may optionally have a FWHM from at least 60 nm and up to 120 nm or optionally from at least 80 nm and up to 100 nm.

The medium energy visible light filter, when incorporated into the ophthalmic device of the invention, may serve to (II)

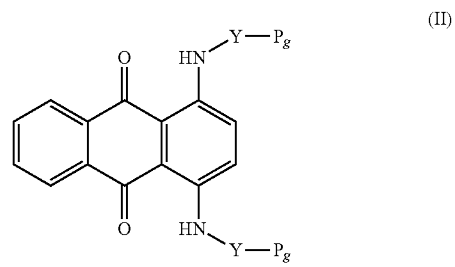

wherein Y at each occurrence is independently a linking group and $P_g$ at each occurrence is independently a polymerizable group.

Compounds of formula II may include compounds of formula II-1, which are compounds of formula II wherein Y at each occurrence is independently alkylene, cycloalkylene, heterocycloalkylene, arylene, heteroarylene, oxaalkylene, alkylene-amide-alkylene, alkylene-amine-alkylene, or combinations thereof.

Compounds of formulae II and II-1 may include compounds of formula II-2, which are compounds of formula II or II-1 wherein $P_g$ at each occurrence independently comprises styryl, vinyl carbonate, vinyl ether, vinyl carbamate, N-vinyl lactam, N-vinylamide, (meth)acrylate, or (meth) acrylamide. Preferably, $P_g$ at each occurrence comprises (meth)acrylate, more preferably methacrylate.

The medium energy visible light filter may comprise 1,4-bis[2-methacryloxyethylamino]-9,10-anthraquinone, (9,10-dioxo-9,10-dihydroanthracene-1,4-diyl)bis (azanediyl)) bis(ethane-2,1-diyl))bis(oxy))bis(ethane-2,1-diyl))bis(oxy))bis(ethane-2,1-diyl) bis(2-methyl acrylate), or N, N'-(((((((9,10-dioxo-9,10-dihydroanthracene-1,4-diyl) bis(azanediyl)) bis(ethane-2,1-diyl))bis(oxy))bis(ethane-2, 1-diyl))bis(oxy))bis(ethane-2,1-diyl))diacrylamide.

Medium energy visible light filtering compounds are commercially available and/or they may be readily prepared by those skilled in the art, for instance as described in U.S. Pat. No. 4,997,897, which is incorporated herein by reference in its entirety.

The second visible light filtering compound may alternatively (or in addition) comprise a high energy visible light filter that limits the transmittance of the device across a wavelength range of 400 to 409 nm to between 0 percent and 70 percent, or between 0.2 and 70 percent, or between 0.5 and 70 percent, or between 1 and 70 percent. The high energy visible light filter may limit the transmittance of the device across the 400 to 409 nm wavelength range to 0 percent, or at least 0.2 percent, or at least 0.5 percent, or at least 1 percent, or at least 2 percent, or at least 3 percent, or at least 4 percent and up to 60 percent, or up to 50 percent, or up to 40 percent, or up to 30 percent, or up 20 percent, or up to 15 percent or up to 10 percent. The high energy visible light filter may limit the transmittance of the device across the 400 to 409 nm wavelength range to between 0 percent and 40 percent, or between 0.2 percent and 35 percent, or between 2 percent and 30 percent, or between 4 percent and 25 percent, or between 5 percent and 20 percent, or between 0.2 percent and 20 percent.

The high energy visible light filter may contain at least one polymerizable group.

The high energy visible light filter may be a compound of formula III:

(III)

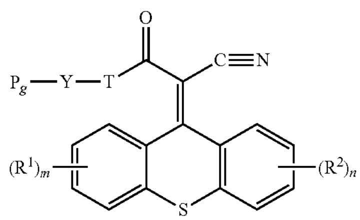

wherein:

m and n are independently 0, 1, 2, 3, or 4;

T is a bond, O, or NR;

Y is a linking group;

$P_g$ is a polymerizable group;

R at each occurrence is independently H, $C_1$-$C_6$ alkyl, cycloalkyl, heterocycloalkyl, aryl, heteroaryl, or Y—$P_g$; and $R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R_2$ groups, together with the carbon atoms to which they are attached, combine to form a cycloalkyl or aryl ring.

Compounds of formula III preferably contain one or two Y—$P_g$ groups. More preferably, the compounds contain one Y—$P_g$ group.

Compounds of formula III may include compounds of formula III-1, which are compounds of formula III wherein m and n are independently 0 or 1, or alternatively both are 0.

Compounds of formulae III and III-1 may include compounds of formula III-2, which are compounds of formula III, or III-1 wherein m is 1 and $R^1$ is $C_1$-$C_6$ alkyl, preferably ethyl or methyl.

Compounds of formulae III, III-1, and III-2 may include compounds of formula III-3, which are compounds of formula III, III-1, or III-2 wherein n is 1 and $R^2$ is $C_1$-$C_6$ alkyl, preferably ethyl or methyl.

Compounds of formulae III, III-1, III-2, and III-3 may include compounds of formula III-4, which are compounds of formula III, III-1, III-2, or III-3 wherein R is H, or $C_1$-$C_6$ alkyl. Preferably, R in the group T is H.

Compounds of formulae III, III-1, III-2, III-3, and III-4 may include compounds of formula III-5, which are compounds of formula III, III-1, III-2, III-3, or III-4 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components generally used in making contact lenses. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

Compounds of formulae III, III-1, III-2, III-3, III-4, and III-5 may include compounds of formula III-6, which are compounds of formula III, III-1, III-2, III-3, III-4, or III-5 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene (—$CH_2CH_2$—). When T in the compound of formula III is O, it is preferred that the carbon atom of the linking group to which the O is attached be hindered. For instance, if T is O and Y is alkylene, a preferred alkylene is —$C(R^H)_2(CH_2)_x$—, where $R^H$ is independently $C_1$-$C_6$ alkyl (preferably independently methyl or ethyl) and x is from 1 to 5.

Compounds of formulae III, III-1, III-2, III-3, III-4, III-5, and III-6 may include compounds of formula III-7, which are compounds of formula III, III-1, III-2, III-3, III-4, III-5, or III-6 wherein T is a bond or is NR (preferably NH).

Compounds of formula III may include compounds of formula III-A:

(III-A)

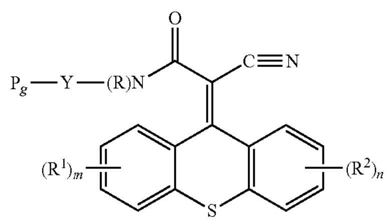

wherein:

m and n are independently 0, 1, 2, 3, or 4;

Y is a linking group;

$P_g$ is a polymerizable group;

R at each occurrence is independently H, $C_1$-$C_6$ alkyl, cycloalkyl, heterocycloalkyl, aryl, heteroaryl, or Y—$P_g$; and $R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring.

Compounds of formula II preferably contain one or two Y—$P_g$ groups. More preferably, the compounds contain one Y—$P_g$ group.

Compounds of formulae III-A may include compounds of formula III-A-1, which are compounds of formula III-A wherein m and n are independently 0 or 1, or alternatively both are 0.

Compounds of formulae III-A, and III-A-1 may include compounds of formula III-A-2, which are compounds of formula III-A, or III-A-1 wherein m is 1 and $R^1$ is $C_1$-$C_6$ alkyl, preferably ethyl or methyl.

Compounds of formulae III-A, III-A-1, and III-A-2 may include compounds of formula III-A-3, which are compounds of formula III-A, III-A-1, or III-A-2 wherein n is 1 and $R^2$ is $C_1$-$C_6$ alkyl, preferably ethyl or methyl.

Compounds of formulae III-A, III-A-1, III-A-2, and III-A-3 may include compounds of formula III-A-4, which are compounds of formula III-A, III-A-1, III-A-2, or III-A-3 wherein R at each occurrence is independently H, or $C_1$-$C_6$ alkyl. Preferably, R at each occurrence is H. Preferably R in the group T is H.

Compounds of formulae III-A, III-A-1, III-A-2, III-A-3, and III-A-4 may include compounds of formula III-A-5, which are compounds of formula III-A, III-A-1, III-A-2, III-A-3, or III-A-4 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components generally used in making polymeric devices. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

Compounds of formulae III-A, III-A-1, III-A-2, III-A-3, III-A-4, and III-A-5 may include compounds of formula III-A-6, which are compounds of formula III-A, III-A-1, III-A-2, III-A-3, III-A-4, or III-A-5 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene (—$CH_2CH_2$—).

Specific examples of compounds of formula I include, but are not limited to, the compounds shown in Table B.

TABLE B

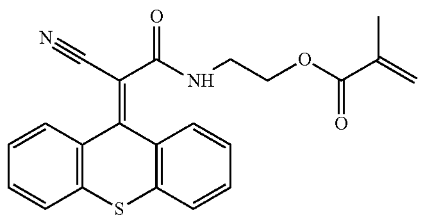

2-(2-cyano-2-(9H-thioxanthen-9-ylidene)acetamido)ethyl methacrylate

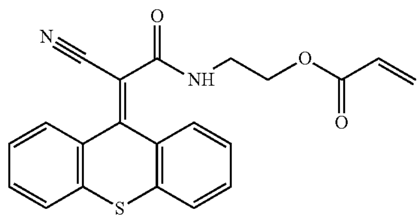

2-(2-cyano-2-(9H-thioxanthen-9-ylidene)acetamido)ethyl acrylate

TABLE B-continued

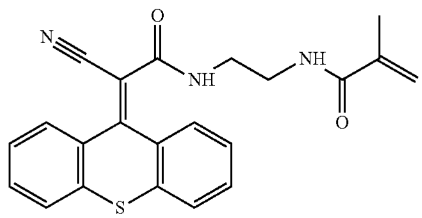

N-(2-(2-cyano-2-(9H-thioxanthen-9-ylidene)acetamido)ethyl)methacrylamide

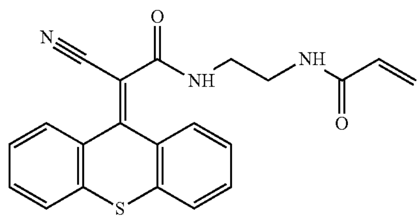

N-(2-(2-cyano-2-(9H-thioxanthen-9-ylidene)acetamido)ethyl)acrylamide

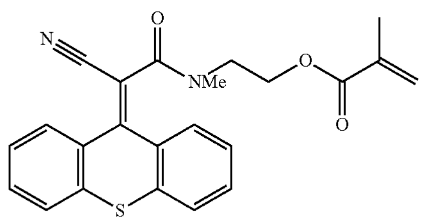

2-(2-cyano-N-methyl-2-(9H-thioxanthen-9-ylidene)acetamido)ethyl methacrylate

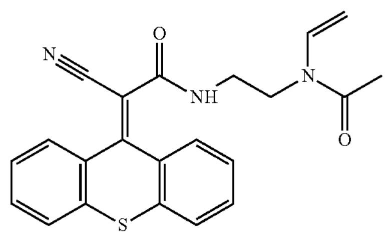

2-cyano-2-(9H-thioxanthen-9-ylidene)-N-(2-(N-vinylacetamido)ethyl)acetamide

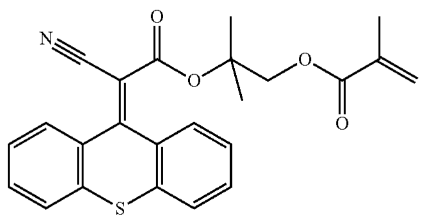

2-(2-cyano-2-(9H-thioxanthen-9-ylidene)acetamido)-2-methylpropyl methacrylate

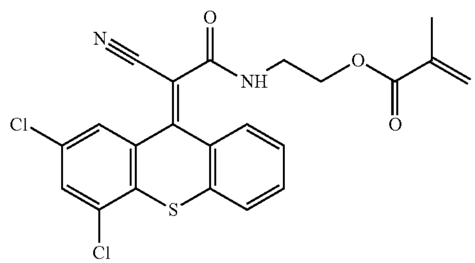

2-(2-cyano-2-(2,4-dichloro-9H-thioxanthen-9-ylidene)acetamido)ethyl methacrylate TABLE B-continued
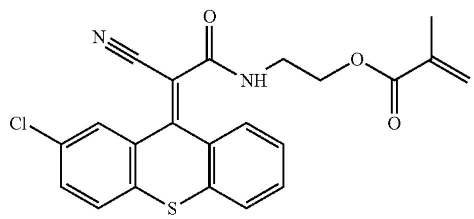
2-(2-(2-chloro-9H-thioxanthen-9-ylidene)-2-cyanoacetamido)ethyl methacrylate
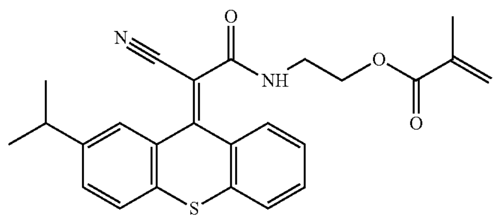
2-(2-cyano-2-(2-isopropyl-9H-thioxanthen-9-ylidene)acetamido)ethyl methacrylate
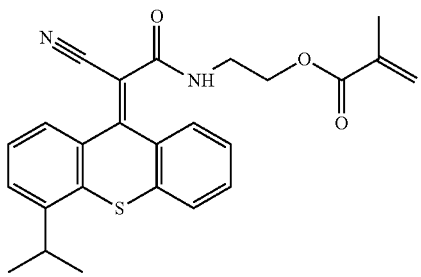
2-(2-cyano-2-(4-isopropyl-9H-thioxanthen-9-ylidene)acetamido)ethyl methacrylate
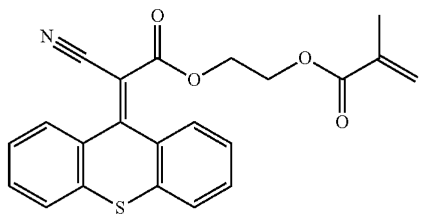
2-(2-cyano-2-(9H-thioxanthen-9-ylidene)acetoxy)ethyl methacrylate
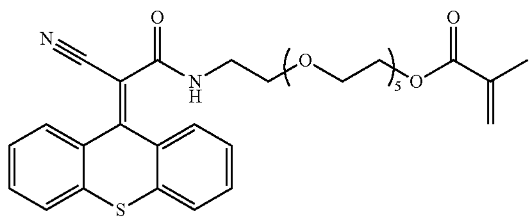
1-cyano-2-oxo-1-(9H-thioxanthen-9-ylidene)-6,9,12,15,18-pentaoxa-3-azaicosan-20-yl methacrylate Compounds of formula III may be readily prepared by those skilled in the art, for instance as described in US20210061934, which is incorporated by reference herein in its entirety.

The high energy visible light filter may be a compound of formula IV:

(IV)

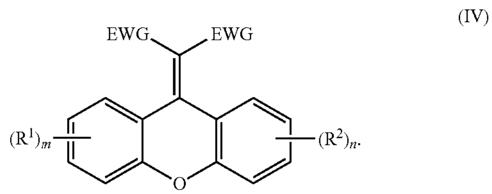

wherein m and n are independently 0, 1, 2, 3, or 4; $R^1$ and $R^2$ are independently at each occurrence H, an optional substituent, or —Y—$P_g$, or two adjacent $R^1$ or $R^2$ groups, together with the atoms to which they are attached, combine to form a cycloalkyl or aryl ring optionally substituted with —Y—$P_g$; and EWG at each occurrence is independently an electron withdrawing group; $P_g$ at each occurrence is independently a polymerizable group; Y at each occurrence is independently a linking group; wherein the compound of formula IV contains at least one $P_g$ group.

Compounds of formula IV may include compounds of formula IV-1, which are compounds of formula IV wherein m and n are independently 0 or 1, or alternatively one is 0 and the other is 1.

Compounds of formulae IV and IV-1 may include compounds of formula IV-2, which are compounds of formula IV or IV-1 wherein $R^1$ is H, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R_5$, benzyl, $SO_3H$, or $SO_3Na$, wherein $R^4$ and $R^5$ are independently H or $C_1$-$C_6$ alkyl.

Compounds of formulae IV, IV-1, and IV-2 may include compounds of formula IV-3, which are compounds of formula IV, IV-1, or IV-2 wherein $R^2$ is —Y—$P_g$.

Compounds of formulae IV, IV-1, IV-2, and IV-3 may include compounds of formula IV-4, which are compounds of formula IV, IV-1, IV-2, or IV-3 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components which may be used in making polymeric devices. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

Compounds of formulae IV, IV-1, IV-2, IV-3, and IV-4 may include compounds of formula IV-5, which are compounds of formula IV, IV-1, IV-2, IV-3, or IV-4 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is oxa-$C_1$-$C_8$ alkylene, especially oxapropylene (—O—$CH_2CH_2CH_2$—).

Compounds of formulae IV, IV-1, IV-2, IV-3, IV-4, and IV-5 may include compounds of formula IV-6, which are compounds of formula IV, IV-1, IV-2, IV-3, IV-4, or IV-5 wherein EWG at each occurrence is independently cyano, amide, ester, keto, or aldehyde. Preferably EWG at each occurrence is cyano.

Compounds of formulae IV, IV-1, IV-2, IV-3, IV-4, IV-5, and IV-6 may include compounds of formula IV-7, which are compounds of formula IV, IV-1, IV-2, IV-3, IV-4, IV-5, or IV-6 wherein the compound contains one Y—$P_g$ group.

Compounds of formulae IV, IV-1, IV-2, IV-3, IV-4, IV-5, IV-6, and IV-7 may include compounds of formula IV-8, which are compounds of formula IV, IV-1, IV-2, IV-3, IV-4, IV-5, IV-6, IV-7 wherein m is 0 and $R^2$ is —Y—$P_g$.

Specific examples of compounds of formula IV include, but are not limited to:

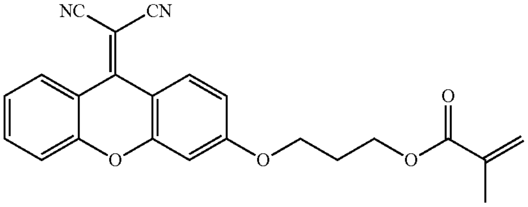

;

3-((9-(dicyanomethylene)-9H-xanthen-3-yl)oxy)propyl methacrylate

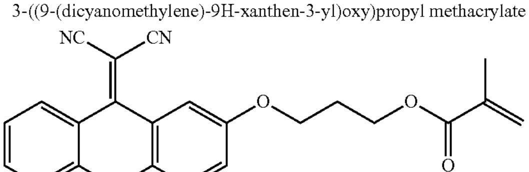

;

3-((9-(dicyanomethylene)-9H-xanthen-2-yl)oxy)propyl methacrylate

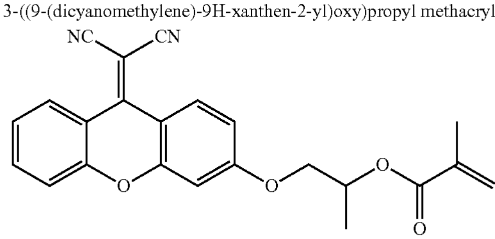

;

1-((9-(dicyanomethylene)-9H-xanthen-3-yl)oxy)propyl-2-yl methacrylate

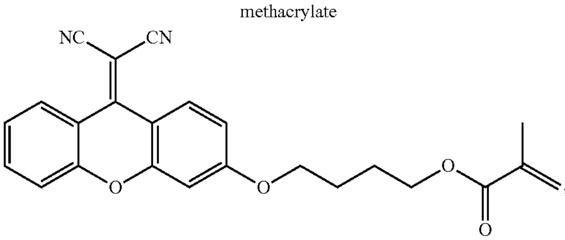

;

4-((9-(dicyanomethylene)-9H-xanthen-3-yl)oxy)butyl methacrylate

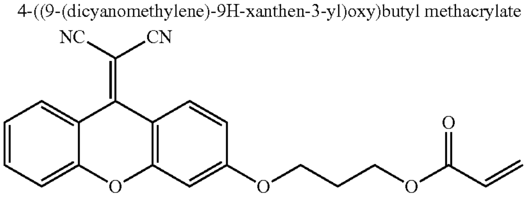

;

3-((9-(dicyanomethylene)-9H-xanthen-3-yl)oxy)propyl actylate

-continued

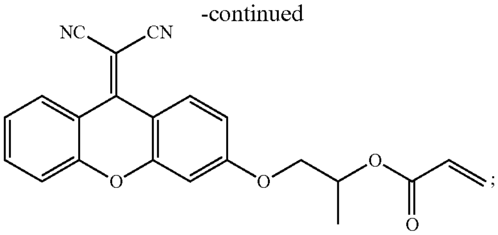

1-((9-(dicyanomethylene)-9H-xanthen-3-yl)oxy) propan-2-yl acrylate

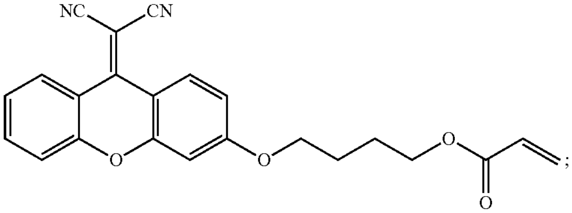

4-((9-(dicyanomethylene)-9H-xanthen-3-yl)oxy)butyl acrylate

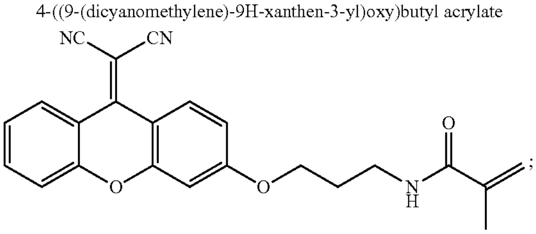

N-(3-((9-(dicyanomethylene)-9H-xanthen-3-yl)oxy) propyl)methacrylamide

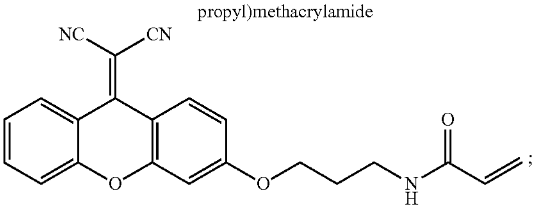

or

N-(3-((9-(dicyanomethylene)-9H-xanthen-3-yl)oxy) propyl)acrylamide

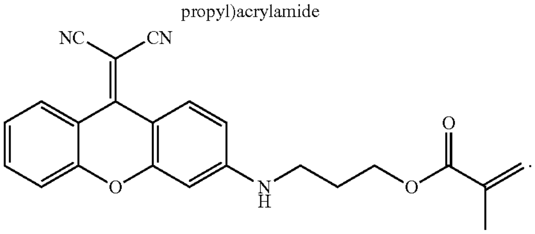

3-((9-(dicyanomethylene)-9H-xanthen-3-yl)amino) propyl methacrylate

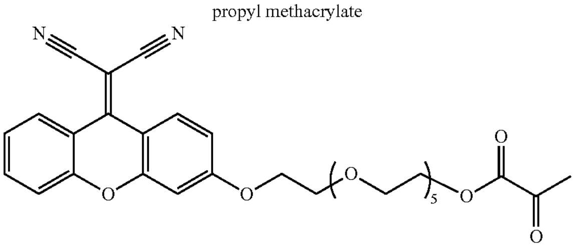

17-((9-(dicyanomethylene)-9H-xanthen-3-yl)oxy)-3,6,9,12,15-pentaoxaheptadecyl methacrylate Compounds of formula IV may exhibit a molar extinction coefficient at the visible light absorption maximum of at least 5000, or at least 7500, or at least 10,000, or at least 12,500, or at least 15,000, or at least 17,500, or at least 19,000. Molar extinction coefficient is an intrinsic property of a material and may be calculated from absorbance data using the Beer-Lambert law. The unit is typically $L\cdot mol^{-1}\cdot cm^{-1}$.

Compounds of formula IV may be readily prepared by those skilled in the art, for instance as described in US20200407324 and in U.S. provisional patent application No. 63/265,706, filed Dec. 20, 2021, each of which is incorporated herein by reference in its entirety.

High energy visible (11EV) light absorbing filters for use in the invention, including those of formula III and formula IV, are preferably photostable. Thus devices of the invention, such as contact lenses, which contain a high energy visible light filter as the second visible light filtering compound preferably exhibit 20% o or less, alternatively 1500 or less, alternatively 10% or less, alternatively 7% or less, alternatively 5% or less, or alternatively 2% or less of change in their average transmission over a wavelength range of 380 to 450 nm, following exposure under ICH Q1B conditions.

As noted above, the reactive mixture from which the ophthalmic devices of the invention are prepared contains, in addition to a first visible light filtering compound, a second visible light filtering compound. The second light filtering compound may comprise a mixture of a medium energy visible light filter as described above and a high energy visible light filter, as described above. Thus the second visible light filtering compound may comprise a mixture of: (a) a medium energy visible light filter having one or more visible light absorption maxima between nm and 660 nm; and (b) a high energy visible light filter that limits the transmittance of the device across a wavelength range of 400 to 409 nm to between 0 percent and 70 percent. The second visible light filtering compound may be a mixture of a compound of formula II and a compound of formula III, or a mixture of a compound of formula II and a compound of formula IV, or a mixture of a compound of formula II, and a compound of formula III, and a compound of formula IV.

Other light absorbing compounds may be included in the reactive mixture from which the ophthalmic devices of the invention are prepared in order to provide additional desirable absorption characteristics. For example, preferred reactive mixtures may comprise a first visible light filtering compound and a second visible light filtering compound as described above together with a UV absorbing compound. Suitable UV absorbing compounds are known in the art and fall into several classes which include, but are not limited to, benzophenones, benzotriazoles, triazines, substituted acrylonitriles, salicyclic acid derivatives, benzoic acid derivatives, cinnamic acid derivatives, chalcone derivatives, dypnone derivatives, crotonic acid derivatives, or any mixtures thereof. A preferred class of UV absorbing compound is benzotriazoles, such as Norbloc (2-(2'-hydroxy-5-methacrylyloxyethylphenyl)-2H-benzotriazole).

An ophthalmic device of the invention may transmit 10 percent or less, or 5 percent or less, or 1 percent or less, or less than 1 percent, of light across a wavelength range of 200 to 279 nm.

An ophthalmic device of the invention may transmit 45 percent or less, or 35 percent or less, or 25 percent or less, or 20 percent or less, or 10 percent or less, or 5 percent or less, or 1 percent or less of light across a wavelength range of 280 to 399 nm.

An ophthalmic device of the invention may transmit between 0 percent and 70 percent, or between 0.2 and 70 percent, across a wavelength range of 400 to 409 nm. The transmittance of the device across the 400 to 409 nm wavelength range may be at least at least 0.2 percent, or at least 2 percent, or at least 3 percent, or at least 4 percent and up to 60 percent, or up to 50 percent, or up to 40 percent, or up to 30 percent, or up 20 percent. The transmittance of the device across the 400 to 409 nm wavelength range may be between 0 percent and 40 percent, or between 0.2 percent and 40 percent, or between 2 percent and 30 percent, or between 4 percent and 25 percent, or between 5 percent and 20 percent, or between 0.1 percent and 20 percent.

An ophthalmic device of the invention may transmit at least 10 percent, or at least 15 percent, or at least 20 percent, and up to 80 percent, or up to 70 percent, or up to 65 percent, across a wavelength range of 410 to 429 nm. The transmittance of the device across the 410 to nm wavelength range may be between 10 percent and 75 percent, or between 15 percent and percent, or between 20 percent and 65 percent.

An ophthalmic device of the invention may transmit at least 55 percent, or at least 60 percent, and up to 85 percent, or up to 80 percent, across a wavelength range of 430 to 480 nm. The transmittance of the device across the 430 to 480 nm wavelength range may be between 55 percent and 85 percent, or between 60 percent and 80 percent.

An ophthalmic device of the invention may transmit at least 65 percent, or at least 70 percent, and up to 98 percent, or up to 95 percent, across a wavelength range of 481 to 574 nm. The transmittance of the device across the 481 to 574 nm wavelength range may be between 70 percent and 98 percent, or between 75 percent and 95 percent.

An ophthalmic device of the invention may transmit at least 50 percent, or at least 60 percent, or at least 70 percent, or at least 75 percent, and up to 95 percent, or up to 90 percent, or up to 85 percent, across a wavelength range of 550 to 660 nm. The transmittance of the device across the 550 to 660 nm wavelength range may be between 50 percent and 95 percent, or between 60 percent and 90 percent, or between 70 percent and 90 percent.

An ophthalmic device of the invention may transmit at least 50 percent, or at least 60 percent, or at least 70 percent, or at least 75 percent, and up to 90 percent, or up to 85 percent, across a wavelength range of 575 to 650 nm. The transmittance of the device across the 575 to nm wavelength range may be between 50 percent and 90 percent, or between 60 percent and percent, or between 70 percent and 85 percent.

An ophthalmic device of the invention may transmit at least 80 percent and up to 97 percent, across a wavelength range of 651 to 666 nm.

An ophthalmic device of the invention may transmit at least 90 percent across a wavelength range of 667 to 760 nm.

An ophthalmic device of the invention is preferably photostable. For instance, the device, such as a contact lens, preferably exhibits 20% or less, alternatively 15% or less, alternatively 10% or less, alternatively 7% or less, alternatively 5% or less, or alternatively 2% or less of change in average transmission over a wavelength range of 400 to 660 nm, following exposure under ICH Q1B conditions.

A variety of ophthalmic devices may be prepared, including spectacles, sunglasses, hard contact lenses, soft contact lenses, corneal onlays, corneal inlays, intraocular lenses, or overlay lenses. Preferably, the ophthalmic device is an intraocular lens or a soft contact lens. The soft contact lens may be made from a conventional (non-silicone) hydrogel or from a silicone hydrogel.

The foregoing transmission wavelengths and percentages may be measured on various thicknesses of devices. For example, if the device is a hydrogel contact lens (conventional or silicone), the center thickness may be from 70 to 300 microns, or from 80 to 230 microns, or from 80 to 110 microns, or from 90 to 110 microns. The concentration of the one or more light filtering compounds may be adjusted to achieve the foregoing transmission properties. For instance, the concentration may be in the range of at least 0.01 percent, or at least 0.1 percent, or at least 1 percent, or at least 2 percent; and up to 10 percent or up to 5 percent, based on the weight percentages of all components in the reactive mixture, excluding diluent. A typical concentration may be in the range of 1 to 5 percent.

Ophthalmic devices of the invention may comprise a free radical reaction product of a reactive mixture containing one or more monomers suitable for making the desired ophthalmic device (also referred to herein as device forming monomers or hydrogel forming monomers), and optional components. When polymerized, the reactive mixture results in formation of a polymeric network of which the ophthalmic device may be comprised. The polymeric network may, for instance, be a hydrogel (e.g., a conventional hydrogel or a silicone hydrogel).

A visible light filtering compound of the invention may be copolymerized with the other components in the reactive mixture, in which case the reactive mixture may, in addition to one or more monomers suitable for making the desired ophthalmic device (and any optional components), also contain one or more of the visible light filtering compounds.

Non-limiting examples of polymeric networks in which the visible light filtering compounds may be incorporated (for instance, as a monomer) are described above and include, for instance, etafilcon, genfilcon, hilafilcon, lenefilcon, nesofilcon, omafilcon, polymacon, vifilcon, acquafilcon, asmofilcon, balafilcon, comfilcon, delefilcon, lehfilcon, serafilcon, enfilcon, fanfilcon, formofilcon, galyfilcon, lotrafilcon, narafilcon, riofilcon, samfilcon, senofilcon, somofilcon, and stenfilcon, including all of their variants.

By way of further example, a polymeric network may be made from a reactive mixture comprising one or more of: hydrophilic components, hydrophobic components, silicone-containing components, wetting agents such as polyamides, crosslinking agents, and further components such as diluents and initiators. As discussed above, the reactive mixture also contains one or more first and second visible light filtering compounds.

Hydrophilic Components

Examples of suitable families of hydrophilic monomers that may be present in the reactive mixture include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), 2-hydroxyethyl methacrylate (HEMA), 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, 2-aminoethyl (meth)acrylate, 3-aminopropyl (meth)acrylate, 2-aminopropyl (meth)acrylate, N-2-aminoethyl (meth)acrylamides), N-3- aminopropyl (meth)acrylamide, N-2-aminopropyl (meth) acrylamide, N,N-bis-2-aminoethyl (meth)acrylamides, N,N-bis-3-aminopropyl (meth)acrylamide), N,N-bis-2-aminopropyl (meth)acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-β-alanine (VINAL), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT), 1-propanaminium, N,N-dimethyl-N-[3-[(1-oxo-2-propen-1-yl) amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), and methacryloyloxy)propyl) dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof.

Non-limiting examples of hydrophilic O-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one polymerizable group; the prepolymers may have two or more polymerizable groups.

The preferred hydrophilic monomers of the present invention are DMA, NVP, HEMA, VMA, NVA, and mixtures thereof. Preferred hydrophilic monomers include mixtures of DMA and HEMA. Other suitable hydrophilic monomers will be apparent to one skilled in the art.

Generally, there are no particular restrictions with respect to the amount of the hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100°, less than about 80°, and less than about 60°. The hydrophilic monomer may be present in an amount in the range of, for instance, about 0.1 to about 100 weight percent, alternatively in the range of about 1 to about 80 weight percent, alternatively about 5 to about 65 weight percent, alternatively in the range of about 40 to about 60 weight percent, or alternatively about 55 to about 60 weight percent, based on the total weight of the reactive components in the reactive monomer mixture.

Silicone-Containing Components

Silicone-containing components suitable for use in the invention comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth) acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth) acrylate, a (meth)acrylamide, or mixtures of the foregoing; one or more optionally repeating siloxane units; and one or more linking groups connecting the polymerizable groups to the siloxane units.

The silicone-containing component may comprise one or more polymerizable compounds of Formula A:

Formula A

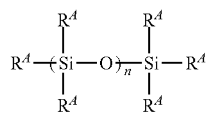

wherein:

at least one $R^A$ is a group of formula $R_g$-L- wherein $R_g$ is a polymerizable group and L is a linking group, and the remaining $R^A$ are each independently:

(a) $R_g$-L-, (b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof, (c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof, (d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof, (e) halo, (f) alkoxy, cyclic alkoxy, or aryloxy, (g) siloxy, (h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or (i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Examples of silicone-containing components suitable for use in the invention include, but are not limited to, compounds listed in Table B. Where the compounds in Table B contain polysiloxane groups, the number of SiO repeat units in such compounds, unless otherwise indicated, is preferably from 3 to 100, more preferably from 3 to 40, or still more preferably from to 20.

TABLE B

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkylsiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |
| 15 | 2-hydroxy-3-[3-methyl-3,3-di(trimethylsiloxy)silylpropoxy]-propyl methacrylate (SIMAA) |
| 16 | 2-hydroxy-3-methacryloxypropyloxypropyl-tris(trimethylsiloxy)silane |
| 17 | 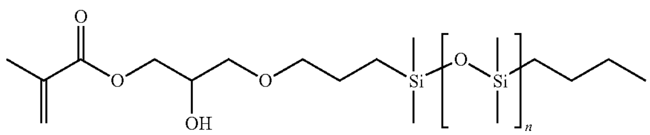 mono-(2-hydroxy-3-methacryloxypropyloxy)-propyl terminated mono-n-butyl terminated polydimethylsiloxanes (OH-mPDMS) (containing from 4 to 30, or from 4 to 20, or from 4 to 15 SiO repeat units) |
| 18 | 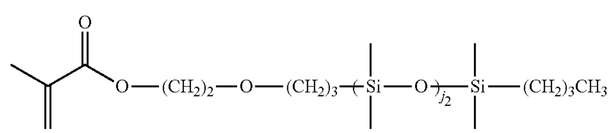 |

TABLE B-continued

19

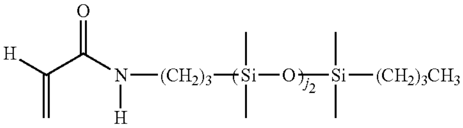

20

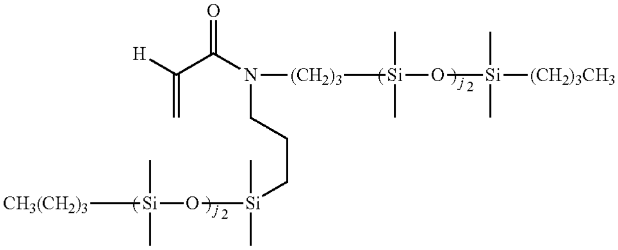

21

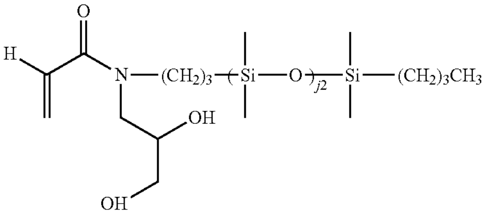

22

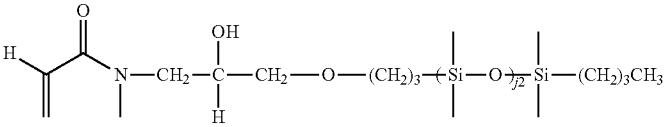

23

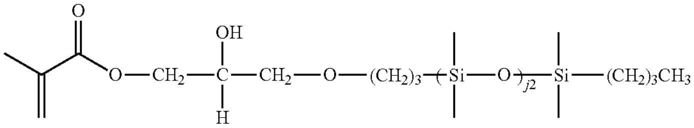

24

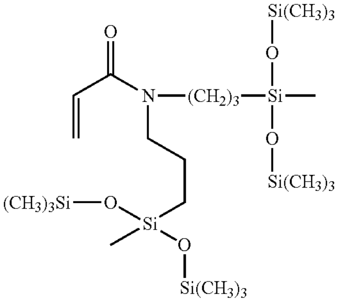

Additional non-limiting examples of suitable silicone-containing components are listed in Table C. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE C
| | |
|---|---|
| 25 | 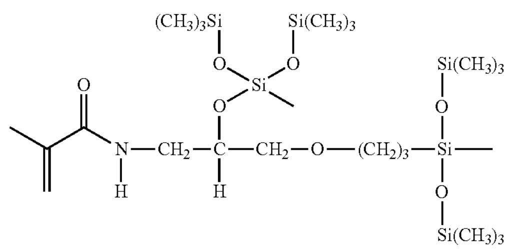 |
| 26 | 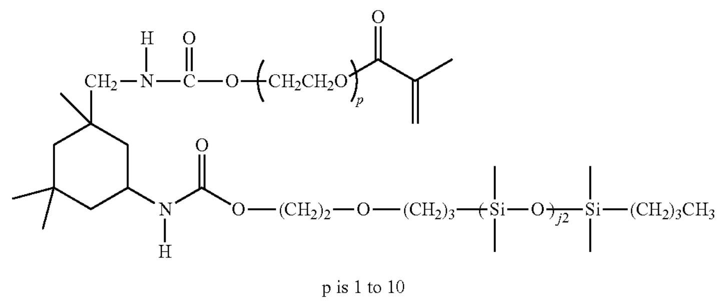 p is 1 to 10 |
| 27 | 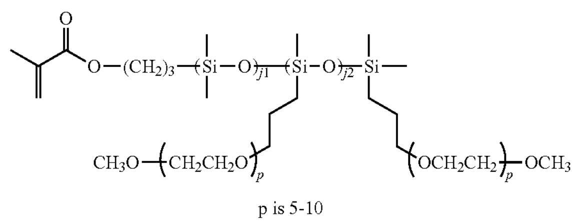 p is 5-10 |
| 28 | 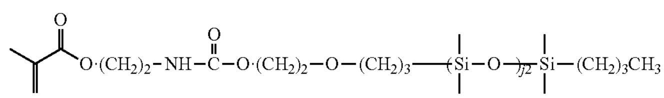 |
| 29 | 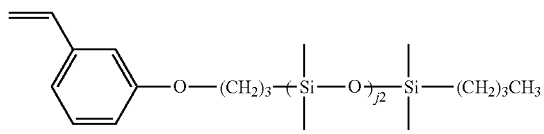 |
| 30 | 1,3-bis[4-(vinyloxycarbonyloxy)but-1-yl]tetramethyl-disiloxane |
| 31 | 3-(vinyloxycarbonylthio)propyl-[tris(trimethylsiloxy)silane] |
| 32 | 3-[tris(trimethylsiloxy)silyl] propyl allyl carbamate |
| 33 | 3-[tris(trimethylsiloxy)silyl] propyl vinyl carbamate |
| 34 | tris(trimethylsiloxy)silylstyrene (Styryl-TRIS) |
| 35 | 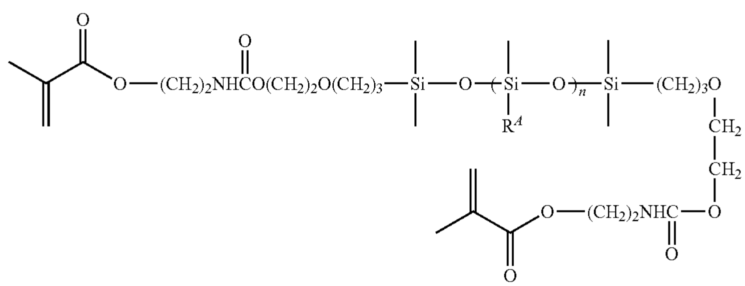 $R^A = CH_3$ (a) or $CH_2CH_2CF_3$ (b) or $CH_2—(CH_2)_2—[OCH_2CH_2]_{1-10}—OCH_3$ (c); a + b + c = n |

TABLE C-continued
36
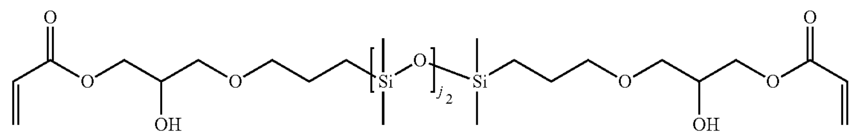
37
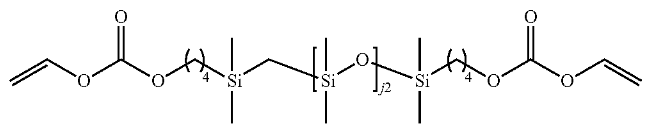
38
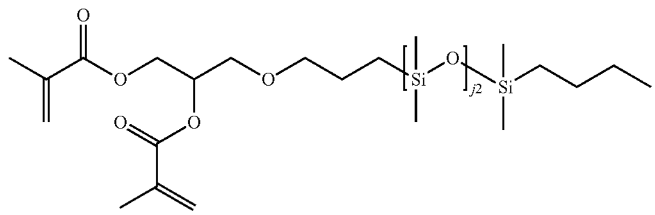
39
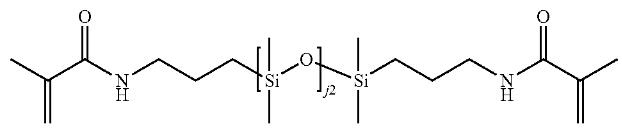
40
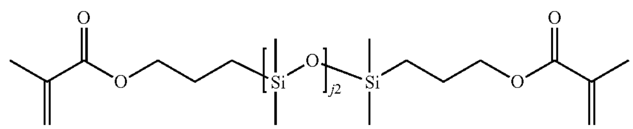
41
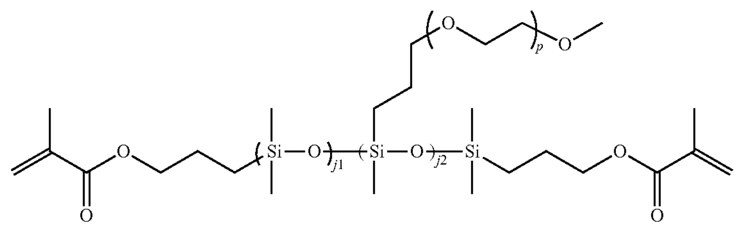
j1 = 80-90
j2 = 5-6
p = 7-8
42
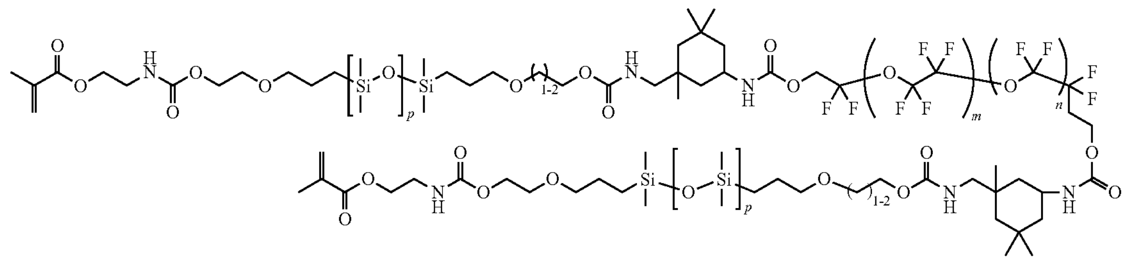
m ≈ 3.5-5.5; n ≈ 4-6.5; p ≈ 22-26

TABLE C-continued

43

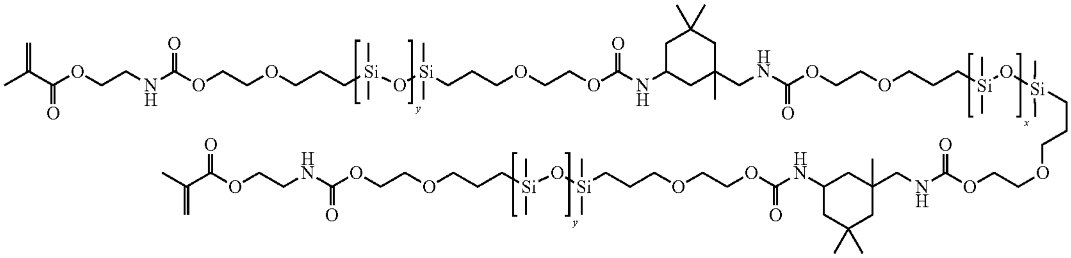

IEM-PDMS(Mn ≈ 3000)-IPDI-PDMS(Mn ≈ 2000)-IPDI-PDMS(Mn ≈ 3000)-IEM (see W02016100457)

Mixtures of silicone-containing components may be used. By way of example, suitable mixtures may include, but are not limited to: a mixture of mono-(2-hydroxy-3-methacryloxypropyloxy)-propyl terminated mono-n-butyl terminated polydimethylsiloxane (OH-mPDMS) having different molecular weights, such as a mixture of OH-mPDMS containing 4 and 15 SiO repeat units; a mixture of OH-mPDMS with different molecular weights (e.g., containing 4 and 15 repeat SiO repeat units) together with a silicone based crosslinker, such as bis-3-acryloxy-2-hydroxypropyloxypropyl polydimethylsiloxane (ac-PDMS); a mixture of 2-hydroxy-3-[3-methyl-3,3-di(trimethylsiloxy)silylpropoxy]-propyl methacrylate (SiMAA) and mono-methacryloxypropyl terminated mono-n-butyl terminated polydimethylsiloxane (mPDMS), such as mPDMS 1000.

Silicone-containing components for use in the invention may have an average molecular weight of from about 400 to about 4000 daltons.

The silicone containing component(s) may be present in amounts up to about 95 weight %, or from about 10 to about 80 weight %, or from about 20 to about 70 weight %, based upon all reactive components of the reactive mixture (excluding diluents).

Polyamides

The reactive mixture may include at least one polyamide. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

Formula G1

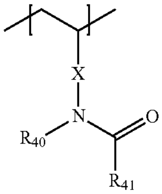

-continued

Formula G2

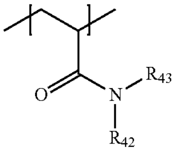

wherein X is a direct bond, —(CO)—, or —(CONHR$_{44}$)—, wherein R$_{44}$ is a $C_1$ to $C_3$ alkyl group; R$_{40}$ is selected from H, straight or branched, substituted or unsubstituted $C_1$ to $C_4$ alkyl groups; R$_{41}$ is selected from H, straight or branched, substituted or unsubstituted $C_1$ to $C_4$ alkyl groups, amino groups having up to two carbon atoms, amide groups having up to four carbon atoms, and alkoxy groups having up to two carbon groups; R$_{42}$ is selected from H, straight or branched, substituted or unsubstituted $C_1$ to $C_4$ alkyl groups; or methyl, ethoxy, hydroxyethyl, and hydroxymethyl; R$_{43}$ is selected from H, straight or branched, substituted or unsubstituted $C_1$ to $C_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

R$_{40}$ and R$_{41}$ may be independently selected from H, substituted or unsubstituted $C_1$ to $C_2$ alkyl groups. X may be a direct bond, and R$_{40}$ and R$_{41}$ may be independently selected from H, substituted or unsubstituted $C_1$ to $C_2$ alkyl groups. R$_{42}$ and R$_{43}$ can be independently selected from H, substituted or unsubstituted $C_1$ to $C_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methylpropionamide, N-vinyl-2-methyl-propionamide, N-vinyl-N, N'-dimethylurea, N, N-dimethylacrylamide, methacrylamide, and acyclic amides of Formulae G2 and G3:

Formula G2

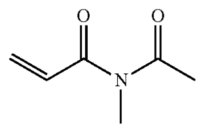

Formula G3

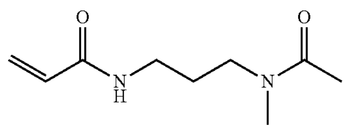

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula G4:

Formula G4

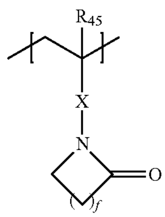

wherein $R_{45}$ is a hydrogen atom or methyl group; wherein f is a number from 1 to 10; wherein X is a direct bond, —(CO)—, or —($CONHR_{46}$)—, wherein $R_{46}$ is a $C_1$ to $C_3$ alkyl group. In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

The cyclic polyamides of the present invention may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth) acrylates. Any of the monomers listed as suitable hydrophilic monomers may be used as co-monomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-β-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N,N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a MW of about 570 KDa).

The total amount of all polyamides in the reactive mixture may be in the range of between 1 weight percent and about 35 weight percent, including in the range of about 1 weight percent to about 15 weight percent, and in the range of about 5 weight percent to about 15 weight percent, in all cases, based on the total weight of the reactive components of the reactive monomer mixture.

Without intending to be bound by theory, when used with a silicone hydrogel, the polyamide functions as an internal wetting agent. The polyamides of the present invention may be non-polymerizable, and in this case, are incorporated into the silicone hydrogels as semi-interpenetrating networks. The polyamides are entrapped or physically retained within the silicone hydrogels. Alternatively, the polyamides of the present invention may be polymerizable, for example as polyamide macromers or prepolymers, and in this case, are covalently incorporated into the silicone hydrogels. Mixtures of polymerizable and non-polymerizable polyamides may also be used.

When the polyamides are incorporated into the reactive monomer mixture they may have a weight average molecular weight of at least 100,000 daltons; greater than about 150,000; between about 150,000 to about 2,000,000 daltons; between about 300,000 to about 1,800,000 daltons. Higher molecular weight polyamides may be used if they are compatible with the reactive monomer mixture.

Cross-Linking Agents

It is generally desirable to add one or more cross-linking agents, also referred to as cross-linking monomers, multifunctional macromers, and prepolymers, to the reactive mixture. The cross-linking agents may be selected from bifunctional crosslinkers, trifunctional crosslinkers, tetrafunctional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents are used in the usual amounts, e.g., from about 0.000415 to about 0.0156 mole per 100 grams of reactive Formulas in the reactive mixture. Alternatively, if the hydrophilic monomers and/or the silicone-containing components are multifunctional by molecular design or because of impurities, the addition of a cross-linking agent to the reactive mixture is optional. Examples of hydrophilic monomers and macromers which can act as the cross-linking agents and when present do not require the addition of an additional cross-linking agent to the reactive mixture include (meth)acrylate and (meth)acrylamide end-capped polyethers. Other cross-linking agents will be known to one skilled in the art and may be used to make the silicone hydrogel of the present invention.

It may be desirable to select crosslinking agents with similar reactivity to one or more of the other reactive components in the formulation. In some cases, it may be desirable to select a mixture of crosslinking agents with different reactivity in order to control some physical, mechanical or biological property of the resulting silicone hydrogel. The structure and morphology of the silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing component which can act as a cross-linking agent and, when present, does not require the addition of a crosslinking monomer to the reactive mixture includes α, ω-bismethacryloxypropyl polydimethylsiloxane. Another example is bis-3-acryloxy-2-hydroxypropyloxypropyl polydimethylsiloxane (ac-PDMS).

Cross-linking agents that have rigid chemical structures and polymerizable groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)-phenyl]propane, and 4-vinylbenzyl methacrylate, and combinations thereof. Rigid crosslinking agents may be included in amounts between about 0.5 and about 15, or 2-10, 3-7 based upon the total weight of all of the reactive components. The physical and mechanical properties of the silicone hydrogels of the present invention may be optimized for a particular use by adjusting the components in the reactive mixture.

Non-limiting examples of silicone cross-linking agents also include the multi-functional silicone-containing components described in Table C above.

Further Constituents

The reactive mixture may contain additional components such as, but not limited to, diluents, initiators, UV absorbers, visible light absorbers, photochromic compounds, pharmaceuticals, nutraceuticals, antimicrobial substances, tints, pigments, copolymerizable dyes, nonpolymerizable dyes, release agents, visibility tints, and combinations thereof.

Classes of suitable diluents for silicone hydrogel reactive mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally, the reactive components are mixed in a diluent to form a reactive mixture. Suitable diluents are known in the art. For silicone hydrogels, suitable diluents are disclosed in WO 03/022321 and U.S. Pat. No. 6,020,445, the disclosure of which is incorporated herein by reference. Classes of suitable diluents for silicone hydrogel reactive mixtures include alcohols having 2 to carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms. Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino) ethanol mixtures thereof and the like. Examples of amide diluents include N,N-dimethyl propionamide and dimethyl acetamide.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like. If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive Formulas). Mixtures of diluents may be used.

A polymerization initiator may be used in the reactive mixture. The polymerization initiator may include, for instance, at least one of lauroyl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphine oxide (Irgacure 819), 2,4,6-trimethylbenzyldiphenyl phosphine oxide and 2,4,6-trimethylbenzoyl diphenylphosphine oxide, benzoin methyl ester and a combination of cam-phorquinone and ethyl 4-(N,N-dimethylamino)benzoate.

Commercially available (from IGM Resins B.V., The Netherlands) visible light initiator systems include Irgacure® 819, Irgacure® 1700, Irgacure® 1800, Irgacure® 819, Irgacure® and Lucrin® TPO initiator. Commercially available (from IGM Resins B.V.) UV photoinitiators include Darocur® 1173 and Darocur® 2959. These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator is used in the reactive mixture in effective amounts to initiate photopolymerization of the reactive mixture, e.g., from about 0.1 to about 2 parts by weight per 100 parts of reactive monomer mixture. Polymerization of the reactive mixture can be initiated using the appropriate choice of heat or visible or ultraviolet light or other means depending on the polymerization initiator used. Alternatively, initiation can be conducted using e-beam without a photoinitiator. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclohexyl phenyl ketone and bis(2,6-dimethoxybenzoyl)-2,4-4-trimethylpentyl phosphine oxide (DMBAPO). Thermally initiated polymerization may be carried out, for instance, as described in US20200399429, which is incorporated herein by reference in its entirety. A combination of photocuring and thermal curing may be used.

The reactive mixture for making the ophthalmic devices of the invention may comprise, in addition to first and second visible light filtering compounds, any of the polymerizable compounds and optional components described above.

The reactive mixture may comprise: first and second visible light filtering compounds, and a hydrophilic component.

The reactive mixture may comprise: first and second visible light filtering compounds, and a hydrophilic component selected from DMA, NVP, HEMA, VMA, NVA, methacrylic acid, and mixtures thereof. Preferred are mixtures of HEMA and methacrylic acid.

The reactive mixture may comprise: first and second visible light filtering compounds, a hydrophilic component, and a silicone-containing component.

The reactive mixture may comprise: first and second visible light filtering compounds, a hydrophilic component selected from DMA, HEMA and mixtures thereof, a silicone-containing component selected from 2-hydroxy-3-[3-methyl-3,3-di(trimethylsiloxy)silylpropoxy]-propyl methacrylate (SiMAA), mono-methacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof, and a wetting agent (preferably PVP or PVMA). For the hydrophilic component, mixtures of DMA and HEMA are preferred. For the silicone containing component, mixtures of SiMAA and mPDMS are preferred.

The reactive mixture may comprise: first and second visible light filtering compounds, a hydrophilic component comprising a mixture of DMA and HEMA; a silicone-containing component comprising a mixture of OH-mPDMS having from 2 to 20 repeat units (preferably a mixture of 4 and 15 repeat units). Preferably, the reactive mixture further comprises a silicone-containing crosslinker, such as ac-PDMS. Also preferably, the reactive mixture contains a wetting agent (preferably DMA, PVP, PVMA or mixtures thereof).

The reactive mixture may comprise: first and second visible light filtering compounds; between about 1 and about 15 wt % at least one polyamide (e.g., an acyclic polyamide, a cyclic polyamide, or mixtures thereof); at least one first mono-functional, hydroxyl substituted poly(disubstituted siloxane) having 4 to 8 siloxane repeating units (e.g., OH-mPDMS where n is to 8, preferably n is 4); at least one second hydroxyl substituted poly(disubstituted siloxane) that is a mono-functional hydroxyl substituted poly(disubstituted siloxane)s having 10 to 200 or 10-100 or 10-50 or 10-20 siloxane repeating units (e.g., OH-mPDMS where n is 10 to 200 or 10- or 10-50 or 10-20, preferably n is 15); about 5 to about 35 wt % of at least one hydrophilic monomer; and optionally a multifunctional hydroxyl substituted poly(disubstituted siloxane)s having 10 to 200, or 10 to 100 siloxane repeating units (e.g., ac-PDMS). Preferably, the first mono-functional, hydroxyl substituted poly(disubstituted siloxane) and the second hydroxyl substituted poly(disubstituted siloxane) are present in concentrations to provide a ratio of weight percent of the first mono-functional, hydroxyl substituted poly(disubstituted siloxane) to weight percent of the second hydroxyl substituted poly(disubstituted siloxane) of 0.4-1.3, or 0.4-1.0.

The foregoing reactive mixtures may contain optional ingredients such as, but not limited to, one or more initiators, internal wetting agents, crosslinkers, other UV or HEV absorbers, and diluents.

Curing of Hydrogels and Manufacture of Lens

The reactive mixtures may be formed by any of the methods known in the art, such as shaking or stirring, and used to form polymeric articles or devices by known methods. The reactive components are mixed together either with or without a diluent to form the reactive mixture.

For example, ophthalmic devices may be prepared by mixing reactive components, and, optionally, diluent(s), with a polymerization initiator and curing by appropriate conditions to form a product that can be subsequently formed into the appropriate shape by lathing, cutting, and the like. Alternatively, the reactive mixture may be placed in a mold and subsequently cured into the appropriate article.

A method of making a molded ophthalmic device, such as a silicone hydrogel contact lens, may comprise: preparing a reactive monomer mixture; transferring the reactive monomer mixture onto a first mold; placing a second mold on top the first mold filled with the reactive monomer mixture; and curing the reactive monomer mixture by free radical copolymerization to form the silicone hydrogel in the shape of a contact lens.

The reactive mixture may be cured via any known process for molding the reactive mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The contact lenses of this invention may be formed by the direct molding of the hydrogels, which is economical, and enables precise control over the final shape of the hydrated lens. For this method, the reactive mixture is placed in a mold having the shape of the final desired hydrogel and the reactive mixture is subjected to conditions whereby the monomers polymerize, thereby producing a polymer in the approximate shape of the final desired product.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble Formulas such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lenses may be sterilized by known means such as, but not limited to, autoclaving.

As indicated above, preferred ophthalmic devices are contact lenses, more preferably soft hydrogel contact lenses. The transmission wavelengths and percentages described herein may be measured on various thicknesses of lenses using, for instance, the methodologies described in the Examples. By way of example, a preferred center thickness for measuring transmission spectra in a soft contact lens may be from 80 to 100 microns, or from 90 to 100 microns or from 90 to 95 microns. Typically, the measurement may be made at the center of the lens using, for instance, a nm instrument slit width.

When the ophthalmic device of the invention is a contact lens, the residues of the first and second visible light filtering compounds in the final lens may be homogenously distributed throughout the lens, or they may be more concentrated in the central zone than in the peripheral zone of the lens. Since the compounds absorb visible light, they tend to be colored, and it is therefore straightforward to determine when the residues are concentrated in the central zone simply by observing a stronger color in the central zone. Alternatively, US/Vis spectroscopy may be used whereby greater absorbance in the central zone for a particular residue is generally indicative of a greater concentration, based on Beer's law.

Various techniques may be used for making lenses in which the residues of the visible light filtering compounds are concentrated in the central zone. One such technique is described in U.S. provisional application Ser. No. 63/265,705, filed Dec. 20, 2021, which is incorporated herein by reference in its entirety.

Thus, local concentration of the residues of the first and second visible light filtering compounds may be achieved by selectively derivatizing the residues in regions where their light absorbing properties are not needed or not desired, such as in the peripheral zone of the lens. Selective derivatization is preferably achieved chemically. More preferably, derivatization is via chemical oxidation of one or more functional groups in the visible light filtering compound that, as a consequence of the oxidation, results in a material that has greater visible light transmittance than the parent chromophore.

Where the derivatization is by chemical oxidation, the visible light filtering compound preferably contains a functional group that can readily undergo the oxidation reaction under conditions that result in a material with greater light transmission than the parent. Exemplary functional groups for such oxidation include S, NR, and Se. Preferred visible light filtering compounds therefore include materials as described above that contain an oxidizable functional group, for instance an oxidizable sulfur, selenium, or amine moiety.

Chemical oxidation may, for instance, be carried out by bleaching. Various reagents may be used for oxidation including, without limitation, hypochlorite, Oxone®, dimethyldioxirane, hydrogen peroxide, and/or chlorite.

In order to form the derivative of the visible light filtering compound residues in select regions of the lens, the area of the lens where derivatization is not desired is masked from the derivatization conditions. For instance, if derivatization is by chemical means, such as by chemical oxidation, the central zone of the lens may be masked from the derivatization reagents using, for example, a cup that is appropriately sized to exclude the derivatization reagents from the zone. Preferably, such cup is formed of a material, such as silicone, that provides adequate masking of the zone, but without damaging the underlying lens. Other masking techniques or equipment may readily be used.

Once the central zone of the lens is appropriately masked, the derivatization step is then carried out. For instance, if derivatization is by chemical means, the derivatization reagent can be applied such that it contacts the peripheral zone without significantly contacting the central zone. The contacting of the reagent with the peripheral zone may be continued until the desired level of derivatization has been accomplished, and then the reagent removed, for instance by washing.

Derivatization as described above is preferably conducted while the contact lens is still within the mold (preferably one of the mold halves is removed, thus allowing access to the lens in the other mold half). After derivatization, the lens may be subjected to processing methodologies typically used in the production of contact lenses, including extraction to remove unreacted components and release the lens from the lens mold. The extraction may be done using conventional extraction fluids, including organic solvents, such as alcohols, or may be extracted using aqueous solutions. Extraction may also be carried out prior to the derivatization step.

Other techniques may be used for creating lenses in which the first and second visible light filtering compounds' residues are concentrated in the central zone of the lens and include, for instance, the process described in U.S. Pat. No. 8,697,770, which is incorporated herein by reference in its entirety. For instance, the technique uses multiple dosings of reactive monomer mixtures into the lens mold, where a first, higher viscosity mixture containing the first and second visible light filtering compounds is dosed over the central zone of the mold, and a lower viscosity reactive mixture that is free of the first and second visible light filtering compounds is dosed over or around the first dose. The mold halves are then brought together and the reactive monomer mixtures subsequently cured.

Where the device of the invention is a silicone hydrogel contact lens, the lens preferably exhibits the following properties. All values are prefaced by "about," and the lens may have any combination of the listed properties. The properties may be determined by methods known to those skilled in the art, for instance as described in United States pre-grant publication US20180037690, which is incorporated herein by reference.

- Water concentration %: at least 20%, or at least 25% and up to 80% or up to 70%
- Haze: 30% or less, or 10% or less
- Advancing dynamic contact angle (Wilhelmy plate method): 1000 or less, or 800 or less; or 500 or less
- Tensile Modulus (psi): 120 or less, or 80 to 120
- Edge corrected oxygen permeability (EC Dk, barrers): at least 50, or at least 60, or at least 80, or at least 100, or at least 120
- Elongation to Break: at least 100

For ionic silicon hydrogels, the following properties may also be preferred (in addition to those recited above):

- Lysozyme uptake (μg/lens): at least 100, or at least 150, or at least 500, or at least 700
- Polyquaternium 1 (PQ1) uptake (%): 15 or less, or 10 or less, or 5 or less The visible light filtering compounds as described herein may be used with other products, in addition to ophthalmic devices. For instance, the compounds may be used in windows (e.g., vehicle or building windows), or optical equipment, such as binoculars and cameras, and the like. In such use, the compounds may, for instance, be coated on the surface of the device. To facilitate coating, the compound may be dissolved in a solvent.

The following clauses list non-limiting embodiments of the disclosure:

1. An ophthalmic device that is a free radical reaction product of a reactive mixture comprising: one or more monomers suitable for making the ophthalmic device; and a visible light filtering compound, wherein the device transmits:
   - between 0 percent and 70 percent, or between 0.2 and 70 percent, or between 1 and percent, or between 2 percent and 30 percent, or between 4 percent and 25 percent, or between 5 percent and 20 percent, across a wavelength range of 400 to 409 nm;
   - between 55 percent and 85 percent, or between 60 percent and 80 percent, across a wavelength range of 430 to 480 nm; and between 50 percent and 90 percent, or between 60 percent and 85 percent, or between
   - percent and 85 percent, across a wavelength range of 575 to 650 nm.

2. The ophthalmic device of clause 1, wherein the device further transmits between 10 percent and 75 percent of light, or between 15 percent and 70 percent, or between 20 percent and percent across a wavelength range of 410 to 429 nm.

3. The ophthalmic device of any preceding clause, wherein the device transmits between 70 percent and 98 percent of light, or between 75 percent and 95 percent across a wavelength range of 481 to 574 nm.

4. The ophthalmic device of any preceding clause, wherein the device transmits at least 80 percent and up to 97 percent of light across a wavelength range of 651 to 666 nm.

5. The ophthalmic device of any preceding clause, wherein the device transmits at least 90 percent of light across a wavelength range of 667 to 760 nm.

6. The ophthalmic device of any preceding clause, wherein the device transmits 10 percent or less, or 5 percent or less, or 1 percent or less, or less than 1 percent, of light across a wavelength range of 200 to 279 nm.

7. The ophthalmic device of any preceding clause, wherein the device transmits 45 percent or less, or 35 percent or less, or 25 percent or less, or 20 percent or less, or 10 percent or less, or percent or less, or 1 percent or less of light across a wavelength range of 280 to 399 nm.

8. The ophthalmic device of any preceding clause wherein the polymerizable compound suitable for making the device comprises a hydrophilic component, a silicone-containing component, or mixtures thereof.

9. The ophthalmic device of any preceding clause wherein the device is a silicone hydrogel contact lens, the lens having a contact angle of about 100° or less, a water content of at least about 25 weight percent, and an oxygen permeability of at least about 80 barrers.

10. The ophthalmic device of any preceding clause, wherein the visible light filtering compound comprises a first visible light filtering compound and a second visible light filtering compound.

11. The ophthalmic device of clause 10 wherein the first visible light filtering compound comprises a compound of formula I.

12. The ophthalmic device of any one of clauses 11 to 12 wherein the second visible light filtering compound comprises a compound of formula II.

13. The ophthalmic device of any one of clauses 11 to 12 wherein the second visible light filtering compound comprises a compound of formula III or a compound of formula IV.

14, The ophthalmic device of any one of clauses 11 to 12 wherein the second visible light filtering compound comprises a mixture of a compound of formula II and either (a) a compound of formula III; or (b) a compound of formula IV.

15. An ophthalmic device that is a free radical reaction product of a reactive mixture comprising: one or more monomers suitable for making the ophthalmic device; a first visible light filtering compound comprising a compound of formula I; and a second visible light filtering compound, the second visible light filtering compound comprising: a compound of formula II; or a compound of formula III; or a compound of formula IV; or a mixture of a compound of formula II and a compound of formula III; or a mixture of a compound of formula II and a compound of formula IV.

Some embodiments of the invention will now be described in detail in the following Examples.

EXAMPLES

Test Methods

Ultraviolet-visible spectra of compounds in solution were measured on a Perkin Elmer Lambda 45, an Agilent Cary 6000i, or an Ocean Optics QE65 PRO (DH-2000-BAL Light Source) UV-VIS scanning spectrometer. The instrument was thermally equilibrated for at least thirty minutes prior to use. For the Perkin Elmer instrument, the scan range was 200-800 nm; the scan speed was 960 nm per minute; the slit width was 4 nm; the mode was set on transmission or absorbance; and baseline correction was selected. For the Cary instrument, the scan range was 200-800 nm; the scan speed was 600 nm/min; the slit width was 2 nm; the mode was transmission or absorbance; and baseline correction was selected. For the Ocean Optics instrument, the scan range was 200-800 nm; the slit width was 10 μm; the mode was transmission or absorbance; and baseline correction was selected. A baseline correction was performed before samples were analyzed using the autozero function.

Ultraviolet-visible spectra of contact lenses formed in part from the claimed compositions were measured on a Perkin Elmer Lambda 45 UV/VIS, an Agilent Cary 6000i, or an Ocean Optics UV-VIS scanning spectrometer using packing solution. The instrument was thermally equilibrated for at least thirty minutes prior to use. Baseline correction was performed using cuvettes containing plastic two-piece lens holders and the same solvents. These two-piece contact lens holders were designed to hold the sample in the quartz cuvette in the location through which the incident light beam traverses. The reference cuvette also contained a two-piece holder. To ensure that the thickness of the samples is constant, all lenses were made using identical molds. The center thickness of the contact lens was measured using an electronic thickness gauge. Reported center thickness and percent transmission spectra are obtained by averaging three individual lens data.

It is important to ensure that the outside surfaces of the cuvette are completely clean and dry and that no air bubbles are present in the cuvette. Repeatability of the measurement is improved when the reference cuvette and its lens holder remain constant and when all samples use the same sample cuvette and its lens holder, making sure that both cuvettes are properly inserted into the instrument.

The refractive index ("RI") of a contact lens was measured by a Leica ARIAS 500 Abbe refractometer in manual mode or by a Reichert ARIAS 500 Abbe refractometer in automatic mode with a prism gap distance of 100 microns. The instrument was calibrated using deionized water at 20° C. (±0.2° C.). The prism assembly was opened, and the test lens was placed on the lower prism between the magnetic dots closest to the light source. If the prism was dry, a few drops of saline were applied to the bottom prism. The front curve of the lens was against the bottom prism. The prism assembly was then closed. After adjusting the controls so that the shadow line appeared in the reticle field, the refractive index was measured. The RI measurement was made on five test lenses. The average RI calculated from the five measurements was recorded as the refractive index as well as its standard deviation.

Water content was measured gravimetrically. Lenses were equilibrated in packing solution for 24 hours. Each of three test lenses are removed from packing solution using a sponge tipped swab and placed on blotting wipes which have been dampened with packing solution. Both sides of the lens are contacted with the wipe. Using tweezers, the test lens is placed in a tared weighing pan and weighed. Two more samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg; lower pressures are allowed. The vacuum valve and pump are turned off, and the lenses are dried for at least 12 hours, typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows: % water content=(wet weight−dry weight)/wet weight×100. The average and standard deviation of the water content were calculated and the average value reported as the percent water content of the test lens.

Oxygen permeability ("Dk") was determined by the polarographic method generally described in ISO 9913-1:1996 and ISO 18369-4:2006, but with the following modifications. The measurement was conducted at an environment containing 2.1% oxygen created by equipping the test chamber with nitrogen and air inputs set at the appropriate ratio, for example, 1800 mL/min of nitrogen and 200 mL/min of air. The t/Dk was calculated using the adjusted oxygen concentration. Borate buffered saline was used. The dark current was measured by using a pure humidified nitrogen environment instead of applying MMA lenses. The lenses were not blotted before measuring. Four lenses were stacked instead of using lenses of various thickness (t) measured in centimeters. A curved sensor was used in place of a flat sensor; radius was 7.8 mm.

The calculations for a 7.8 mm radius sensor and 10% (v/v) air flow were as follows:

$$D_k/t = (\text{measured current} - \text{dark current}) \times \left(2.97 \times 10-8\ \text{mL}\ O_2/(\mu\text{A}-\text{sec}-\text{cm}^2-\text{mm Hg})\right)$$

The edge correction was related to the Dk of the material. For all $D_k$ values less than 90 barrers:

$$t/D_k\ (\text{edge corrected}) = (1+(5.88\,x\,t)) \times (t/D_k)$$

For $D_k$ values between 90 and 300 barrers:

$$t/D_k\ (\text{edge corrected}) = (1+(3.56\,x\,t)) \times (t/D_k)$$

For $D_k$ values greater than 300 barrers:

$$t/D_k\ (\text{edge corrected}) = (1+(3.16\,x\,t)) \times (t/D_k)$$

Non-edge corrected $D_k$ was calculated from the reciprocal of the slope obtained from the linear regression analysis of the data wherein the x variable is the center thickness in centimeters and the y variable is the $t/D_k$ value. On the other hand, edge corrected $D_k$ ("EC $D_k$") was calculated from the reciprocal of the slope obtained from the linear regression analysis of the data wherein the x variable is the center thickness in centimeters and the y variable is the edge corrected t/$D_k$ value. The resulting $D_k$ value was reported in barrers.

Wettability of lenses was determined by a modified Wilhelmy plate method using a calibrated Kruss K100 tensiometer at room temperature (23±4° C.) and using surfactant free borate buffered saline as the probe solution. All equipment must be clean and dry; vibrations must be minimal around the instrument during testing. Wettability is usually reported as the advancing contact angle ("Kruss DCA"). The tensiometer was equipped with a humidity generator, and temperature and humidity gages were placed in the tensiometer chamber. The relative humidity was maintained at 70±5%. The experiment was performed by dipping the lens specimen of known perimeter into the packing solution of known surface tension while measuring the force exerted on the sample due to wetting by a sensitive balance. The advancing contact angle of the packing solution on the lens is determined from the force data collected during sample dipping. The receding contact angle is determined from force data while withdrawing the sample from the liquid. The Wilhelmy plate method is based on the following formula: $Fg=\gamma\rho \cos \theta-B$, wherein F=the wetting force between the liquid and the lens (mg), g=gravitational acceleration (980.665 cm/sec$^2$), $\gamma$=surface tension of probe liquid (dyne/cm), $\rho$=the perimeter of the contact lens at the liquid/lens meniscus (cm), $\theta$=the dynamic contact angle (degree), and B=buoyancy (mg). B is zero at the zero depth of immersion. Typically, a test strip was cut from the central area of the contact lens. Each strip was approximately 5 mm in width and 14 mm in length, attached to a metallic clip using plastic tweezers, pierced with a metallic wire hook, and equilibrated in packing solution for at least 3 hours. Then, each sample was cycled four times, and the results were averaged to obtain the advancing and receding contact angles of the lens. Typical measuring speeds were 12 mm/min. Samples were kept completely immersed in packing solution during the data acquisition and analysis without touching the metal clip. Values from five individual lenses were averaged to obtain the reported advancing and receding contact angles of the experimental lens.

Wettability of lenses was determined using a sessile drop technique using Kruss K100 TM instrument at room temperature and using deionized water as probe solution ("Sessile Drop"). The lenses to be tested were rinsed in deionized water to remove carry over from packing solution. Each test lens was placed on blotting lint free wipes which are dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for to 10 seconds, and the contact angle was measured between the drop image and the lens surface. Typically, three to five lenses were evaluated, and the average contact angle was reported. The contact angles were measured on both the front and back surface of the lenses as denoted by front curve ("FC") and base curve ("BC") in the tables.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a minus one diopter spherical lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample ($L_o$) and sample length at break ($L_f$) were measured. At least five specimens of each composition were measured, and the average values were used to calculate the percent elongation to break: percent elongation=$[(L_f-L_o)/L_o]\times100$. The tensile modulus was calculated as the slope of the initial linear portion of the stress-strain curve; the units of modulus are pounds per square inch or psi. The tensile strength was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in$^3$.

A calibrated dual interferometric method was used for measuring contact lens parameters in packing solution. These parameters included equivalent sphere power at multiple apertures (diopters or D), cylinder power at multiple apertures (diopters or D), diameter (millimeters or mm), center thickness (millimeters or mm), sagittal height (millimeters or mm), and root mean squared (RMS) optical path wavefront deviation from lens design target in micrometers or microns (μm) with sphere/cylinder power and coma removed as measured using a 6.5 millimeter aperture. The instrument consists of a custom, propitiatory interferometer for the measurement of wavefront parameters and a Lumetrics OptiGauge® II low-coherence interferometer for the measurement of the dimensional parameters of sagittal height and center thickness. The two individual instruments combined are similar to Lumetrics Clearwave™ Plus, and the software is similar to Lumetrics OptiGauge Control Center v7.0 or higher. With the Clearwave™ Plus, a camera is used to find the lens edge, and then the lens center is calculated, which is then used to align a 1310 nanometer interferometer probe at the lens center for the measurement of sagittal height and center thickness. The transmitted wavefront is also collected in series using a wavefront sensor (shack-Hartmann sensor). Multiple parameters from the transmitted wavefront of the contact lens are measured, and others are calculated from those measurements.

From the data collected, difference terms are calculated by comparing the measured values from the target. These include root mean squared optical path wave front deviation from lens design target in μm (sphere/cylinder power and coma deviation removed) as measured using a 6.5 millimeter aperture (RMS_65), the second equivalent sphere power deviation from lens design target in diopters (D) as measured using a 5 millimeter aperture (PW2EQD), deviation from lens design target diameter in mm (DMD), deviation from lens design target base curve radius as calculated from the measured sagittal height and target lens diameter according to ISO 18369-3 in mm (BCD), and deviation from lens design target center thickness in mm (CTD).

The following abbreviations will be used throughout the Examples and Figures and have the following meanings:

L: liter(s)
mL: milliliter(s)
Equiv. or eq.: equivalent
kg: kilogram(s)
g: gram(s)
mg: milligram(s)
mol: mole(s)
mmol: millimole(s)
M: molar
Da: dalton or g/mole
kDa: kilodalton or an atomic mass unit equal to 1,000 daltons
min: minute(s)
mm: millimeter(s)
cm: centimeter(s)
μm: micrometer(s)
nm: nanometer(s)
λ: wavelength
wt. %: weight percent
Cmpd: compound
TLC: thin layer chromatography
$^1$H NMR: proton nuclear magnetic resonance spectroscopy
UV-VIS: ultraviolet-visible spectroscopy
HEV: high energy visible (light)
LED: light emitting diode
mW: milliwatts
AU: absorbance units
% T: percent transmission
BC: base curve plastic mold
FC: front curve plastic mold
PP: polypropylene which is the homopolymer of propylene
TT: Tuftec which is a hydrogenated styrene butadiene block copolymer (Asahi Kasei Chemicals)
Z: Zeonor which is a polycycloolefin thermoplastic polymer (Nippon Zeon Co Ltd)
DMA: N, N-dimethylacrylamide (Jarchem)
HEMA: 2-hydroxyethyl methacrylate (Bimax)
PVP K90: poly(N-vinylpyrrolidone) (ISP Ashland)
EGDMA: ethylene glycol dimethacrylate (Esstech)
TEGDMA: tetraethylene glycol dimethacrylate (Esstech)
Tegomer MA: bis-3-methacryloxy-2-hydroxypropyloxypropyl polydimethylsiloxane ($M_n$=2000 grams/mole, n=20) (Shin Etsu)

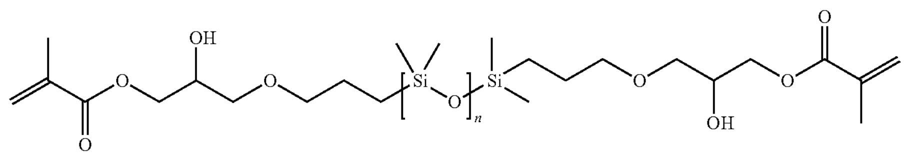

Omnirad 1870: blend of bis(2,6-dimethoxybenzoyl)-2,4,4-trimethyl-pentylphosphineoxide and 1-hydroxy-cyclohexyl-phenyl-ketone (IGM Resins or BASF or Ciba Specialty Chemicals)
AIBN: azobisisobutyronitrile [CAS 78-67-1]
mPDMS: mono-n-butyl terminated monomethacryloxypropyl terminated polydimethylsiloxane ($M_n$=800-1500 daltons) (Gelest)
HO-mPDMS: mono-n-butyl terminated mono-(2-hydroxy-3-methacryloxypropyloxy)-propyl terminated polydimethylsiloxane ($M_n$=400 to 1400 grams/mole) (Ortec or DSM-Polymer Technology Group)
OH-mPDMS (n=4):

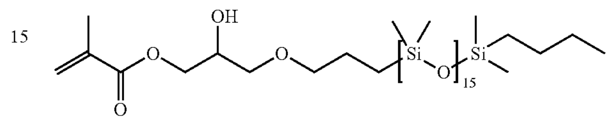

OH-mPDMS (n=15) which is an oligomeric macromer having a number average degree of polymerization DP=15:

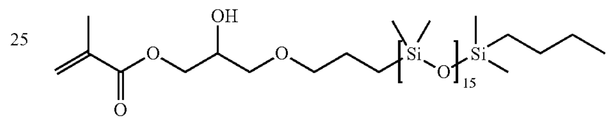

SiMAA: 2-propenoic acid, 2-methyl-2-hydroxy-3-[3-[1,3,3,3-tetramethyl-1-[(trimethylsilyl)oxy]disiloxanyl]propoxy]propyl ester (Toray) or 3-(3-(1,1,1,3,5,5,5-heptamethyltrisiloxan-3-yl)propoxy)-2-hydroxypropyl methacrylate
Norbloc: 2-(2'-hydroxy-5-methacrylyloxyethylphenyl)-2H-benzotriazole (Janssen)
RB247: 1,4-bis[2-methacryloxyethylamino]-9,10-anthraquinone

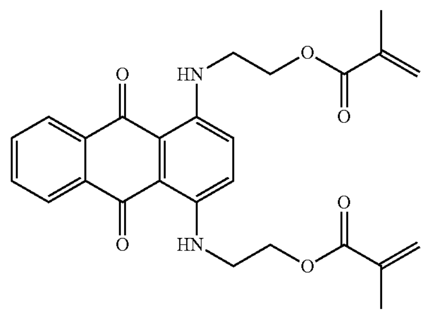 [SMILES: C=C(C)C(=O)OCCNc1ccc(NCCOC(=O)C(=C)C)c2c1C(=O)c1ccccc1C2=O]

Compound B: 2-(2-cyano-2-(2-methoxy-10-butylacridin-9(10H)-ylidene)acetamido)ethyl methacrylate

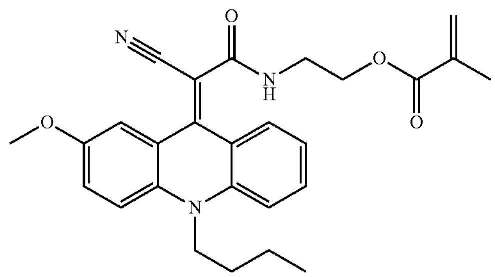 [SMILES: C=C(C)C(=O)OCCNC(=O)/C(C#N)=C1\c2ccccc2N(CCCC)c2ccc(OC)cc21]

Compound C: 2-(2-cyano-2-(9H-thioxanthen-9-ylidene) acetamido)ethyl methacrylate (prepared as described in US20210061934)

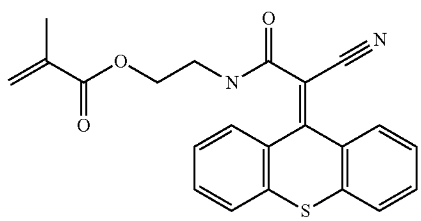 [SMILES: C=C(C)C(=O)OCCNC(=O)C(C#N)=C1c2ccccc2Sc2ccccc21]

Compound D: 3-((9-(dicyanomethylene)-9H-xanthen-3-yl)oxy)propyl methacrylate

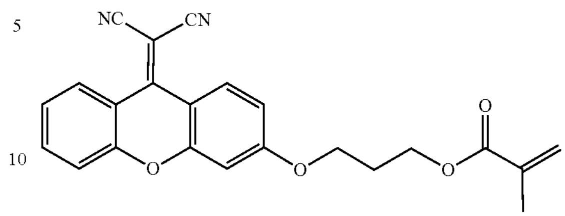

D3O: 3,7-dimethyl-3-octanol (Vigon)

DIW: deionized water

IPA: isopropyl alcohol $CDCl_3$: deutrochloroform

HCl: hydrochloric acid

Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.

Example 1—Synthesis of 2-(2-cyano-2-(2-methoxy-10-propylacridin-9(10H)-ylidene)acetamido)ethyl methacrylate (Compound A) as shown in Scheme 1

Scheme 1

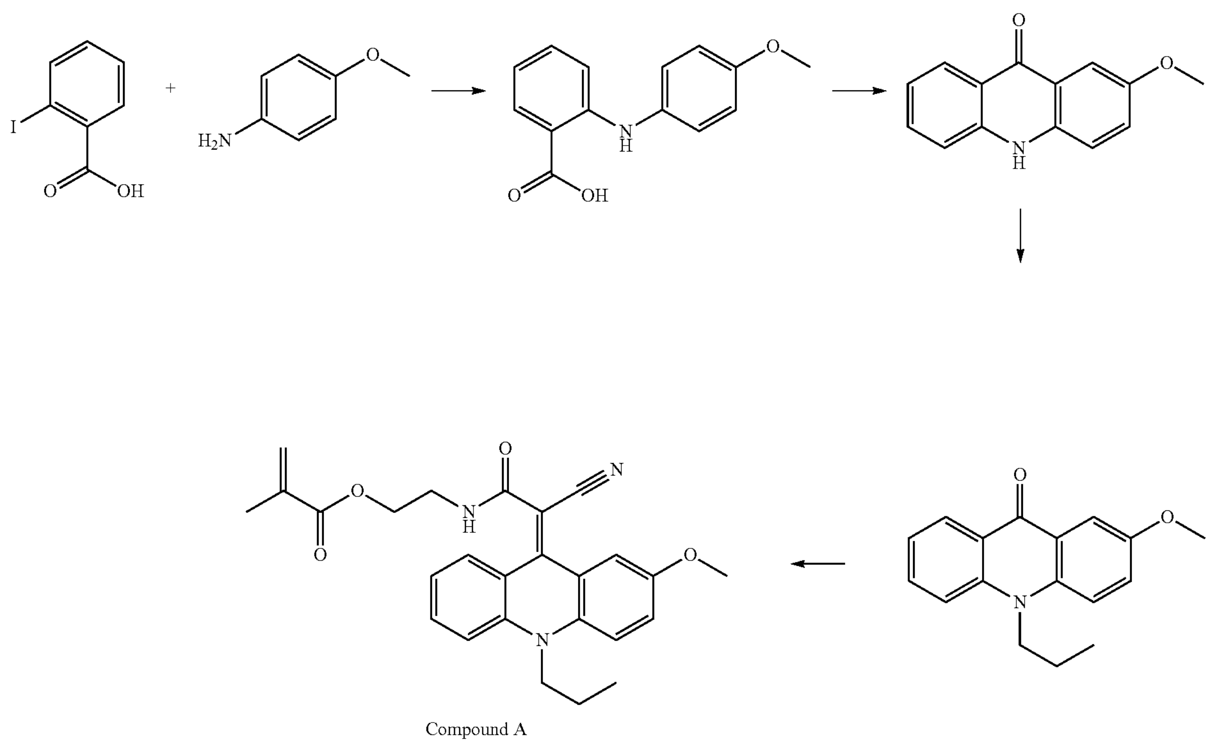

Compound A 2-iodobenzoic acid (12.40 g, ~0.05 mol), 12.32 g of 4-methoxyaniline (~2 eq.), 6.91 g of anhydrous potassium carbonate (~0.05 mol), and 300 mg of copper powder (4.76 mmol) were charged in a 100 mL, 3 neck round bottom flask equipped with a magnetic stir bar and reflux condenser. Deionized water (30 mL) was added to the mixture of solids, and the system heated at reflux for 6 hours with constant stirring. The mixture solidified upon cooling to room temperature. The system was diluted with deionized water and gradually poured into 1 normal aqueous hydrochloric acid with stirring. The mixture was stirred at room temperature for 30 minutes, after which it was filtered over a fritted glass funnel and dried in a vacuum oven at 60° C. The residue 2-((4-methoxyphenyl)amino)benzoic acid was washed with 3×100 mL of deionized water and used "as is" for the intramolecular cyclization. $^1H$ NMR ($CDCl_3$) –δ 3.81 (3H, s), 6.66 (1H, t), 6.89-6.93 (3H, m), 7.16 (2H, d), 7.27 (1H, t), 7.99 (1H, d), 9.12 (1H, bs) A 250 mL round bottom flask equipped with a magnetic stir bar and reflux condenser was charged with 12.5 g of 2-((4-methoxyphenyl)amino)benzoic acid and 100 mL of Eaton's acid (10 weight % $P_2O_5$ in methanesulfonic acid). The mixture was heated with constant stirring at 90° C. (mantle temperature) for 5 hours, while monitoring the progress by TLC. Upon cooling to room temperature, the reaction mixture was poured over ice, stirred for 30 minutes, and filtered over a fritted glass funnel. The residue 2-methoxyacridin-9(10H)-one was washed with 3×100 mL of deionized water, followed by acetonitrile, and dried in a vacuum oven at 60° C. $^1H$ NMR (DMSO d6) –δ 3.86 (3H, s), 7.23 (1H, t), 7.41 (1H, dd), 7.52 (1H, d), 7.53 (1H, d), 7.63 (1H, d), 7.70 (1H, dt), 8.23 (1H, d)

A 250 mL round bottom flask equipped with a magnetic stir bar and reflux condenser was charged with 5.4 g of 2-methoxyacridin-9(10H)-one (0.0244 mole) and 12.9 g of cesium carbonate (~1.5 eq.). The solids were dried under vacuum at 80° C., after which the system was placed under a nitrogen blanket and 80 mL of anhydrous N,N-dimethylformamide was added to the flask. 1-bromopropane (6.0 g, ~2 eq.) was added to the flask, and the mixture was heated at 50° C. (mantle temperature) for 36 hours. TLC indicated the presence of two compounds (O-alkylation and N-alkylation). The organics were poured into 200 mL of deionized water and extracted into ~150 mL of ethyl acetate. The organics were then washed with 3×100 mL of water, followed by 3×100 mL of dilute aqueous HCl to remove the O-alkylated acridine byproduct, and a final deionized water wash. TLC of the organics indicated a single compound present at this point, namely 2-methoxy-10-propylacridin-9(10H)-one, which was dried under reduced pressure and used for the subsequent transformation. $^1H$ NMR ($CDCl_3$) –δ 1.12 (3H, t), 1.93 (2H, m), 4.28 (2H, dd), 7.25 (1H, ddd), 7.35 (1H, dd), 7.45 (1H, dd), 7.66 (1H, m), 7.96 (1H, d), 7.57 (1H, dd).

A 250 mL, three neck round bottom flask equipped with a magnetic stir bar and reflux condenser was charged with 4.5 g of 2-methoxy-10-propylacridin-9(10H)-one (0.017 mole) and 6.4 g of N-2-methacryloxyethyl-2-cyanoacetamide (0.033 mole). The system was placed under a nitrogen blanket, and 20 mL of dichloromethane was added to the mixture and stirred until homogeneous. After cooling the system in an ice bath, titanium tetrachloride (4.5 mL, 7.78 g, 0.041 mole) was added to the mixture in a dropwise fashion and stirring continued for an additional 15 minutes. Pyridine 5 mL (4.9 g, 0.06 mole) was added to the mixture, which was allowed to warm up to ambient temperature and then heated to reflux for 8 hours. After cooling the mixture to room temperature, it was poured over dilute aqueous HCl, and the product mixture was extracted into dichloromethane. Volatiles were evaporated under reduced pressure, and the product Compound A was purified by flash chromatography. $^1H$ NMR ($CDCl_3$) –δ 1.07 (3H, t), 1.87 (3H, s), 1.91 (2H, m), 3.58 (2H, dd), 3.85 (3H, s), 4.07 (2H, dd), 4.18 (2H, t), 5.5 (1H, dd), 6.03 (1H, ss), 6.07 (1H, t), 7.07 (1H, t), 7.14 (1H, dd), 7.23 (2H, two doublets), 7.48 (1H, m), 7.92 (1H, bs).

Example 2—Synthesis of 2-(2-cyano-2-(2-methoxy-10-butylacridine-9(10H)-ylidene)acetamido)ethyl methacrylate (Compound B) as shown in Scheme 2

Scheme 2

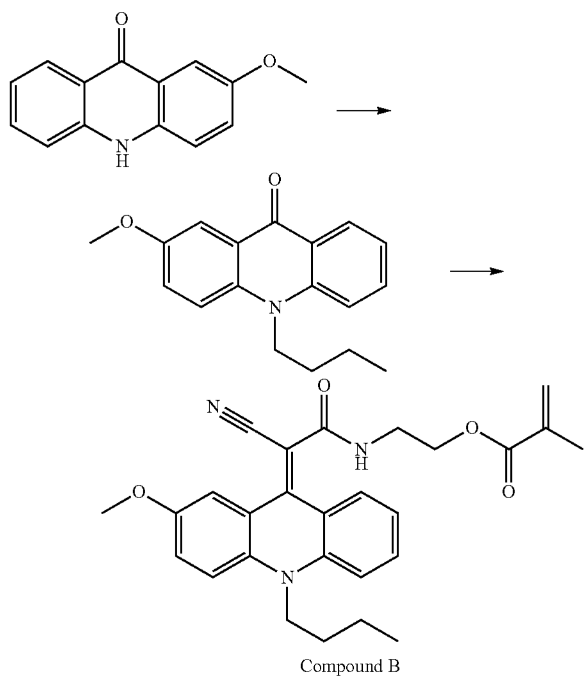

Compound B

A 200 mL round bottom flask equipped with a magnetic stir bar and reflux condenser was charged with 10.0 g of 2-methoxyacridin-9(10H)-one (0.044 mole) and 19.6 g of cesium carbonate (~1.25 eq.). The solids were dried under vacuum at 80° C., after which the system was placed under a nitrogen blanket, and 60 mL of anhydrous DMSO was added to the flask. 1-bromobutane (7.55 g, ~1.25 eq.) was added to the flask, and the mixture was heated at 110° C. (mantle temperature) for 6 hours. Two products, very close in retention factor and inseparable by chromatography, were observed by TLC. The cooled suspension was poured over 500 mL of deionized water, and the mixture was stirred for 30 minutes at room temperature. The organics were extracted into ethyl acetate and washed with 3×200 mL of deionized water. NMR of the organics indicated the presence of the O-alkylated acridine derivative in addition to the desired compound, 2-methoxy-10-butylacridin-9(10H)-one. This material can be used "as is" for the Knoevenagel condensation. Preferably, the crude product was washed with dilute aqueous HCl to remove the O-alkylated acridine derivative, resulting in pure 2-methoxy-10-butylacridin-9(10H)-one. $^1H$ NMR ($CDCl_3$) –δ 1.05 (3H, t), 1.55 (2H, m), 1.82 (2H, m), 4.31 (2H, dd), 7.25 (1H, ddd), 7.34 (1H, dd), 7.45 (1H, dd), 7.68 (1H, m), 7.96 (1H, d), 8.56 (1H, dd).

A 250 mL, three neck round bottom flask equipped with a magnetic stir bar and reflux condenser was charged with 10.0 of the crude product mixture containing 2-methoxy-10-butylacridin-9(10H)-one and 15 g of N-2-methacryloxyethyl-2-cyanoacetamide. The system was placed under a nitrogen blanket, 150 mL of dichloromethane was added to the mixture and stirred until homogeneous. After cooling the system in an ice bath, titanium tetrachloride (10 mL, 17.3 g, 1.092 mole) was added to the mixture in a dropwise fashion and stirring continued for an additional 15 minutes. Pyridine 10 mL (9.82 g, 0.12 mole) was added to the mixture, which was allowed to warm up to ambient temperature and then heated to reflux for 8 hours. TLC indicated the presence of several compounds including the unreacted O-alkylated derivative present in the starting material mixture. The major product, Compound B, was a slightly more polar, dark brownish orange species, which was isolated after quenching the system in dilute aqueous HCl, followed by aqueous extractions, and chromatography. $^1$H NMR ($CDCl_3$) –δ 1.04 (3H, t), 1.51 (2H, m), 1.87 (3H, s, 2H, m), 3.58 (2H, dd), 3.84 (3H, s), 4.12 (2H, dd), 4.19 (2H, t), 5.55 (1H, dd), 6.03 (1H, bs), 6.07 (1H, t), 7.07 (1H, t), 7.15 (1H, dd), 7.25 (2H, two doublets), 7.48 (1H, t), 7.75 (1H, bs), 7.92 (1H, bs).

An alternative Synthesis of Compound B is shown in Scheme 3

Scheme 3

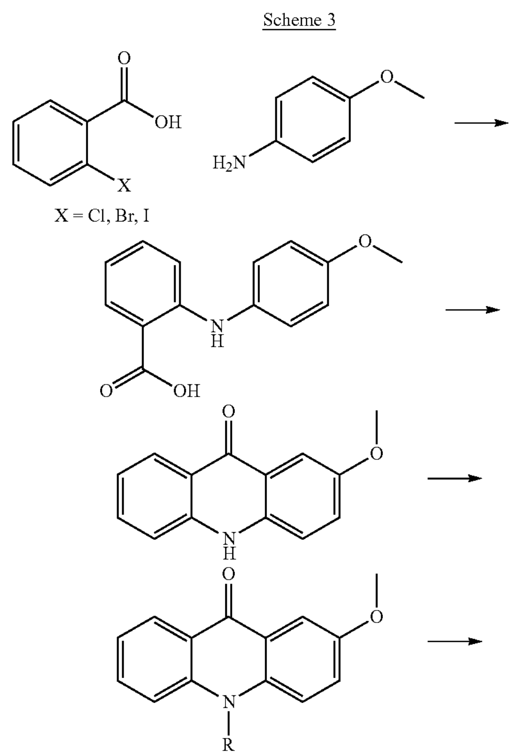

X = Cl, Br, I

-continued

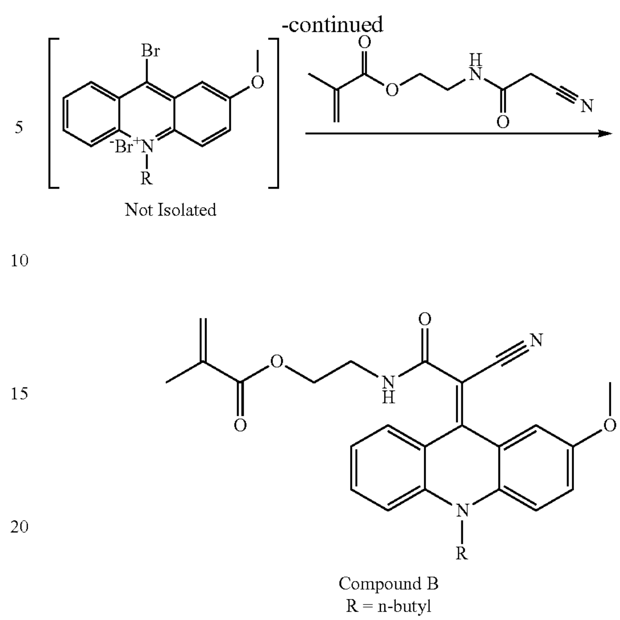

Not Isolated

Compound B
R = n-butyl

Synthesis of 2-(2-(10-butyl-2-methoxyacridin-9(10H)-ylidene)-2-cyanoacetamido)ethyl methacrylate or Compound B when R is n-butyl: A 3 neck 500 mL RBF equipped with a magnetic stir bar and a reflux condenser was charged with 9.43 g of triphenylphosphine (36 mmol) and 120 mL of anhydrous dichloromethane. Bromine (5.76 g, 33 mmol) was added dropwise to the solution, which was stirred at room temperature for an additional 30 minutes, after which, 10-butyl-2-methoxyacridin-9(10H)-one (8.43 g, 30 mmol) was added to the mixture and heated to reflux for 18 hours. 2-(2-cyanoacetamido)ethyl methacrylate (8.23 g, 36 mmol, 1.4 eq.) was added to the reaction mixture which was heated and stirred for an additional 8 hours. Very little starting material was observed at this point by TLC and an orange-brown compound was observed at the baseline. The mixture was cooled to room temperature, 150 mL of aqueous sodium carbonate (~10.6 g, 100 mmol dissolved $Na_2CO_3$) was added and the mixture stirred for 30 minutes. Treatment with base resulted in the desired compound. The aqueous layer was extracted with additional dichloromethane. The organics were removed under reduced pressure, and the product purified by chromatography. The crude material was first flushed through silica gel using dichloromethane and ethyl acetate to remove the polar components. Then, a second pass using ethyl acetate/hexanes or diethyl ether/hexanes after loading the material with a minimal amount of methylene chloride provided the desired product in yields >80%.

Select absorbance properties of Compounds A and B are shown in Table 1.

TABLE 1

| | $\lambda_{max}$ | | | | Extinction | |
|---|---|---|---|---|---|---|
| Cmpd | wavelength (nm) | Abs | Pathlength (cm) | Concentration (M) | Coefficient ($M^{-1}cm^{-1}$) | FWHM[1] (nm) |
| A | 463 | 1.312186 | 1 | 0.0001 | 13121.86 | 64 |
| B | 464 | 1.261670 | 1 | 0.0001 | 12616.70 | 62 |

[1]Full width half maximum (FWHM) at $\lambda_{max}$

The UV-VIS absorbance spectra of 0.1 mM methanolic solutions of Compound A and Compound B are shown in FIG. 1 and are superimposed on the literature spectrum of macular pigment.

Example 3—Contact Lenses

A reactive monomer mixture was prepared composed of 77 weight percent of the formulation listed in Table 2, and 23 weight percent of the diluent D3O. The reactive monomer mixture was filtered through a 3 μm filter using a stainless-steel syringe under pressure.

TABLE 2

| Component (weight %) | Ex. 3A | Ex. 3B |
|---|---|---|
| mPDMS | 30.9 | 30.9 |
| SiMAA | 27.9 | 27.9 |
| DMA | 23.92 | 23.92 |
| HEMA | 5.94 | 5.94 |
| TEGDMA | 1.5 | 1.5 |
| PVP K90 | 7 | 7 |
| Omnirad 1870 | 0.34 | 0.34 |
| Norbloc | 2 | 2 |
| Compound A | 0.5 | 0 |
| Compound B | 0 | 0.5 |

The reactive monomer mixture was degassed at ambient temperature by applying vacuum (40 torr) for at least 20 minutes. Then, in a glove box with a nitrogen gas atmosphere and less than about 0.1-0.2 percent oxygen gas, about 75 μL of the reactive mixture was dosed using an Eppendorf pipet at room temperature into the FC made of 90:10 (w/w) Z/TT blend. The BC made of 90:10 (w/w) Z:TT blend was then placed onto the FC. The molds were equilibrated for a minimum of twelve hours in the glove box prior to dosing. Pallets each containing eight mold assemblies were transferred into an adjacent glove box maintained at 62° C., and the lenses are cured from the top and the bottom using 405 nm LED lights having an intensity of about 2.0 $mW/cm^2$ for 10 minutes.

The lenses were manually de-molded and released by suspending the lenses in about one liter of 70 percent IPA for about one hour, followed by soaking two more times with fresh 70 percent IPA for 30 minutes; then overnight in DIW; followed by fresh DIW for 30 minutes; and then with packing solution for 30 minutes. Finally, the lenses were equilibrated and stored in borate buffered packaging solution. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels.

Figure 2:
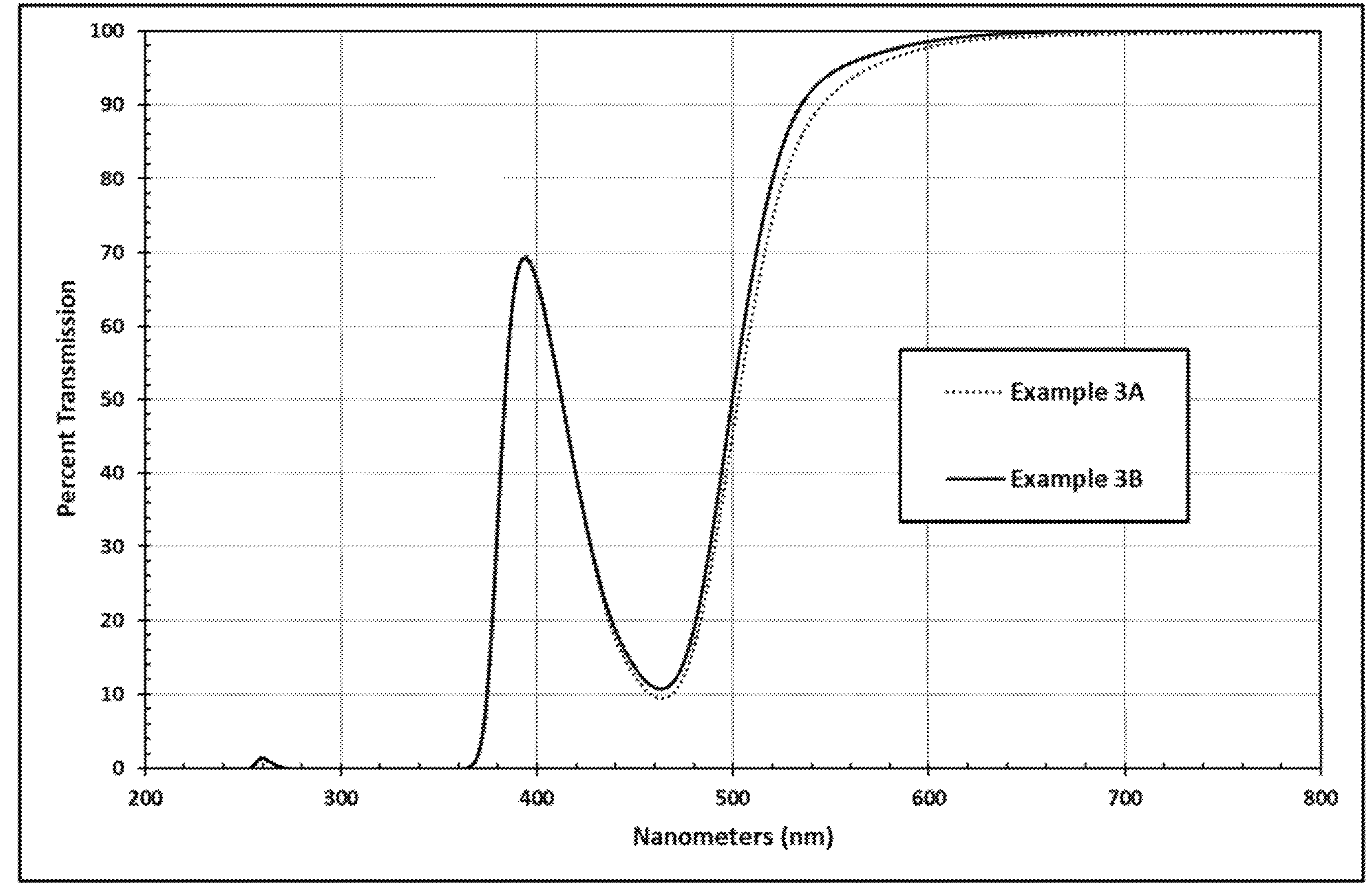
FIG. 2 shows UV-VIS transmission spectra of contact lenses prepared from Compound B.

The UV-VIS transmission spectra of two different sets of lenses (Examples 3A and 3B) in borate buffered packing solution are shown in FIG. 2.

Example 4: Thermal and Photochemical Stability Testing

A reactive monomer mixture was prepared composed of 77 weight percent of the formulation listed in Table 3, and 23 weight percent of the diluent D3O. From that reactive monomer mixture, lenses were fabricated on a pilot manufacturing line using double sided 395 nm LED cure with an intensity of 1.5 $mW/cm^2$ for 4 minutes followed by 5 $mW/cm^2$ for 4 minutes were used to cure the lenses. The lenses were packaged in standard blister packages with borate buffered packing solution containing about 50 ppm methyl ether cellulose; and the lenses (Ex. 4A) were sterilized at 121° C. for about 18 minutes.

TABLE 3

| Component (weight %) | Ex. 4A |
|---|---|
| mPDMS | 31 |
| SiMAA | 28 |
| DMA | 24.01 |
| HEMA | 6 |
| TEGDMA | 1.5 |
| PVP K90 | 7 |
| Omnirad 1870 | 0.34 |
| Norbloc | 2 |
| Visibility Tint | 0.06 |
| Compound B | 0.09 |

Figure 3:
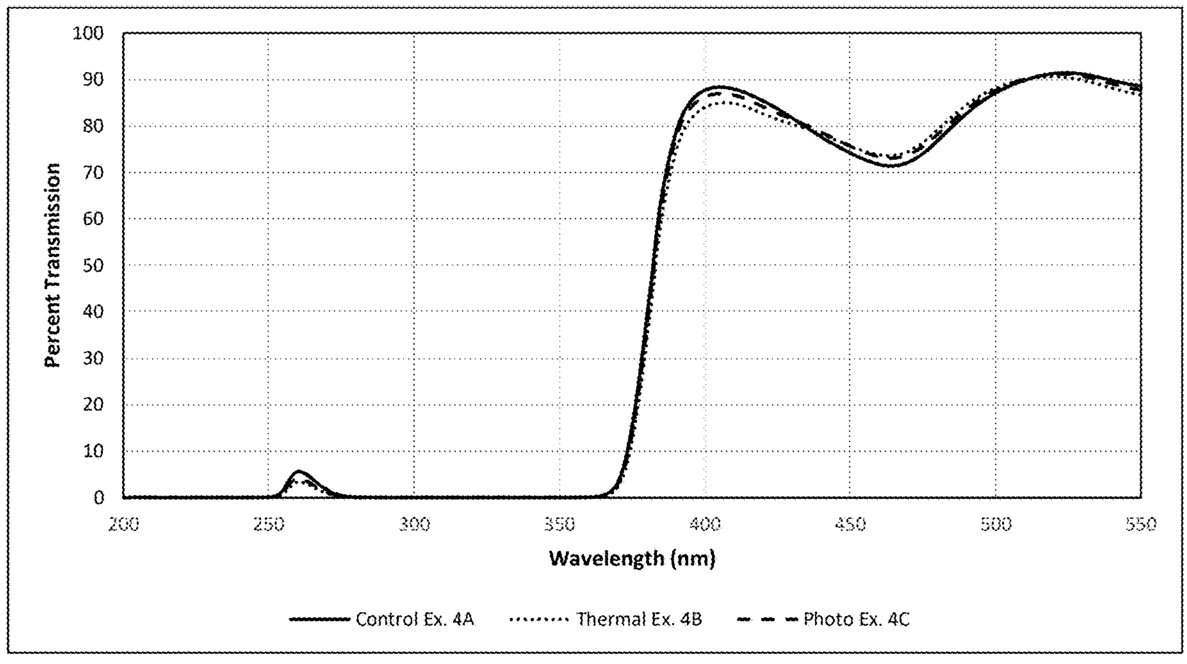
FIG. 3 shows UV-VIS transmission spectra of contact lenses prepared from Compound B before and after either thermal or photo-stress treatments.
Figure 3:
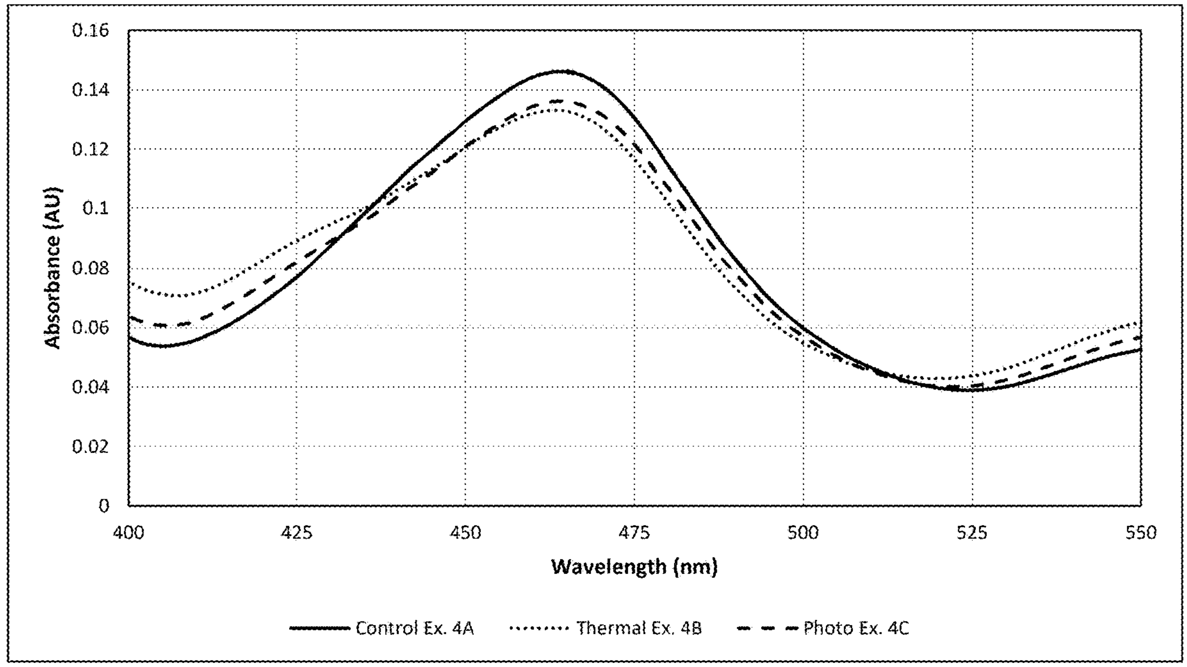

Ex. 4A lenses (Control lenses) were removed from their original blister packages and placed into individual glass vials containing 5 mL of borate buffered packing solution. The vials containing these lenses were stored in a stability chamber at 89° C. for one month. The lens parameters, mechanical properties, and UV-VIS spectral properties (average percent transmission across a range of wavelengths) of these thermally treated lenses (Ex. 4B) were subsequently measured and compared to the control lenses. These data are shown in Tables 4-6. Standard deviations are shown in parentheses. The UV-VIS spectra Examples 4A and 4B are shown in FIG. 3.

Blister packages containing Ex. 4A lenses were placed in a controlled photostability chamber (foil side down, bowl side up, so that the lenses in the bowls could be exposed to light). The photostability chambers were maintained at 25° C.±2° C. and ambient relative humidity. These lenses were then exposed sequentially to 1.5 million lux hours of visible light (168.8 hours of exposure) and 259.4 watt-hours/$m^2$ of ultraviolet light (16.2 hours of exposure). The lens parameters, mechanical properties, and UV-VIS spectral properties (average percent transmission across a range of wavelengths) of these photo-stressed lenses (Ex. 4C) were subsequently measured and compared to the control lenses. These data are shown in Tables 4-7. Standard deviations are shown in parentheses. The UV-VIS spectrum of Ex. 4C is also shown in FIG. 3.

TABLE 4

| Lens Parameters | | | |
|---|---|---|---|
| Lens Parameters | Ex. 4A | Ex. 4B | Ex. 4C |
| Lens Diameter (mm) | 14.44 (0.01) | 14.50 (0.01) | 14.45 (0.01) |
| Base Curve Radius (mm) | 8.61 (0.01) | 8.59 (0.07) | 8.59 (0.01) |
| Center Thickness (mm) | 0.085 (0.002) | 0.086 (0.001) | 0.086 (0.001) |
| PW2EQD (D) | −0.07 | −0.02 | −0.006 |
| RMS_65 (μm) | 0.03 | 0.06 | 0.03 |

TABLE 5

| Mechanical Properties | | | |
|---|---|---|---|
| Mechanical Properties | Ex. 4A | Ex. 4B | Ex. 4C |
| Modulus (psi) | 99 (5) | 113 (9) | 100 (5) |
| Elongation (%) | 214 (48) | 162 (39) | 231 (57) |
| Tensile strength (psi) | 106 (24) | 96 (20) | 110 (26) |
| Toughness (in-lb/in$^3$) | 113 (41) | 84 (34) | 135 (48) |
| Water (wt. %) | 38.2 (0) | 38.7 (0) | 39.8 (0) |

TABLE 6

| Spectral Properties | | | |
|---|---|---|---|
| | Average Percent Transmission across the Spectral Range | | |
| Spectral Range | Ex. 4A | Ex. 4B | Ex. 4C |
| Visible (380-780 nm) | 86.8 | 86.4 | 87.0 |
| UVA (315-380 nm) | 2.5 | 2.5 | 2.8 |
| UVB (280-315 nm) | 0.0 | 0.0 | 0.0 |
| 464 nm | 73.08 | 73.6 | 71.43 |
| 400-500 nm | 79.9 | 80.1 | 80.3 |

TABLE 7

| Thermal Stability and Photostability at Visible Light Absorption Maximum | | | | |
|---|---|---|---|---|
| Ex. 4A (control) Absorbance[1] | Ex. 4B Absorbance | Ex. 4B % Change | Ex. 4C Absorbance | Ex. 4C % Change |
| 0.1461 | 0.1328 | 9.1 | 0.1361 | 6.8 |

[1]at visible light absorption maximum

As shown by the small changes in the lens parameters, mechanical properties, and UV-VIS transmission spectra after the thermal treatment or light exposure, chromophores of Formula I, such as compound B, appear to be both thermally stable and photostable in contact lenses while substantially mimicking the UV-VIS spectrum of macular pigment.

Example 5

Reactive monomer mixtures were prepared composed of 77 weight percent of the formulation listed in Table 8, and 23 weight percent of the diluent D3O. From those reactive monomer mixtures, lenses were fabricated on a pilot manufacturing line using double sided 395 nm LED cure with an intensity of 0.5 mW/cm$^2$ for 4 minutes followed by 3 mW/cm$^2$ for 4 minutes at 70° C. and an oxygen gas concentration of less than 5% (v/v). The FC was made of 90:10 (w/w) Z/TT blend, and the BC was made of 90:10 (w/w) Z:TT blend. The lenses were de-molded and released by suspending the mold assemblies in 70 percent IPA for about one hour, followed by soaking two more times with fresh 70 percent IPA for 30 minutes and then several washes with DIW. The lenses were finally packaged in standard blister packages with borate buffered packing solution containing about 50 ppm methyl ether cellulose. Example 5 lenses were sterilized by autoclaving at 121° C. for about 18 minutes.

Figure 4:
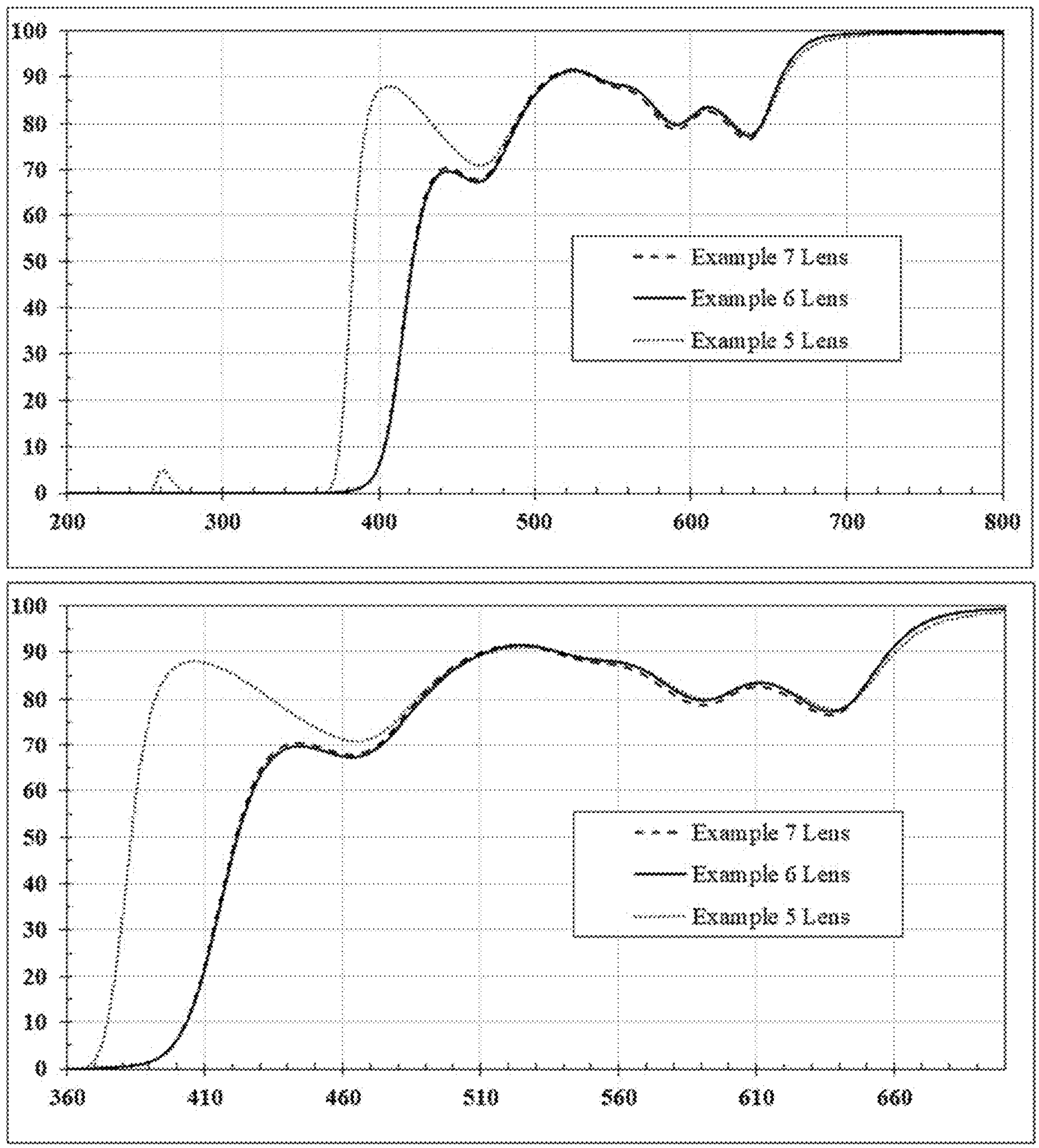
FIG. 4 shows UV-VIS transmission spectra of contact lenses from Examples 5, 6, and 7.

The physical and mechanical properties of the Example 5 lenses were measured and listed in Table 8. The UV-VIS transmission spectra of Example 5 lenses were measured and shown in FIG. 4.

Example 6

Reactive monomer mixtures were prepared composed of 77 weight percent of the formulation listed in Table 8, and 23 weight percent of the diluent D3O. From those reactive monomer mixtures, lenses were fabricated on a pilot manufacturing line using double sided 435 nm LED cure with an intensity of 2 mW/cm$^2$ for 4 minutes followed by 12 mW/cm$^2$ for 4 minutes at 70° C. and an oxygen gas concentration of less than 5% (v/v). The FC was made of 90:10 (w/w) Z/TT blend, and the BC was made of 90:10 (w/w) Z:TT blend. The lenses were de-molded and released by suspending the mold assemblies in 70 percent IPA for about one hour, followed by soaking two more times with fresh 70 percent IPA for 30 minutes and then several washes with DIW. The lenses were finally packaged in standard blister packages with borate buffered packing solution containing about 50 ppm methyl ether cellulose. Example 6 lenses were sterilized by autoclaving at 121° C. for about 18 minutes.

The physical and mechanical properties of Example 6 lenses were measured and listed in Table 8. The UV-VIS transmission spectra of Example 6 lenses were measured and shown in FIG. 4.

Example 7

A reactive monomer mixture was prepared composed of 77 weight percent of the formulation listed in Table 8, and 23 weight percent of the diluent D3O. From that reactive monomer mixture, lenses were fabricated by thermal cure using AIBN at 90° C. for 180 minutes in a glove box and a nitrogen gas atmosphere. The FC and BC were made of 1430R Zeonor. The lenses were de-molded and released by suspending the mold assemblies in 70 percent IPA for about one hour, followed by soaking two more times with fresh 70 percent IPA for 30 minutes and then several washes with DIW. The lenses were finally packaged in standard blister packages with borate buffered packing solution containing about 50 ppm methyl ether cellulose. The lenses were sterilized by autoclaving at 121° C. for about 18 minutes.

The physical and mechanical properties of Example 7 lenses were measured and listed in Table 8. Spectral properties of Examples 1-3 lenses are listed in Table 9. The UV-VIS transmission spectrum of lenses was measured and shown in FIG. 4. The UV-VIS spectrum of thermally cured Example 7 lenses was almost identical to UV-VIS spectrum of the photochemically cured Example 6 lenses made from the same formulation. Moreover, Example 6 lenses and Example 7 lenses absorb significantly more HEV light than Example 5 lenses.

TABLE 8

| Formulations and Physical Properties | | | |
|---|---|---|---|
| | Example 5 | Example 6 | Example 7 |
| Component (weight %) | | | |
| mPDMS | 31 | 30 | 30 |
| SiMAA | 28 | 27.6 | 27.6 |
| DMA | 24.01 | 24 | 24 |

TABLE 8-continued

| Formulations and Physical Properties | | | |
|---|---|---|---|
| | Example 5 | Example 6 | Example 7 |
| HEMA | 5.85 | 5.85 | 5.82 |
| TEGDMA | 1.65 | 1.65 | 1.65 |
| PVP K90 | 7 | 7 | 7 |
| Omnirad 1870 | 0.34 | 0.34 | 0 |
| AIBN | 0 | 0 | 0.37 |
| Norbloc | 2 | 1 | 1 |
| RB247 | 0.06 | 0.06 | 0.06 |
| Compound B | 0.09 | 0.09 | 0.09 |
| Compound C | 0 | 2.41 | 2.41 |
| Σ Components | 100 | 100 | 100 |
| Properties | | | |
| WC (wt. %) | 38 (0) | 39 (0) | 38 (0) |
| EC Dk (barrers) | 101 | 94 | 91 |
| TS (psi) | 102 (23) | 132 (15) | 109 (30) |
| ETB (%) | 230 (51) | 264 (23) | 235 (42) |
| TM (psi) | 92 (5) | 95 (5) | 94 (11) |
| Toughness (in*lb/in$^3$) | 123 (45) | 176 (29) | 134 (51) |
| Kruss DCA (°) | 52 (1) | 50 (1) | 53 (4) |
| Sessile Drop (°) | FC = 39 (4); BC = 38 (3) | FC = 32 (0); BC = 33 (2) | FC = 35 (1) |
| RI | 1.4145 | 1.4193 | 1.388 |

TABLE 9

| Spectral Transmission Properties | | | | |
|---|---|---|---|---|
| Spectral Range | Wavelength Range (nm) | Example 5 (% T) | Example 6 (% T) | Example 7 (% T) |
| Visible | 380-780 | 87.1 | 78.8 | 78.8 |
| UVA | 315-380 | 2.9 | 0.1 | 0.1 |
| UVB | 289-315 | 0.0 | 0.0 | 0.0 |
| HEV | 380-450 | 79.4 | 34.7 | 35.4 |

Example 8

Figure 5:
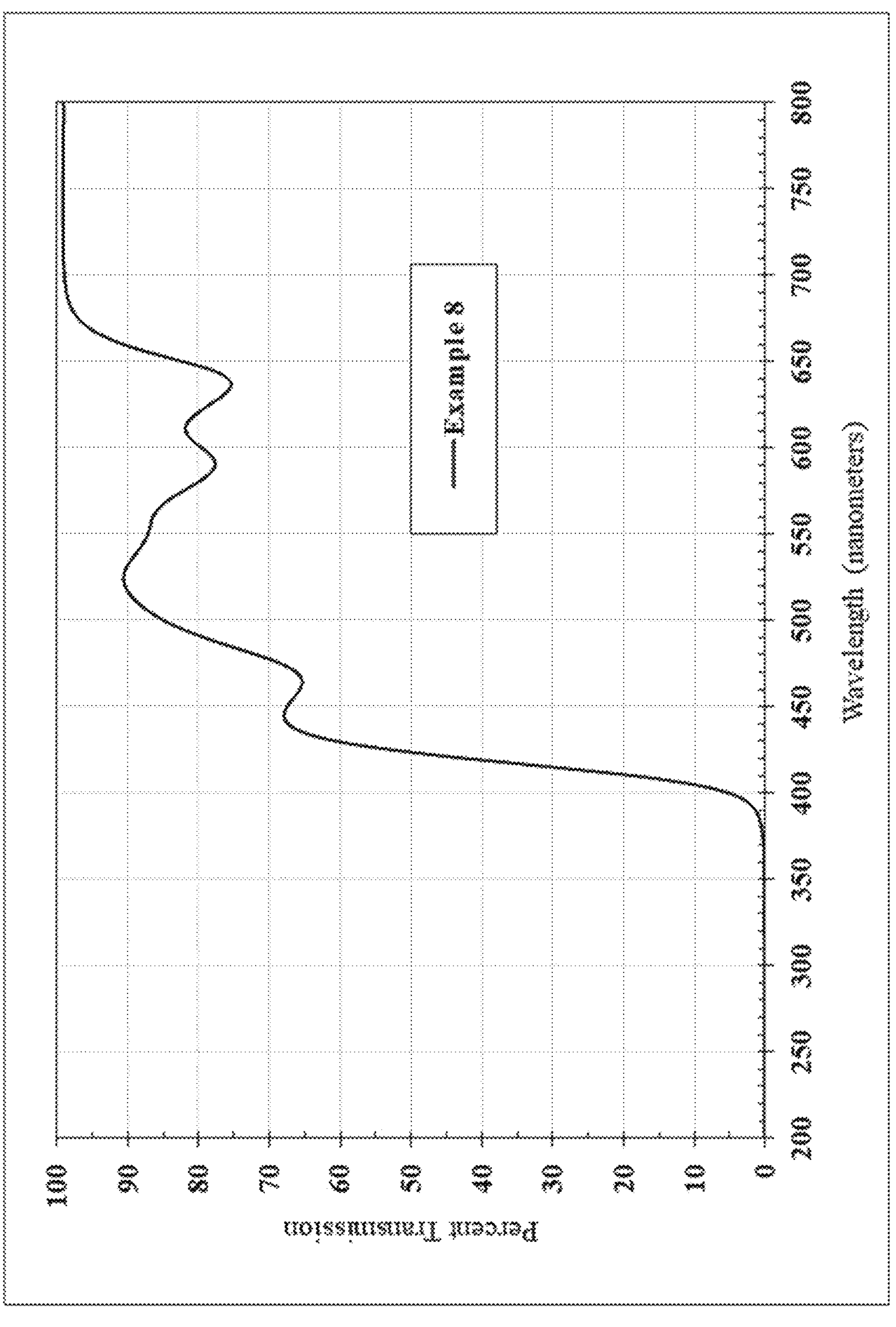
FIG. 5 shows UV-VIS transmission spectra of contact lenses from Example 8.

A reactive monomer mixture was prepared composed of 77 weight percent of the formulation listed in Table 10, and 23 weight percent of the diluent D3O. From that reactive monomer mixture, lenses were fabricated by thermal cure using AIBN at 90° C. for 180 minutes in a glove box and a nitrogen gas atmosphere. The FC and BC were made of 1430R Zeonor. The lenses were de-molded and released by suspending the mold assemblies in 70 percent IPA for about one hour, followed by soaking two more times with fresh 70 percent IPA for 30 minutes and then several washes with DIW. The lenses were finally packaged in standard blister packages with borate buffered packing solution containing about 50 ppm methyl ether cellulose. The lenses were sterilized by autoclaving at 121° C. for about 18 minutes. The physical and mechanical properties of the Example 8 lenses were measured and listed in Table 10. Spectral properties of Example 8 lenses are listed in Table 11. The UV-VIS transmission spectrum of lenses was measured and shown in FIG. 5.

TABLE 10

| Formulations and Physical Properties | |
|---|---|
| | Example 8 |
| Component (weight %) | |
| OH-mPDMS (n = 4) | 25 |
| OH-mPDMS (n = 15) | 26.61 |
| DMA | 22 |
| HEMA | 8.4 |
| PVP K90 | 9 |
| EGDMA | 0.25 |
| Tegomer MA | 5 |
| Norbloc | 1 |
| RB247 | 0.06 |
| Compound B | 0.09 |
| Compound C | 2.41 |
| AIBN | 0.18 |
| Σ Components | 100 |
| Properties | |
| WC (wt. %) | 40 (0) |
| EC Dk (barrers) | 108 |
| TS (psi) | 118 (27) |
| ETB (%) | 231 (52) |
| TM (psi) | 99 (6) |
| Toughness (in*lb/in$^3$) | 149 (55) |
| Kruss DCA (°) | 52 (5) |
| Sessile Drop (°) | FC = 34 (2) |
| RI | 1.3956 |

TABLE 11

| Spectral Transmission Properties | | |
|---|---|---|
| Spectral Range | Wavelength Range (nm) | Example 8 (% T) |
| Visible | 380-780 | 77.6 |
| UVA | 315-380 | 0.1 |
| UVB | 289-315 | 0 |
| HEV | 380-450 | 33.1 |

Example 9

Reactive monomer mixtures 9A and 9B were formed by mixing the reactive components listed in Table 12 with the diluent D3O wherein in the weight ratio of the reactive components to diluent is 77:23 (w/w). The resulting formulations were filtered independently through a 3 μm filter and degassed by applying vacuum (about 40 mm Hg). The target spherical power of the mold designs was nominally minus one diopter. Both the FC and BC were made of 90:10 (w/w) Z/TT blend. The molds were equilibrated for a minimum of twelve hours in the glove box prior to dosing. The lenses were fabricated in the pilot manufacturing line using double sided 435 nm LED cure. In a nitrogen gas atmosphere and about 0.8 percent oxygen gas, about 5 μL of the reactive mixture 9A were dosed at room temperature into the FC. Then, about 75 μL of the reactive mixture 9B were dosed on top of the 9A micro-dose. The BC was placed on top of the FC. The mold assembly was equilibrated for 6-7 minutes at 70° C. and then cured from the top and the bottom using 435 nm LED lights with 2 mW/cm$^2$ for 6-7 minutes followed by 5 mW/cm$^2$ for 6-7 minutes. The lenses were de-molded and released by suspending the mold assemblies in percent IPA for about one hour, followed by soaking two more times with fresh 70 percent IPA for 30 minutes and then several washes with DIW. The lenses were finally packaged in standard blister packages with borate buffered packing solution containing about 50 ppm methyl ether cellulose. The lenses were sterilized by autoclaving at 121° C. for about 18 minutes.

Figure 6:
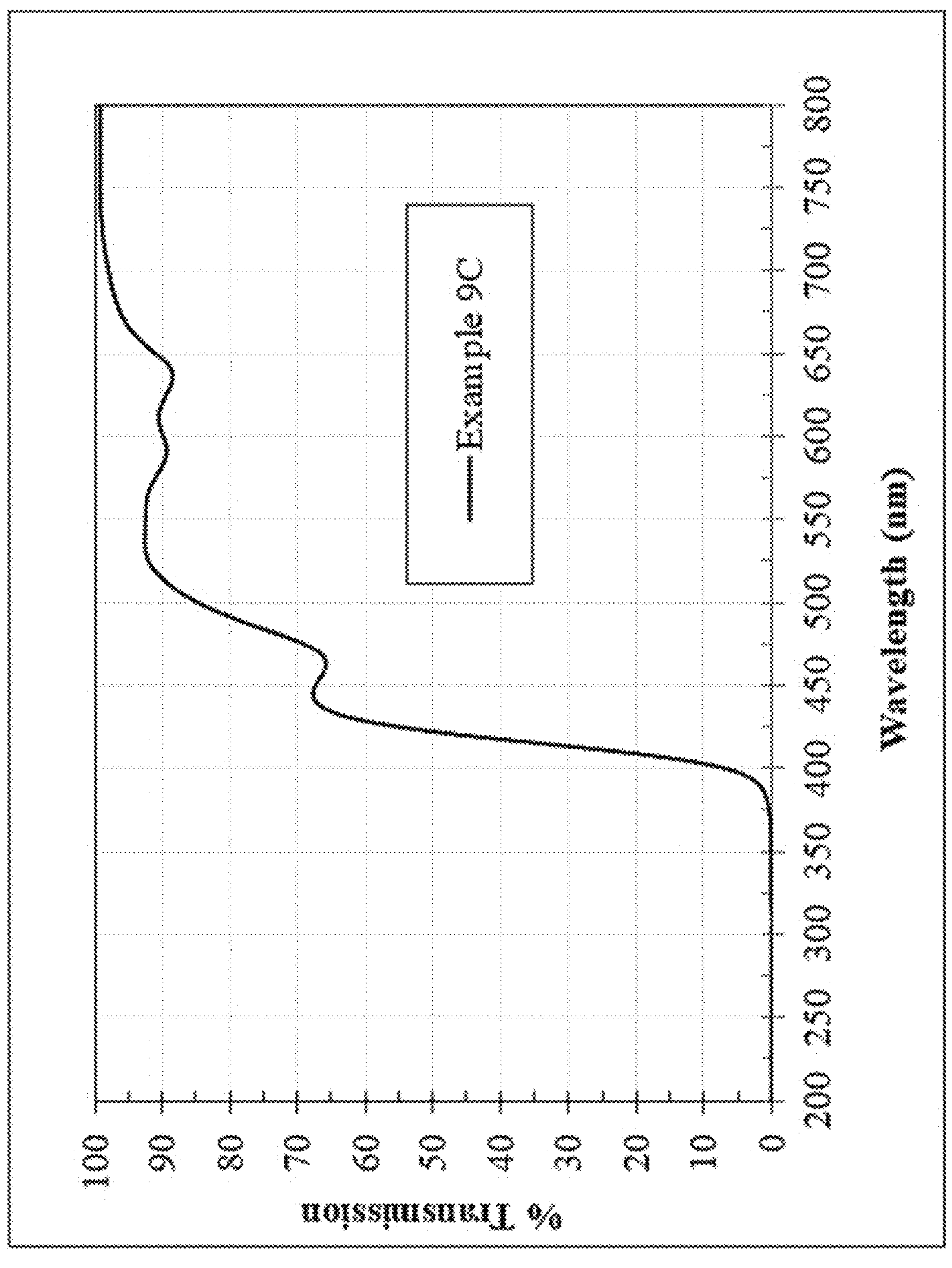
FIG. 6 shows UV-VIS transmission spectra of contact lenses from Example 9C.

The physical and mechanical properties of the sterilized Example 9C lenses were measured and listed in Table 12. The UV-VIS transmission spectrum of Example 9C lenses was measured and shown in FIG. 6.

TABLE 12

| Formulations and Physical Properties | | |
|---|---|---|
| Component (weight %) | Example 9A | Example 9B |
| mPDMS | 31.82 | 27.1 |
| SiMAA | 29 | 29.83 |
| DMA | 21 | 24 |
| HEMA | 6 | 5.85 |
| TEGDMA | 1.49 | 1.65 |
| PVP K90 | 9.38 | 7 |
| Omnirad 1870 | 1 | 0.55 |
| Norbloc | 0 | 1 |
| RB247 | 0.05 | 0.02 |
| Compound B | 0.27 | 0 |
| Compound C | 0 | 3 |
| Σ Components | 100 | 100 |

TABLE 12-continued

| Properties | Example 5C |
|---|---|
| WC (wt. %) | 38 (0) |
| EC Dk (barrers) | 110 |
| TS (psi) | 94 (24) |
| ETB (%) | 219 (60) |
| TM (psi) | 97 (5) |
| Toughness (in*lb/in$^3$) | 114 (51) |
| Kruss DCA (°) | 48 (3); 37 (2) |
| Sessile Drop (°) | FC = 37 (3); BC = 44 (3) |
| RI | 1.4131 |

Example 10. Synthesis of 3-((9-(dicyanomethylene)-9H-xanthen-3-yl)oxy)propyl methacrylate (Compound D) as shown in Scheme 4

Scheme 4

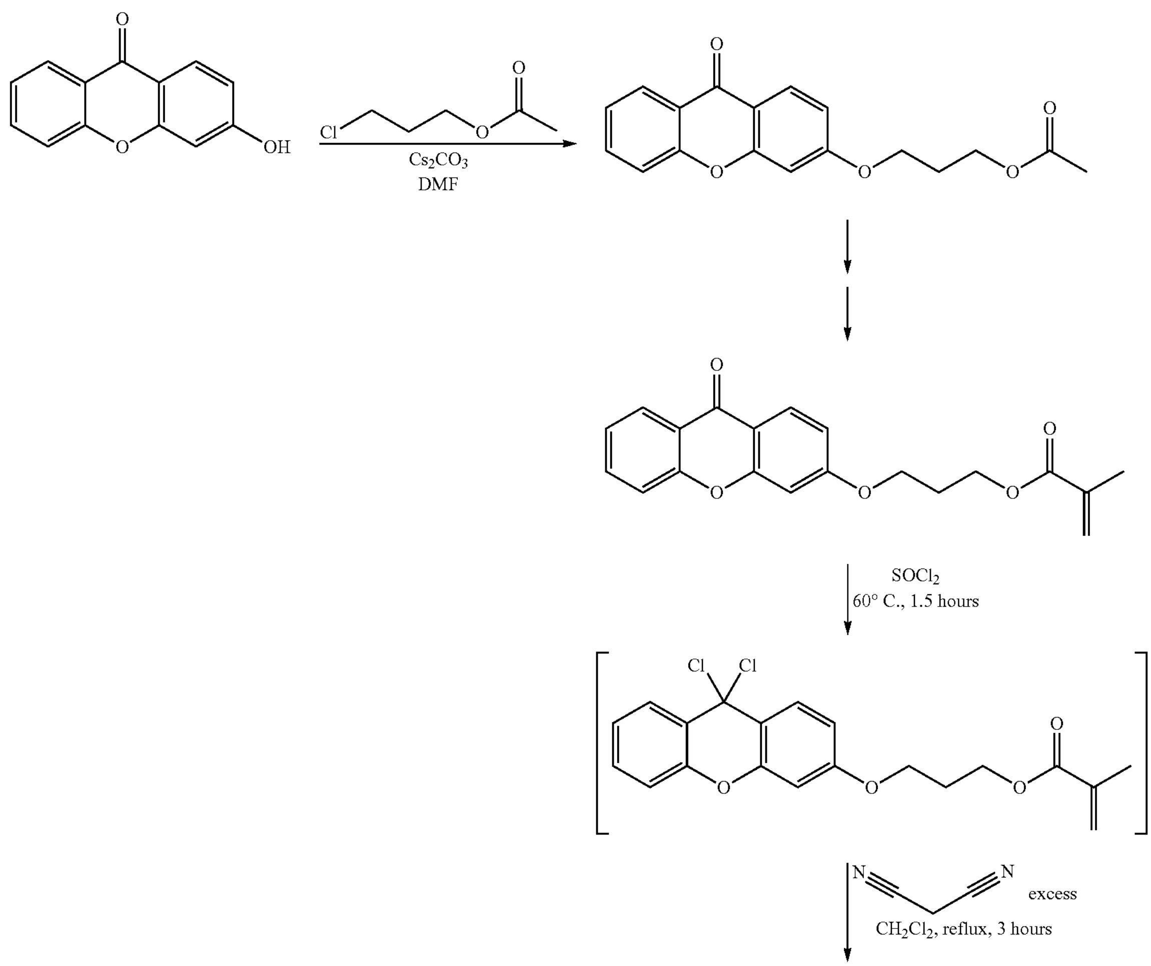

-continued

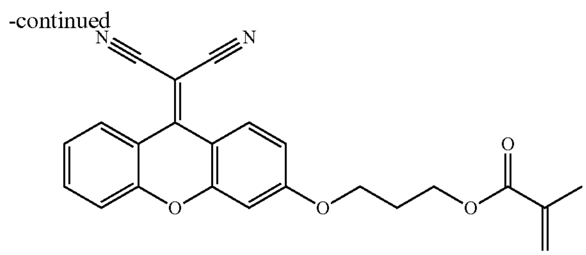

Compound D

Synthesis of 3-((9-oxo-9H-xanthen-3-yl)oxy)propyl acetate

A suspension of 3-hydroxy-9H-xanthen-9-one (42.4 grams, 0.2 mole), 70.0 grams $Cs_2CO_3$ (0.2 mole), and sodium iodide (catalytic 200 milligrams) were dried under vacuum in a 500 mL round bottom flask containing a magnetic stirring bar. Anhydrous DMSO (250 mL) was added followed by 2-chloroethyl methacrylate (30.0 grams, 0.2 mole). The reaction mixture was heated overnight at 70° C. Monitoring by TLC indicated complete consumption of the hydroxyxanthenone along with the formation of a less polar derivative. The reaction mixture was cooled to room temperature and slowly poured into dilute aqueous hydrochloric acid with constant stirring. After stirring for thirty minutes, the off-white solids were isolated by vacuum filtration using a fritted glass funnel. The filter cake was washed with deionized water, followed by two washes with 200 mL of hexanes. The 3-((9-oxo-9H-xanthen-3-yl)oxy) propyl acetate was vacuum dried at 60° C. to constant weight.

Synthesis of 3-((9-oxo-9H-xanthen-3-yl)oxy)propyl alcohol 27 grams of 3-((9-oxo-9H-xanthen-3-yl)oxy)propyl acetate was stirred in about 700 mL of methanol at room temperature, during which 20 mL of 10 N aqueous sodium hydroxide solution was added to the mixture, followed by about 30 mL of deionized water. Monitoring by TLC indicated that the hydrolysis reaction was complete within a few minutes. The mixture was slowly acidified by addition of dilute aqueous hydrochloride acid, after which 150 mL of deionized water was added while constantly stirring the system. The 3-((9-oxo-9H-xanthen-3-yl)oxy)propyl alcohol was isolated by vacuum filtration using a fritted glass funnel, washed with additional amounts of water, and finally dried in a vacuum oven at 60° C.

Synthesis of 3-((9-oxo-9H-xanthen-3-yl)oxy)propyl methacrylate grams of 3-((9-oxo-9H-xanthen-3-yl)oxy)propanol and 15 mL (10.89 grams) of triethylamine were stirred in 300 mL of anhydrous acetonitrile in a three neck, one liter round bottom flask equipped with a magnetic stirring bar and a reflux condenser. Methacryloyl chloride (9.9 grams) was added to the flask in a dropwise fashion, and mixture was stirred for an hour. The volatile components were evaporated under reduced pressure, and the resulting solids were washed and filtered over a fritted glass funnel and rinsed with deionized water. The residue was washed further with dilute aqueous hydrochloric acid, followed by additional washes with deionized water and finally washed with hexanes. The 3-((9-oxo-9H-xanthen-3-yl)oxy)propyl methacrylate was then dried in a rotary evaporator with bath temperature maintained below 20° C.

Synthesis of 3-((9-(dicyanomethylene)-9H-xanthen-3-yl)oxy)propyl methacrylate (Compound D)

Figure 7:
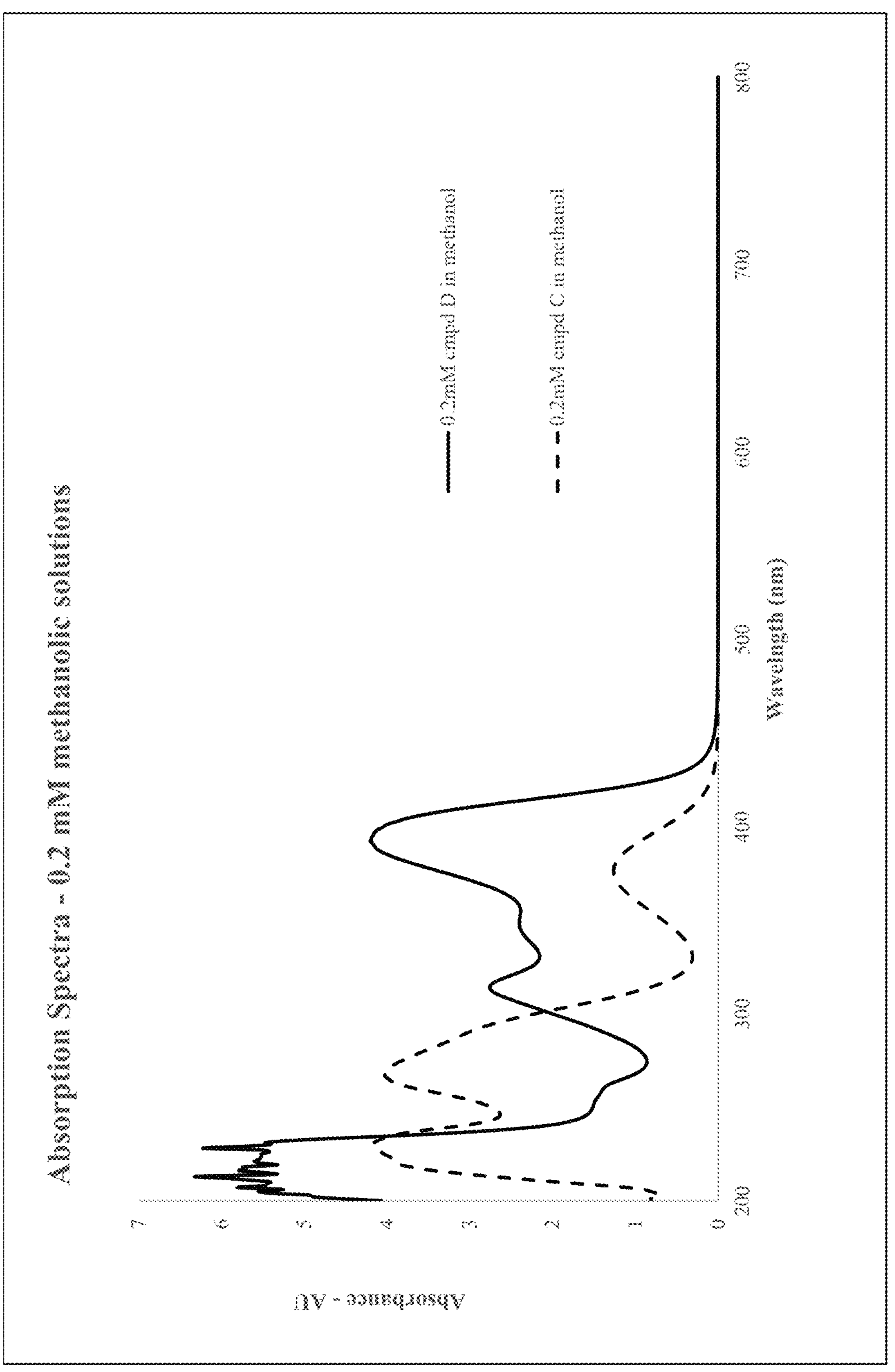
FIG. 7 shows UV-VIS absorption spectra of Compounds C and D.

6.76 grams of 3-((9-oxo-9H-xanthen-3-yl)oxy)propyl methacrylate and 15 mL of thionyl chloride were heated for 2 hours at 65° C. (mantle temperature) in a round bottom flask equipped with a magnetic stirring bar and reflux condenser. The mixture was cooled to room temperature, and the excess thionyl chloride was evaporated under reduced pressure with the bath temperature maintained below 20° C. 3.96 grams of malononitrile was added to the flask, followed by 25 mL of anhydrous dichloromethane, and the mixture was stirred and heated at a gentle reflux for two hours. The mixture was cooled to room temperature and then flushed through a short silica gel plug eluting with methylene chloride. Volatile components were evaporated under reduced pressure with the temperature maintained below 20° C., after which the solids were suspended in cold methanol (100 mL) and stirred for 20 minutes. The crude product was isolated by vacuum filtration and the filter cake washed with additional cold methanol. 3-((9-(dicyanomethylene)-9H-xanthen-3-yl)oxy)propyl methacrylate was further purified by passing through a silica gel column eluting with methylene chloride. $^1H$ NMR (500 MHz, $CDCl_3$) –δ 1.95 (3H, $CH_3$), 2.25 (2H, m, $CH_2$), 4.20 (2H, t, $CH_2$ benzylic), 4.37 (2H, t, $CH_2O$ ester), 5.59 (1H, m, vinylic), 6.12 (1H, m, vinylic), 6.90 (1H, dAr-H), 6.97 (1H, dd, Ar-H), 7.40 (1H, ddd, Ar-H), 7.45 (1H, dd, Ar-H), 7.68 (1H, ddd, Ar-H), 8.50 (1H, d, Ar-H), 8.57 (1H, dd, Ar-H). The UV-VIS absorbance spectra of compounds C and D are shown in FIG. 7. Compound D exhibited a molar extinction coefficient of 19,341 $L\cdot mol^{-1}\cdot cm^{-1}$ as calculated at lambda max)max=396 nanometers in 0.2 mM dichloromethane.

Example 11. Synthesis of (9,10-dioxo-9,10-dihydroanthracene-1,4-diyl)bis (azanediyl)) bis(ethane-2,1-diyl))bis(oxy))bis(ethane-2,1-diyl))bis(oxy))bis (ethane-2,1-diyl) bis(2-methyl acrylate) as shown in Scheme 5

Scheme 5

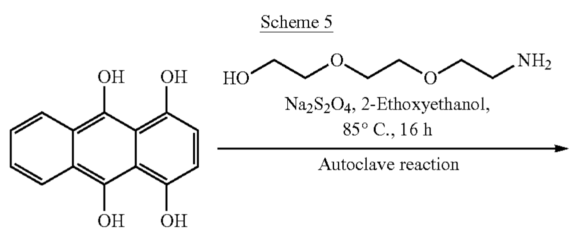

-continued

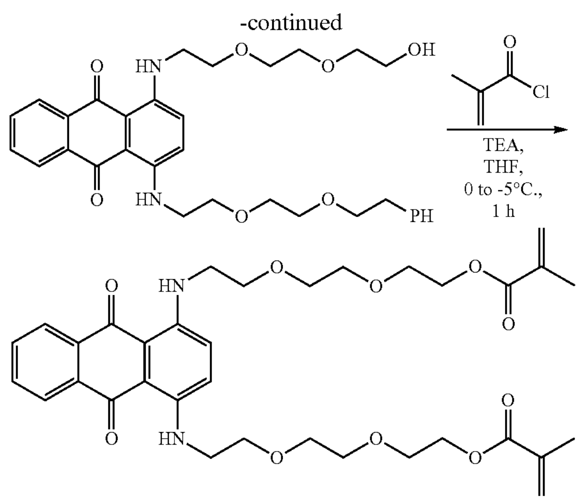

Anthracene-1,4,9,10-tetraol (75 grams, 0.3096 moles), 2-ethoxy ethanol (225 mL), 2-(2-(2-aminoethoxy) ethoxy) ethan-1-ol (161.58 grams, 1.083 moles), and sodium dithionite (107.81 grams, 0.6192 moles) were added into autoclave chamber under a nitrogen atmosphere at an ambient temperature. Reaction mixture was vigorously stirred for 16 hours at 85° C. under 5 kilograms of nitrogen gas pressure. Progress of reaction was monitored by thin layer chromatography (5% methanol in dichloromethane). Upon completion of reaction, reaction mixture was cooled to ambient temperature. Dichloromethane (2000 mL) and deionized water (1000 mL) were added, and the reactive mixture was stirred for 5-7 minutes. The organic layer was separated, and the aqueous layer was extracted with dichloromethane (500 mL). The combined organic extracts were washed with water (2×1000 mL) and brine (2×1000 mL). Activated charcoal (75 grams) was added into organic layer and stirred overnight at room temperature. The activated charcoal was removed by filtration through celite and washed with dichloromethane (3000 mL). The filtrate was dried over sodium sulphate and filtered. The solvent was removed under reduced pressure to afford a crude mass of 1,4-bis((2-(2-(2-hydroxyethoxy) ethoxy) ethyl) amino) anthracene-9,10-dione (126 grams). The crude product was stirred in ethyl acetate (1000 mL) for one hour at 60° C. followed by stirring for 14-16 hours at an ambient temperature. The solid was filtered and washed with ethyl acetate (300 mL), and the residue was air dried for 14-16 hour at 45° C. to afford 1,4-bis((2-(2-(2-hydroxyethoxy)ethoxy)ethyl)amino)anthracene-9,10-dione (100.0 grams; yield=64%) as a blue solid. $^1$H-NMR (DMSO-$d^6$, 400 MHz): δ 3.70-3.45 (m, 24H), 7.51 (s, 2H), 7.78 (m, 2H), 8.25 (m, 2H), 10.89 (br s, 2H).

Figure 8:
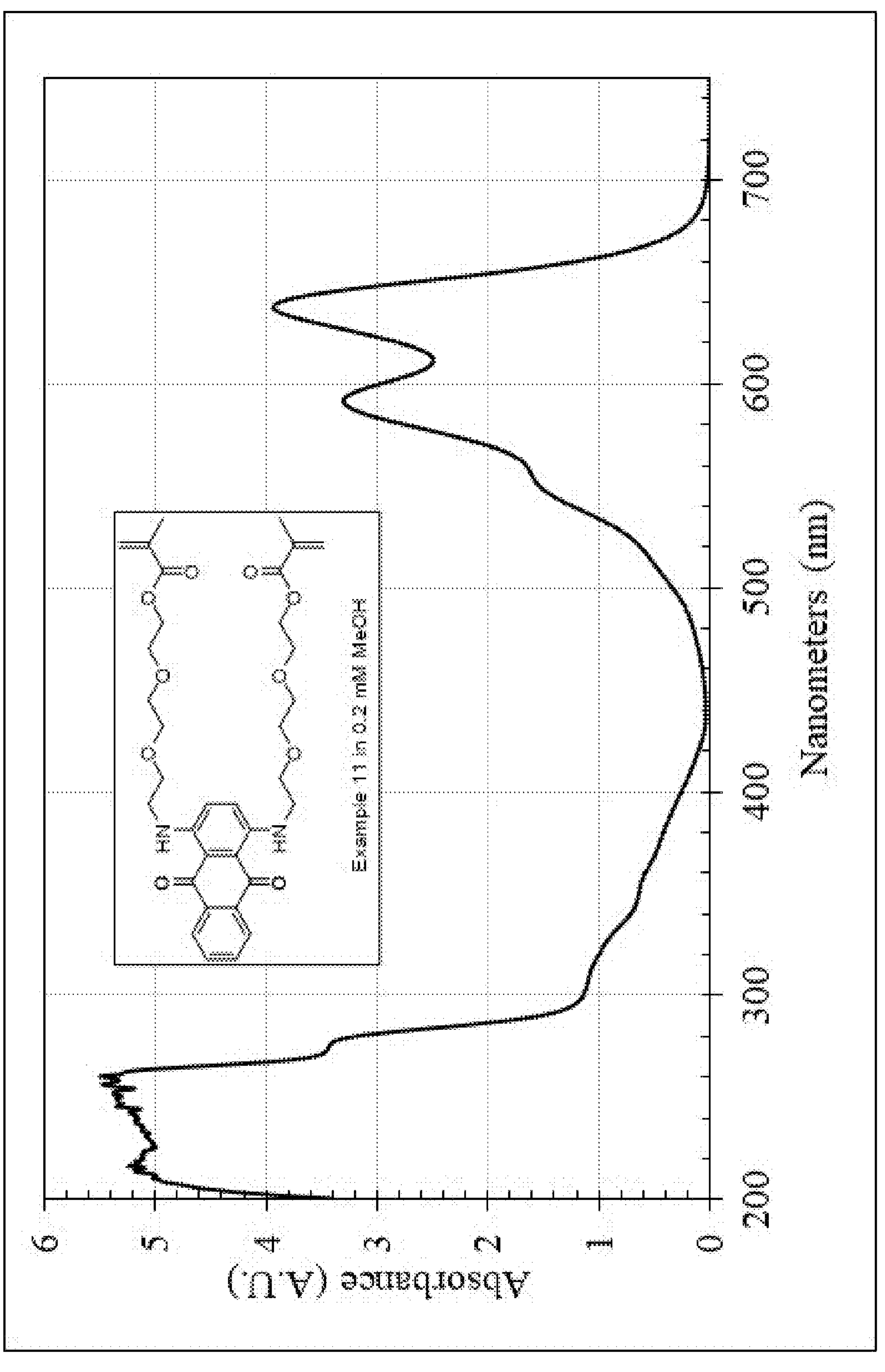
FIG. 8 shows the UV-VIS absorption spectra of an Example 11 Compound.

To a solution of 1,4-bis((2-(2-(2-hydroxyethoxy)ethoxy) ethyl)amino)anthracene-9,10-dione (75.0 grams, 0.1493 moles) in tetrahydrofuran (1500 mL) was added triethylamine (302.1 grams, 414.97 mL, 2.9866 moles) at an ambient temperature. After 15 minutes of stirring, a solution of methacryloyl chloride (62.43 grams, 58.35 mL, 0.5973 moles) in tetrahydrofuran (150 mL) was added dropwise while maintaining the reaction temperature between 0° and −5° C. The reaction mixture was stirred for 1 hour at 0 to −5° C., and progress of the reaction was monitored by thin layer chromatography (5% methanol in dichloromethane). Upon completion of reaction, ethyl acetate (3000 mL) and deionized water (2000 mL) were added at 10-15° C., and reaction mixture was stirred for 8-10 minutes. The organic layer was separated, and the aqueous layer was extracted with ethyl acetate (3×1000 mL). The combined organic extracts were washed with deionized water (4×2000 mL) and brine (1000 mL), dried over sodium sulphate, and filtered. The solvents were removed under reduced pressure to afford a crude product (86 grams) which was then purified by column chromatography using 230-400 mesh size silica gel (2.8 kg), eluted with 0.1-0.5% methanol in dichloromethane to yield (9,10-dioxo-9,10-dihydroanthracene-1,4-diyl)bis (azanediyl)) bis(ethane-2,1-diyl))bis(oxy))bis(ethane-2,1-diyl))bis(oxy))bis(ethane-2,1-diyl) bis(2-methyl acrylate) (22 grams; yield=23%) as blue solid. $^1$H-NMR (DMSO-$d^6$, 400 MHz): δ 1.83 (s, 6H), 4.20-4.16 (m, 20H), 4.21 (m, 4H), 5.62 (s, 2H), 5.98 (s, 2H), 7.5 (s, 2H), 7.77 (m, 2H), 8.23 (m, 2H), 10.87 (t, 2H, J=5.2, 5.6 Hz). The UV-VIS absorption spectrum of (9,10-dioxo-9,10-dihydroanthracene-1,4-diyl) bis(azanediyl)) bis(ethane-2,1-diyl))bis(oxy))bis(ethane-2,1-diyl))bis(oxy))bis(ethane-2,1-diyl) bis(2-methyl acrylate) in a 0.2 mM methanol solution is shown in FIG. 8.

Example 12. Synthesis of N, N'-(((((((9,10-dioxo-9,10-dihydroanthracene-1,4-diyl)bis(azanediyl)) bis (ethane-2,1-diyl))bis(oxy))bis(ethane-2,1-diyl))bis (oxy))bis(ethane-2,1-diyl))diacrylamide as shown in Scheme 6

Scheme 6

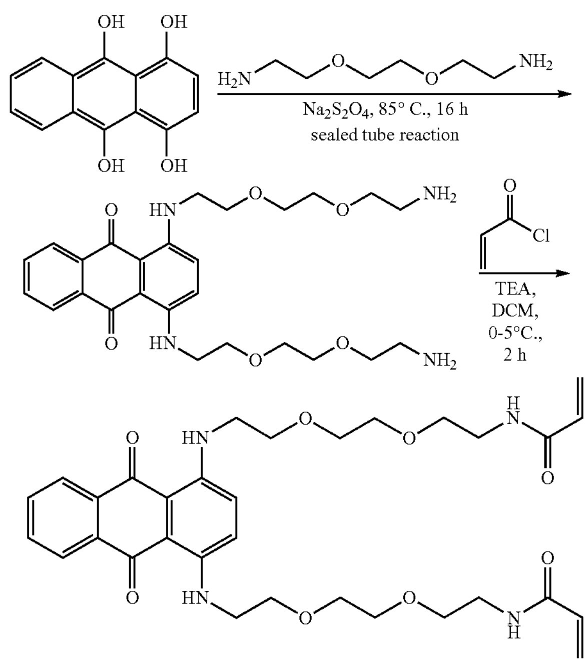

Anthracene-1,4,9,10-tetraol (10.0 grams, 0.042 moles), 2,2'-(ethane-1,2-diylbis(oxy))bis(ethan-1-amine) (61.17 grams, 0.413 moles), and sodium hydrosulphite (10.0 grams, 0.058 moles) were added into tube at ambient temperature and then sealed. The reaction mixture was stirred for 16 hours at 85° C. The progress of reaction was monitored by thin layer chromatography (20% methanol in dichloromethane). After the reaction was completed, the reaction mixture was cooled down to room temperature, and deionized water (250 mL) and dichloromethane (250 mL) were added. The aqueous layer was re-extracted with dichloromethane (250 mL). The combined organic extracts were washed with deionized water (250 mL) and brine (250 mL). The organic phase was then dried over anhydrous sodium sulphate, filtered, and evaporated under reduced pressure to yield a crude product (23 grams) which was used in the next step without further purification.

To a solution 1,4-bis((2-(2-(2-aminoethoxy)ethoxy)ethyl) amino)anthracene-9,10-dione (23.0 g, 0.046 moles) in dichloromethane (690 mL), triethylamine (46.5 grams, 64 mL, 0.46 moles) was added slowly at an ambient temperature, followed by the dropwise addition of a solution of acryloyl chloride (12.4 grams, 10.8 mL, 0.1379 moles) in dichloromethane (46 mL) while maintaining the reaction temperature between 0° C. and 5° C. and subsequently stirring for two hours. The progress of reaction was monitored by thin layer chromatography (5% methanol in dichloromethane. Upon completion of reaction, saturated sodium bicarbonate solution (300 mL) was added to reaction mixture at 0-5° C. The organic layer was separated, and aqueous layer was re-extracted with dichloromethane (2×230 mL). The combined organic extract were washed with deionized water (460 mL) and brine (460 mL), dried over sodium sulphate, filtered, and evaporated under reduced pressure at 30° C. to yield N, N'-(((((((9,10-dioxo-9,10-dihydroanthracene-1,4-diyl)bis(azanediyl)) bis(ethane-2,1-diyl))bis(oxy)) bis(ethane-2,1-diyl))bis (oxy))bis(ethane-2,1-diyl))diacrylamide (27 grams). The crude product was then purified by column chromatography using 100-200 mesh size silica gel, eluted with 0.2-0.6% methanol/dichloromethane to afford a blue solid (65% yield). $^1$H-NMR (DMSO-d$^6$, 400 MHz): δ 3.71-3.28 (m, 24H), 5.56 (s, J=10.8 Hz, 2H), 6.09 (d, J=16.8 Hz, 2H), 6.24 (m, 2H), 7.47 (s, 2H), 7.85 (m, 2H), 8.24-8.15 (m, 4H), 10.86 (br s, 2H).

Example 13—Synthesis of 1-cyano-2-oxo-1-(9H-thioxanthen-9-ylidene)-6,9,12,15,18-pentaoxa-3-azaicosan-20-yl methacrylate as shown in Scheme 7 (Prophetic)

Scheme 7

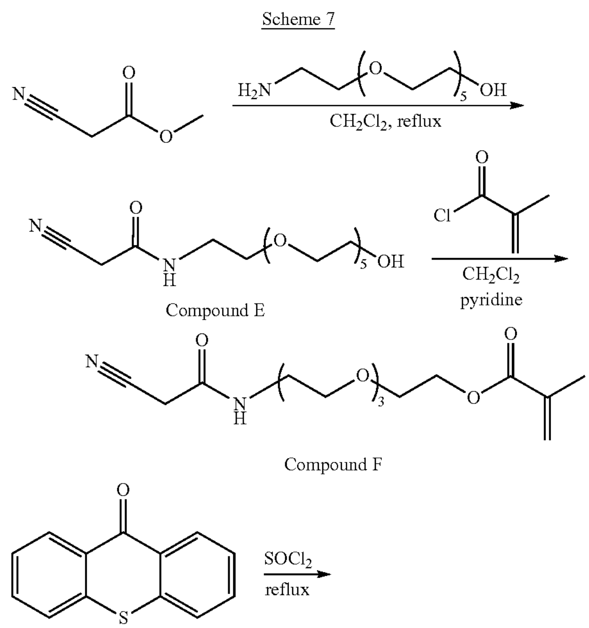

Compound E

Compound F

-continued

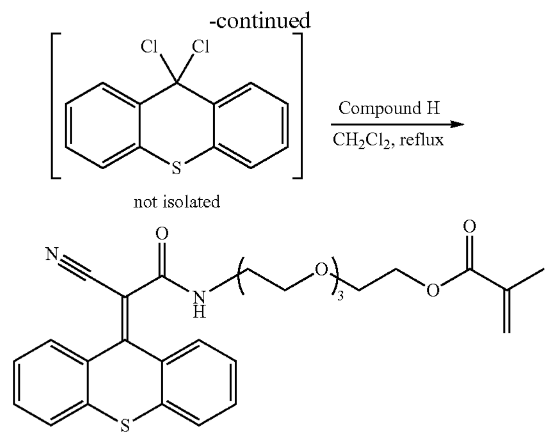

Synthesis of 2-cyano-N-(17-hydroxy-3,6,9,12,15-pentaoxaheptadecyl)acetamide

A solution of 17-amino-3,6,9,12,15-pentaoxaheptadecan-1-ol (0.98 equivalent) in of dichloromethane (25 mL) is added using an addition funnel to a solution of methyl cyanoacetate (1.0 equivalent) in chloromethane (50 mL) in a three-neck, 100 mL round bottom flask equipped with a reflux condenser under a nitrogen environment. As the reaction temperature rises, and the reaction mixture begins to reflux. After the exotherm ceases, external heat is applied to continue reflux for a total of two hours, after which no 17-amino-3,6,9,12,15-pentaoxaheptadecan-1-ol is observed by thin layer chromatography. The reaction may also be conducted at room temperature but takes a few more few hours. The mixture is cooled to room temperature, and the methylene chloride is removed by rotary evaporation at reduced pressure. The residual oil is washed three times with 50 mL of ethyl acetate to remove unreacted starting material and non-polar impurities. The residual ethyl acetate is then removed by rotary evaporation under reduced pressure, and the resulting oil (Compound E) is used for subsequent acylation without any further purification.

Synthesis of 1-cyano-2-oxo-6,9,12,15,18-pentaoxa-3-azaicosan-20-yl methacrylate

Compound E is dissolved in 150 mL of dichloromethane containing pyridine (2.5 equivalents) in a three-neck round bottom flask equipped with a reflux condenser, an addition funnel, and a magnetic stirring bar. The flask is immersed in an ice bath and allowed to cool down to 0° C., and methacryloyl chloride (1.5 equivalents) is added dropwise from the addition funnel. The resulting reaction mixture is allowed to warm up to room temperature while constantly stirring the system. Methanol (20 mL) is then added to the flask to quench any unreacted methacryloyl chloride. The volatile components are removed by rotary evaporation under reduced pressure, and the crude product is dissolved in 800 mL of dilute aqueous hydrochloric acid. The resulting aqueous solution is extracted three times with 100 mL of hexanes in a separatory funnel to remove any non-polar impurities. The organic layers are discarded. Sodium chloride is added to the aqueous layer which is then extracted three times with 300 mL of ethyl acetate. About 50 milligrams of butylated hydroxytoluene (BHT) or 2,6-di-tert-butyl-4-methylphenol are added to the combined organic fractions as an inhibitor, and the ethyl acetate removed by rotary evaporation under reduced pressure. The crude product crystalizes out of solution during solvent removal. When about 100 mL of ethyl acetate is left in the flask, 250 mL of hexanes is added, and the crude product is isolated by vacuum filtration using a fritted glass funnel. The filter cake is washed two times with 150 mL of hexanes and then vacuum dried at 40° C., yielding 1-cyano-2-oxo-6,9,12,15,18-pentaoxa-3-azaicosan-20-yl methacrylate (Compound F).

Synthesis of 1-cyano-2-oxo-1-(9H-thioxanthen-9-ylidene)-6,9,12,15,18-pentaoxa-3-azaicosan-20-yl methacrylate A mixture of 9H-thioxanthene-9-one (1.0 equivalent) and thionyl chloride (7.0 equivalents) is refluxed in a 100 mL round bottom flask under a nitrogen atmosphere with constant stirring. After two hours, the red solution is evaporated to dryness thereby removing excess thionyl chloride from the system. Compound F (1.17 equivalents) is dissolved in 25 mL of dichloromethane and is then added to the flask. The resulting reaction mixture is heated to reflux under a nitrogen blanket. The reaction is monitored by thin layer chromatography until completion. The reactive mixture is allowed to cool down to room temperature. The desired product, 1-cyano-2-oxo-1-(9H-thioxanthen-9-ylidene)-6,9,12,15,18-pentaoxa-3-azaicosan-20-yl methacrylate is isolated as yellow crystals after passing through a short silica gel column (dichloromethane, followed by 5% methanol in dichloromethane).

Example 14—Synthesis of 1-(10-butyl-2-methoxyacridin-9(10H)-ylidene)-1-cyano-2-oxo-6,9,12,15,18-pentaoxa-3-azaicosan-20-yl methacrylate as shown in Scheme 8 (Prophetic)

Scheme 8

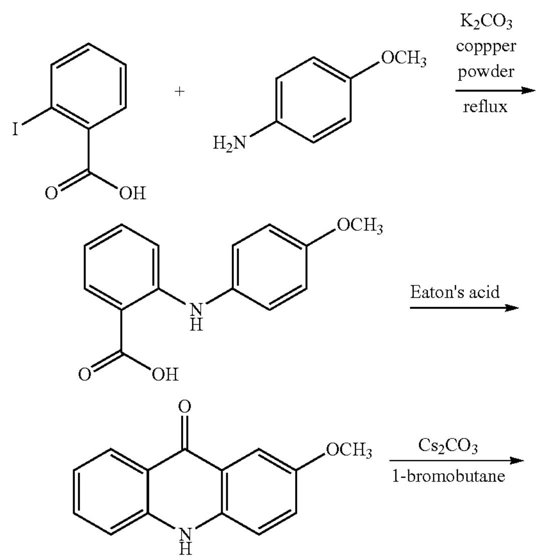

-continued

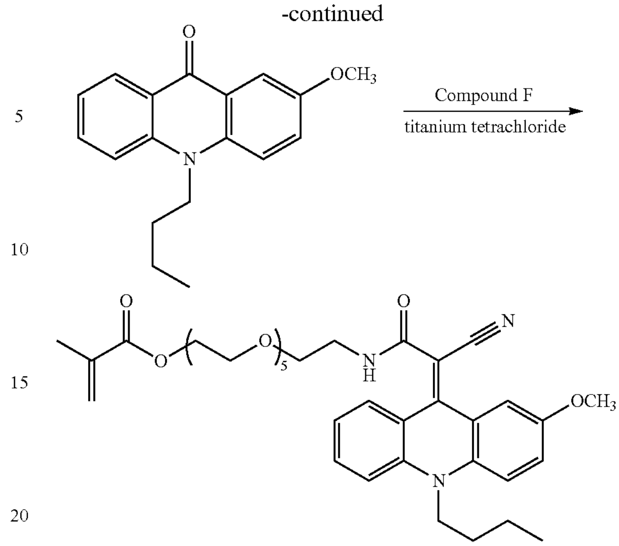

Synthesis of 2-((4-methoxyphenyl)amino)benzoic acid

2-Iodobenzoic acid (1.0 equivalent), 4-methoxyaniline (2 equivalents), potassium carbonate (1.0 equivalent), and 300 milligrams of copper powder are charged into a three neck, 100 mL round bottom flask equipped with a magnetic stir bar and reflux condenser. Deionized water (30 mL) is added to the mixture of solids, and the reactive mixture is then heated at reflux for 6 hours with constant stirring. The mixture solidifies upon cooling down to room temperature. The reactive mixture is diluted with deionized water and is gradually poured into 1 normal aqueous hydrochloric acid with stirring. The reactive mixture is stirred at room temperature for 30 minutes, after which it is filtered over a fritted glass funnel and dried in a vacuum oven at 60° C. The resulting 2-((4-methoxyphenyl)amino)benzoic acid is washed with deionized water (3×100 mL) and is used "as is" for the intramolecular cyclization.

Synthesis of 2-methoxyacridin-9(10H)-one

A 250 mL round bottom flask equipped with a magnetic stir bar and reflux condenser is charged with 12.5 grams of 2-((4-methoxyphenyl)amino)benzoic acid and 100 mL of Eaton's acid (10 weight % $P_2O_5$ in methanesulfonic acid). The mixture is heated with constant stirring at 90° C. (mantle temperature) for 5 hours, while monitoring the reaction progress by thin layer chromatography. Upon cooling to room temperature, the reaction mixture is poured over crushed ice, stirred for 30 minutes, and filtered over a fritted glass funnel. The resulting 2-methoxyacridin-9(10H)-one is washed with deionized water (3×100 mL), followed by acetonitrile, and dried in a vacuum oven at 60° C.

Synthesis of 2-methoxy-10-butylacridin-9(10H)-one

A 250 mL round bottom flask equipped with a magnetic stir bar and reflux condenser is charged with 5.4 grams of 2-methoxyacridin-9(10H)-one (0.0244 mole) and 12.9 grams of cesium carbonate (1.5 equivalents). The solids are dried under vacuum at 80° C., after which the system is placed under a nitrogen blanket and 80 mL of anhydrous N,N-dimethylformamide is added to the flask. 1-Bromobutane (6.0 grams, 2 equivalents) is added to the flask, and the mixture is heated at 50° C. (mantle temperature) for 36 hours. Thin layer chromatography indicates the presence of two compounds (O-alkylation and N-alkylation). The organics are poured into 200 mL of deionized water and extracted into about 150 mL of ethyl acetate. The organics are then washed with deionized water (3×100 mL), followed by dilute aqueous HCl (3×100 mL), to remove the O-alkylated acridine byproduct, and then a final water with deionized water. Thin layer chromatography of the organic fraction confirms the present of a single compound at this point, namely 2-methoxy-10-propylacridin-9(10H)-one, which is dried under reduced pressure and used for the subsequent transformation.

Synthesis of 1-(10-butyl-2-methoxyacridin-9(10H)-ylidene)-1-cyano-2-oxo-6,9,12,15,18-pentaoxa-3-azaicosan-20-yl methacrylate A three neck, 250 mL round bottom flask equipped with a magnetic stir bar and reflux condenser is charged with 2-methoxy-10-butylacridin-9(10H)-one (1.0 equivalent), 1-cyano-2-oxo-6,9,12,15,18-pentaoxa-3-azaicosan-20-yl methacrylate (Compound F, 2.0 equivalents), and 20 mL of dichloromethane. The system is placed under a nitrogen blanket, and the reaction mixture is stirred until homogeneous. After cooling the system in an ice bath, titanium tetrachloride (2.5 equivalents) is added to the reaction mixture in a dropwise fashion and stirred for an additional 15 minutes. Pyridine 5 mL (0.33 equivalent) is added to the reaction mixture, which is allowed to warm up to ambient temperature and is then heated to reflux for 8 hours. After cooling the reaction mixture to room temperature, the reaction mixture is poured over dilute aqueous hydrochloric acid, and the aqueous fraction is extracted with dichloromethane. The organic fractions are combined, and the volatile components are removed by rotary evaporation under reduced pressure. The desired product, 1-(10-butyl-2-methoxyacridin-9(10H)-ylidene)-1-cyano-2-oxo-6,9,12,15,18-pentaoxa-3-azaicosan-20-yl methacrylate, is purified by flash chromatography to afford a dark yellow solid.

Example 15—Synthesis of 17-((9-(dicyanomethylene)-9H-xanthen-3-yl)oxy)-3,6,9,12,15-pentaoxaheptadecyl methacrylate as shown in Scheme 9 (Prophetic)

Scheme 10

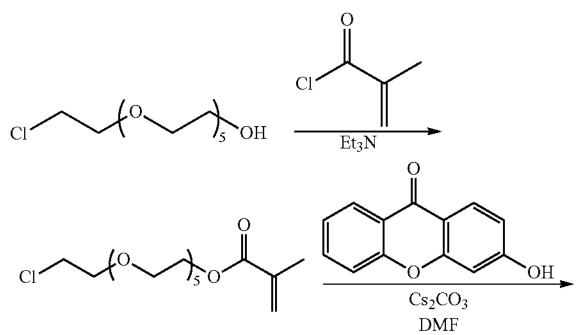

-continued

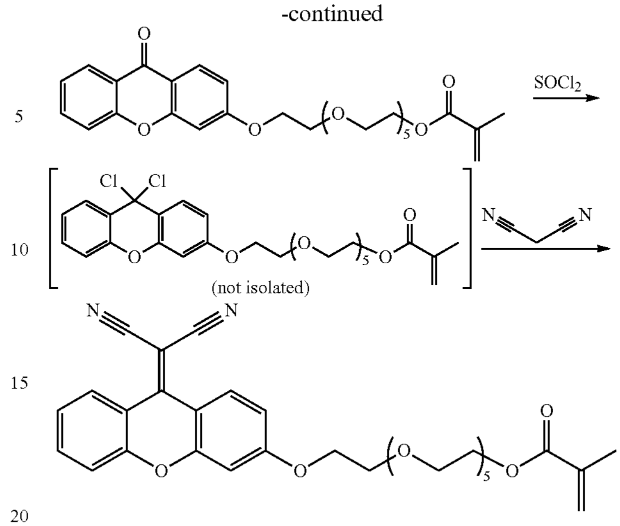

Synthesis of 17-chloro-3,6,9,12,15-pentaoxaheptadecyl methacrylate

17-Chloro-3,6,9,12,15-pentaoxaheptadecan-1-ol (1.0 equivalent) and some crystals of 4-(dimethylamino)-pyridine (catalytic amount) are dissolved in dichloromethane (500 mL) in a round bottom flask equipped with a pressure equalizing addition funnel and nitrogen gas blanket. The reaction mixture is cooled to 0° C. using an ice bath thereafter triethylamine (4.0 equivalents) is added. Then, acryloyl chloride (1.1 equivalents) containing about 400 parts per million (ppm) of butylated hydroxytoluene (BHT) or 2,6-di-tert-butyl-4-methylphenol, is added dropwise, and the reaction mixture is stirred for two hours at 0° C. and then allow to warm up to ambient temperature and stirred for about 6 hours. The reaction mixture is quenched with 150 mL of deionized water and subsequently poured into 200 mL of 1 Molar hydrochloric acid and stirred. After adding some saturated sodium chloride solution, the phases are separated. The aqueous phase is extracted twice with ethyl acetate. The combined organic phases are washed with saturated sodium bicarbonate solution and saturated sodium chloride solution. After adding about ppm BHT per gram of the desired product, the organic phase is concentrated by rotary evaporation under reduced pressure, yielding the crude product. The crude product is dissolved in 30% (v/v) ethyl acetate in n-hexanes and passed through a short silica gel column eluting with 30% (v/v) ethyl acetate in n-hexanes to afford 17-chloro-3,6,9,12,15-pentaoxaheptadecyl methacrylate.

Synthesis of 17-((9-oxo-9H-xanthen-3-yl)oxy)-3,6,9,12,15-pentaoxaheptadecyl methacrylate A suspension of 3-hydroxy-9H-xanthen-9-one (1.0 equivalent), $Cs_2CO_3$ (1.0 equivalent), and sodium iodide (catalytic amount, about 200 milligrams) are dried under vacuum in a 500 mL round bottom flask containing a magnetic stirring bar. Anhydrous dimethyl sulfoxide (DMSO) (250 mL) is added followed by 17-chloro-3,6,9,12,15-pentaoxaheptadecyl methacrylate (1.0 equivalent). The reaction mixture is heated overnight at 70° C. and is monitored by thin layer chromatography. The reaction mixture is cooled to room temperature and slowly poured into dilute aqueous hydrochloric acid with constant stirring.

After stirring for thirty minutes, the off-white solids are isolated by vacuum filtration using a fritted glass funnel. The filter cake is then washed with deionized water, followed by two washes with 200 mL of hexanes. The resulting 17-((9-oxo-9H-xanthen-3-yl)oxy)-3,6,9,12,15-pentaoxaheptadecyl methacrylate is vacuum dried at 60° C. to constant weight.

Synthesis of 17-((9-(dicyanomethylene)-9H-xanthen-3-yl)oxy)-3,6,9,12,15-pentaoxaheptadecyl methacrylate 17-((9-oxo-9H-xanthen-3-yl)oxy)-3,6,9,12,15-pentaoxaheptadecyl methacrylate (1.0 equivalent) and of thionyl chloride (7.0 equivalents) are dissolved in dichloromethane (50 mL) in a round bottom flask equipped with a magnetic stirring bar and reflux condenser, and the resulting reaction mixture is refluxed for 2 hours under a nitrogen gas blanket. The reaction mixture is cooled to room temperature, and the excess thionyl chloride and dichloromethane are removed by rotary evaporation under reduced pressure with the bath temperature maintained below 20° C. Excess malononitrile (10.0 equivalents) is added to the flask, followed by 25 mL of anhydrous dichloromethane, and the reaction mixture is stirred and heated at reflux for two hours. The mixture is cooled to room temperature and then flushed through a short silica gel plug eluting with 5% methanol (v/v) in methylene chloride. Volatile components are evaporated under reduced pressure with the temperature maintained below 20° C., after which the solids are suspended in cold methanol (100 mL) and stirred for 20 minutes. The crude product is isolated by vacuum filtration, and the filter cake washed with additional cold methanol. 17-((9-(Dicyanomethylene)-9H-xanthen-3-yl)oxy)-3,6,9,12,15-pentaoxaheptadecyl methacrylate is further purified by passing through a silica gel column eluting with 5% methanol (v/v) in methylene chloride to afford a light yellow solid.

We claim:

1. An ophthalmic device that is a free radical reaction product of a reactive mixture comprising:

one or more monomers suitable for making the ophthalmic device;

a first visible light filtering compound, the first visible light filtering compound having a visible light absorption maximum between 430 and 480 nm and a full width half maximum (FWHM) at the visible light absorption maximum of at least 35 nm and up to 150 nm, wherein the first visible light filtering compound is photostable, and wherein the first visible light filtering compound has a molar extinction coefficient of at least 7740 $L \cdot mol^{-1} \cdot cm^{-1}$; and a second visible light filtering compound, and wherein the second visible light filtering compound comprises: a mixture of (a) a medium energy visible light filter of formula II:

(II)

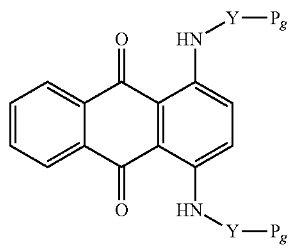

wherein Y at each occurrence is independently a linking group and $P_g$ at each occurrence is independently a polymerizable group; and (b) a high energy visible light filter of formula III:

(III)

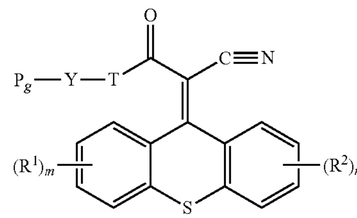

wherein:

m and n are independently 0, 1, 2, 3, or 4;

T is a bond, O, or NR;

Y is a linking group;

$P_g$ is a polymerizable group;

R at each occurrence is independently H, $C_1$-$C_6$ alkyl, cycloalkyl, heterocycloalkyl, aryl, heteroaryl, or Y—$P_g$; and $R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl (preferably unsubstituted phenyl or phenyl substituted with alkyl or halo), halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring; or (c) a high energy visible light filter of formula IV:

(IV)

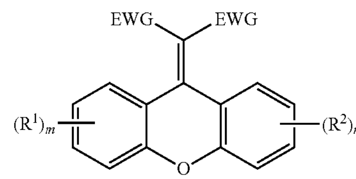

wherein m and n are independently 0, 1, 2, 3, or 4;

$R^1$ and $R^2$ are independently at each occurrence H, an optional substituent, or —Y—$P_g$, or two adjacent $R^1$ or $R^2$ groups, together with the atoms to which they are attached, combine to form a cycloalkyl or aryl ring optionally substituted with —Y—$P_g$;

EWG at each occurrence is independently an electron withdrawing group;

$P_g$ at each occurrence is independently a polymerizable group; and

Y at each occurrence is independently a linking group; and wherein the compound of formula IV contains at least one $P_g$ group.

2. The ophthalmic device of claim 1, wherein the visible light absorption maximum of the first visible light filtering compound is between 440 nm and 470 nm.

3. The ophthalmic device of claim 1, wherein the FWHM at the visible light absorption maximum of the first visible light filtering compound is at least 40 nm and up to 95 nm.

4. The ophthalmic device of claim 1, wherein photostability comprises a loss of absorbance at the visible light absorption maximum of no more than 20 percent.

5. The ophthalmic device of claim 1, wherein photostability comprises being more photostable than macular pigment.

6. The ophthalmic device of claim 1, wherein the first visible light filtering compound is thermally stable.

7. The ophthalmic device of claim 1, wherein the first visible light filtering compound is more thermally stable than macular pigment.

8. The ophthalmic device of claim 1, wherein the reactive mixture further comprises a UV absorbing compound.

9. The ophthalmic device of claim 1, wherein the device has a transmittance of:

(a) between 0 percent and 70 percent across a wavelength range of 400 to 409 nm;

(b) between 60 percent and 80 percent across a wavelength range of 430 to 480 nm;

(c) between 50 percent and 95 percent across a wavelength range of 550 nm to 660 nm; and (d) at least 90 percent across a wavelength range of 665 nm to 760 nm.

10. The ophthalmic device of claim 9, wherein the device has a transmittance of: (e) at least 90 percent across a wavelength range of 515 nm to 530 nm.

11. The ophthalmic device of claim 9, wherein the device has a transmittance of: (f) 35 percent or less across a wavelength range of 280 to 399 nm.

12. The ophthalmic device of claim 1, wherein the first visible light filtering compound is of formula I:

(I)

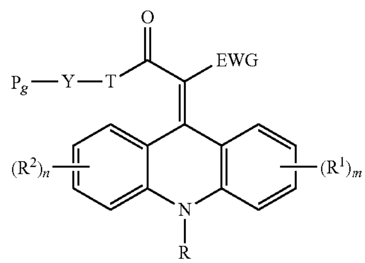

wherein m and n are independently 0, 1, 2, 3, or 4; T is a bond, O, or $NR^6$, wherein $R^6$ is H, $C_1$-$C_6$ alkyl, cycloalkyl, heterocycloalkyl, aryl, heteroaryl, or Y—$P_g$; R is H, $C_1$-$C_8$ alkyl, cycloalkyl, heterocycloalkyl, aryl, or heteroaryl; Y is a linking group; $P_g$ is a polymerizable group; $R^1$ and $R^2$, when present, are independently at each occurrence $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^3R^4$, benzyl, $SO_3H$, or $SO_3M$, M is a monovalent cation, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring; and EWG is an electron withdrawing group.

13. The ophthalmic device of claim 12, wherein m and n are each independently 0 or 1.

14. The ophthalmic device of claim 12, wherein Y at each occurrence is independently alkylene, cycloalkylene, heterocycloalkylene, arylene, heteroarylene, oxaalkylene, alkylene-amide-alkylene, alkylene-amine-alkylene, or combinations thereof.

15. The ophthalmic device of claim 12, wherein $P_g$ comprises styryl, vinyl carbonate, vinyl ether, vinyl carbamate, N-vinyl lactam, N-vinylamide, (meth)acrylate, or (meth)acrylamide.

16. The ophthalmic device of claim 12, wherein EWG is cyano, amide, ester, keto, or aldehyde.

17. The ophthalmic device of claim 12, wherein EWG is cyano.

18. The ophthalmic device of claim 1, wherein the first visible light filtering compound comprises:

2-(2-cyano-2-(2-methoxy-10-propylacridin-9(10H)-ylidene)acetamido)ethyl methacrylate 2-(2-cyano-2-(2-methoxy-10-butylacridin-9(10H)-ylidene)acetamido)ethyl methacrylate;

1-(10-butyl-2-methoxyacridin-9(10H)-ylidene)-1-cyano-2-oxo-6,9,12,15,18-pentaoxa-3-azaicosan-20-yl methacrylate; or a mixture thereof.

19. The ophthalmic device of claim 1, wherein m and n are each independently 0 or 1 in the high energy visible light filter of formula III.

20. The ophthalmic device of claim 1, wherein Y at each occurrence is independently alkylene, cycloalkylene, heterocycloalkylene, arylene, heteroarylene, oxaalkylene, alkylene-amide-alkylene, alkylene-amine-alkylene, or combinations thereof, in the high energy visible light filter of formula III.

21. The ophthalmic device of claim 1, wherein $P_g$ comprises styryl, vinyl carbonate, vinyl ether, vinyl carbamate, N-vinyl lactam, N-vinylamide, (meth)acrylate, or (meth)acrylamide, in the high energy visible light filter of formula III.

22. The ophthalmic device of claim 1, wherein the high energy visible light filter of formula III comprises:

2-(2-cyano-2-(9H-thioxanthen-9-ylidene)acetamido)ethyl methacrylate;

2-(2-cyano-2-(9H-thioxanthen-9-ylidene)acetamido)ethyl acrylate;

N-(2-(2-cyano-2-(9H-thioxanthen-9-ylidene)acetamido)ethyl)methacrylamide;

N-(2-(2-cyano-2-(9H-thioxanthen-9-ylidene)acetamido)ethyl)acrylamide;

2-(2-cyano-N-methyl-2-(9H-thioxanthen-9-ylidene)acetamido)ethyl methacrylate;

2-cyano-2-(9H-thioxanthen-9-ylidene)-N-(2-(N-vinylacetamido)ethyl)acetamide;

2-(2-cyano-2-(9H-thioxanthen-9-ylidene)acetamido)-2-methylpropyl methacrylate;

2-(2-cyano-2-(2,4-dichloro-9H-thioxanthen-9-ylidene)acetamido)ethyl methacrylate;

2-(2-(2-chloro-9H-thioxanthen-9-ylidene)-2-cyanoacetamido)ethyl methacrylate;

2-(2-cyano-2-(2-isopropyl-9H-thioxanthen-9-ylidene)acetamido)ethyl methacrylate;

2-(2-cyano-2-(4-isopropyl-9H-thioxanthen-9-ylidene)acetamido)ethyl methacrylate;

2-(2-cyano-2-(9H-thioxanthen-9-ylidene)acetoxy)ethyl methacrylate;

1-cyano-2-oxo-1-(9H-thioxanthen-9-ylidene)-6,9,12,15,18-pentaoxa-3-azaicosan-20-yl methacrylate; or mixtures of two or more thereof.

23. The ophthalmic device of claim 1, wherein m and n are independently 0 or 1 in the high energy visible light filter of formula IV.

24. The ophthalmic device of claim 1, wherein $R^1$ is H, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R^5$, benzyl, $SO_3H$, or $SO_3Na$, wherein $R^4$ and $R^5$ are independently H or $C_1$-$C_6$ alkyl in the high energy visible light filter of formula IV.

25. The ophthalmic device of claim 1, wherein $R^2$ is —Y—$P_g$ in the high energy visible light filter of formula IV.

26. The ophthalmic device of claim 1, wherein $P_g$ at each occurrence independently comprises styryl, vinyl carbonate, vinyl ether, vinyl carbamate, N-vinyl lactam, N-vinylamide, (meth)acrylate, or (meth)acrylamide in the high energy visible light filter of formula IV.

27. The ophthalmic device of claim 1, wherein Y at each occurrence is independently alkylene, cycloalkylene, heterocycloalkylene, arylene, heteroarylene, oxaalkylene, alkylene-amide-alkylene, alkylene-amine-alkylene, or combinations of any of the foregoing groups in the high energy visible light filter of formula IV.

28. The ophthalmic device of claim 1, wherein EWG at each occurrence is independently cyano, amide, ester, keto, or aldehyde in the high energy visible light filter of formula IV.

29. The ophthalmic device of claim 1, wherein the second high energy visible light filter compound of formula III contains one Y-$P_g$ group.

30. The ophthalmic device of claim 1, wherein the compound of formula IV comprises:

3-((9-(dicyanomethylene)-9H-xanthen-3-yl)oxy)propyl methacrylate;

3-((9-(dicyanomethylene)-9H-xanthen-2-yl)oxy)propyl methacrylate;

1-((9-(dicyanomethylene)-9H-xanthen-3-yl)oxy)propan-2-yl methacrylate;

4-((9-(dicyanomethylene)-9H-xanthen-3-yl)oxy)butyl methacrylate;

3-((9-(dicyanomethylene)-9H-xanthen-3-yl)oxy)propyl acrylate;

1-((9-(dicyanomethylene)-9H-xanthen-3-yl)oxy)propan-2-yl acrylate;

4-((9-(dicyanomethylene)-9H-xanthen-3-yl)oxy)butyl acrylate;

N-(3-((9-(dicyanomethylene)-9H-xanthen-3-yl)oxy)propyl)methacrylamide;

N-(3-((9-(dicyanomethylene)-9H-xanthen-3-yl)oxy)propyl)acrylamide;

3-((9-(dicyanomethylene)-9H-xanthen-3-yl)amino)propyl methacrylate;

17-((9-(dicyanomethylene)-9H-xanthen-3-yl)oxy)-3,6,9,12,15-pentaoxaheptadecyl methacrylate;

or mixtures of two or more thereof.

31. The ophthalmic device of claim 1, that wherein the device is formed by photocuring of the reactive mixture.

32. The ophthalmic device of claim 1, wherein the device is formed by thermal curing of the reactive mixture.

33. The ophthalmic device of claim 1, wherein the device is formed by a combination of photocuring and thermal curing of the reactive mixture.

34. The ophthalmic device of claim 1, wherein the device is a contact lens, the contact lens having a central zone and a peripheral zone.

35. The ophthalmic device of claim 34, wherein the first visible light filtering compound's residue and the second visible light filtering compound's residue are uniformly distributed throughout the central zone and the peripheral zone.

36. The ophthalmic device of claim 34, wherein the first visible light filtering compound's residue and the second visible light filtering compound's residue are present in the central zone at a greater molar concentration than in the peripheral zone.

37. The ophthalmic device of claim 1, wherein the reactive mixture further comprises a UV absorbing compound, wherein the UV absorbing compound comprises a benzophenone, a benzotriazole, a triazine, a substituted acrylonitrile, a salicyclic acid derivative, a benzoic acid derivative, a cinnamic acid derivative, a chalcone derivative, a dypnone derivative, a crotonic acid derivative, or mixtures thereof.

38. The ophthalmic device of claim 1, wherein the polymerizable compound suitable for making the contact lens comprises a hydrophilic component, a silicone-containing component, or mixtures thereof.

39. The ophthalmic device of claim 1, wherein the device is a silicone hydrogel contact lens, the lens having a contact angle of about 100° or less, a water content of at least about 25 weight percent, and an oxygen permeability (edge corrected) of at least about 60 barrers.

40. The ophthalmic device of claim 1, wherein the second visible light filtering compound:

(a) limits the transmittance of the device across a wavelength range of 550 nm to 660 nm to between 50 percent and 95 percent; or (b) limits the transmittance of the device across a wavelength range of 400 to 409 nm to between 0 percent and 70 percent; or (c) both (a) and (b).

* * * * *